(12) United States Patent
Homan et al.

(10) Patent No.: US 10,717,538 B2
(45) Date of Patent: Jul. 21, 2020

(54) BRIDLE FOR AIRCRAFT PARACHUTE DEPLOYMENT ROCKET

(71) Applicant: Cirrus Design Corporation, Duluth, MN (US)

(72) Inventors: Garrett John Homan, Hermantown, MN (US); David A. Rathbun, Hermantown, MN (US); Kevin P. Welsh, Duluth, MN (US); Jeremy Travis Engel, Duluth, MN (US); Anthony Dale Kasher, Inver Grove Heights, MN (US)

(73) Assignee: Cirrus Design Corporation, Duluth, MN (US)

( * ) Notice: Subject to any disclaimer, the term of this patent is extended or adjusted under 35 U.S.C. 154(b) by 624 days.

(21) Appl. No.: 15/431,688

(22) Filed: Feb. 13, 2017

(65) Prior Publication Data

US 2017/0233087 A1    Aug. 17, 2017

Related U.S. Application Data

(60) Provisional application No. 62/294,399, filed on Feb. 12, 2016.

(51) Int. Cl.
| | | |
|---|---|---|
| *B64D 17/80* | (2006.01) | |
| *B64D 17/72* | (2006.01) | |
| *B64D 17/26* | (2006.01) | |
| *B64C 13/18* | (2006.01) | |
| *B64C 39/02* | (2006.01) | |
| *B64D 17/62* | (2006.01) | |

(52) U.S. Cl.
CPC .............. *B64D 17/80* (2013.01); *B64C 13/18* (2013.01); *B64C 39/024* (2013.01); *B64D 17/26* (2013.01); *B64D 17/62* (2013.01); *B64D 17/72* (2013.01); *B64D 17/725* (2013.01)

(58) Field of Classification Search
CPC ........ B64D 17/36; B64D 17/62; B64D 17/72; B64D 17/725; B64D 17/80; F16F 7/006; F16F 7/128
See application file for complete search history.

(56) References Cited

U.S. PATENT DOCUMENTS

| | | |
|---|---|---|
| 1,425,770 A | 8/1922 | Hoffman |
| 1,433,395 A | 10/1922 | Marshall |
| 1,866,869 A | 7/1932 | Thurston |
| 2,271,224 A | 1/1942 | Goddard |

(Continued)

FOREIGN PATENT DOCUMENTS

| | | | | |
|---|---|---|---|---|
| DE | 2221427 A1 * | 11/1973 | ............. | B60R 22/16 |
| DE | 4005563 A1 * | 8/1991 | ............. | A62B 35/04 |

(Continued)

OTHER PUBLICATIONS

Cirrus Design Corporation, Summer 2009 Presentation to Customers in Duluth, Minnesota.

(Continued)

*Primary Examiner* — Brian M O'Hara
*Assistant Examiner* — Michael B. Kreiner
(74) *Attorney, Agent, or Firm* — Hovey Williams LLP

(57) ABSTRACT

An aircraft includes an airframe parachute system. The parachute system includes an activation system, an extraction system, a harness system, and a parachute assembly.

23 Claims, 40 Drawing Sheets

(56) References Cited

U.S. PATENT DOCUMENTS

| | | |
|---|---|---|
| 2,352,721 A | 7/1944 | Krahel |
| 2,631,797 A | 3/1953 | Smith |
| 2,673,051 A | 3/1954 | Frost |
| 3,107,887 A | 10/1963 | Dixon et al. |
| 4,033,528 A | 7/1977 | Diggs |
| 4,040,583 A | 8/1977 | Bihrle, Jr. |
| 4,108,402 A | 8/1978 | Bowen |
| 4,113,208 A | 9/1978 | Manfredi |
| 4,445,654 A | 5/1984 | Handbury et al. |
| 5,878,979 A | 3/1999 | Fisher et al. |
| 5,899,414 A | 5/1999 | Duffoo |
| 5,944,282 A | 8/1999 | Clausnitzer et al. |
| 6,199,799 B1 * | 3/2001 | Lai ............ B64C 27/006 244/139 |
| 6,412,731 B1 | 7/2002 | Gabriel |
| 8,056,861 B2 | 11/2011 | Fleming, III |
| 8,100,365 B2 | 1/2012 | Fleming, III |
| 8,191,831 B2 | 6/2012 | Nadir |
| 2003/0094544 A1 | 5/2003 | Yamada |
| 2006/0249629 A1 | 11/2006 | Lee |
| 2013/0175398 A1 | 7/2013 | Chia |
| 2014/0332627 A1 | 11/2014 | Adir |

FOREIGN PATENT DOCUMENTS

| | | | | |
|---|---|---|---|---|
| FR | 857320 A | * | 9/1940 | ............ B64D 17/36 |
| FR | 2031615 A5 | * | 11/1970 | ............ B64D 17/36 |
| FR | 2513717 A1 | * | 4/1983 | ............ A62B 35/04 |
| JP | 10203491 A | | 4/1998 | |
| JP | 2908824 B2 | | 6/1999 | |
| KR | 1020120048807 A | | 5/2012 | |

OTHER PUBLICATIONS

Irvin Industries, Inc.; Mr. E.G. Ewing, Mr. H. W. Bixby, and Mr. T. W. Knacke; Recovery System Design Guide; pp. xxiii-15, 111-132 ; Dec. 1978; Gardena, California.

Kevin Coyne; F-111 Crew Module Escape and Survival Systems; pp. 4, 7, 9; Unknown date of publication, http://www.ejectionsite.com/f111.htm.

PCT International Search Report and Written Opinion from PCT Application No. PCT/US2017/017737 entitled Aircraft Parachute System (dated May 26, 2017).

* cited by examiner

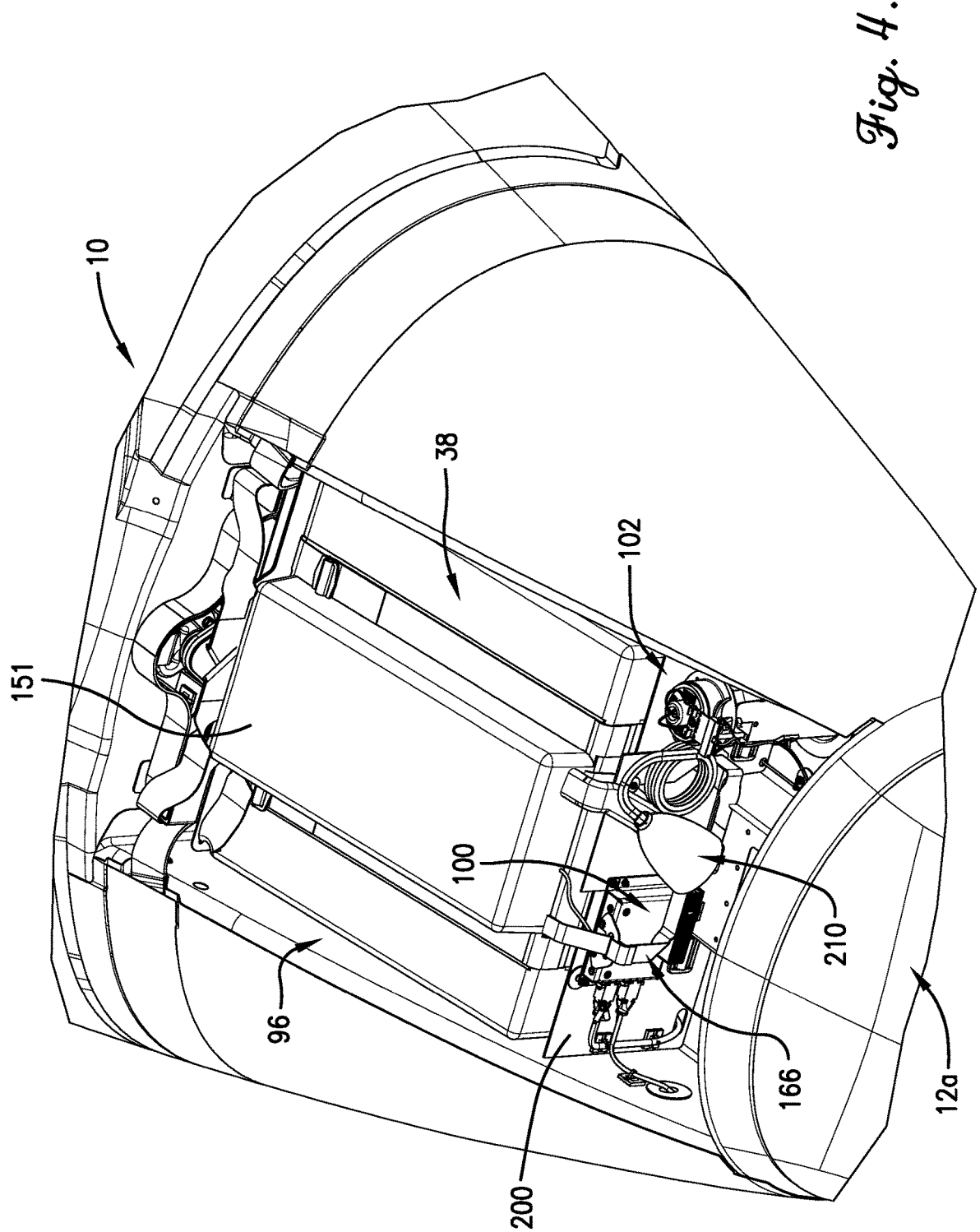

BRIDLE FOR AIRCRAFT PARACHUTE DEPLOYMENT ROCKET

CROSS-REFERENCE TO RELATED APPLICATIONS

1. Priority Applications

The present application claims priority from U.S. Provisional Patent Application No. 62/294,399, filed Feb. 12, 2016, and entitled AIRCRAFT PARACHUTE SYSTEM, the entire disclosure of which is hereby incorporated by reference herein.

2. Contemporaneously Filed Applications

The present application is filed contemporaneously with U.S. patent application Ser. No. 15/431,685, entitled MECHANICAL TIMING CONNECTION FOR SEQUENCING AIRBAG ACTIVATION WITH ROCKET FOR DEPLOYING AIRCRAFT PARACHUTE, filed Feb. 13, 2017; U.S. patent application No. Ser. No. 15/431,687, entitled AIRCRAFT PARACHUTE SYSTEM UTILIZING AIRBAG TO ASSIST WITH PARACHUTE DEPLOYMENT, filed Feb. 13, 2017; and U. S. patent application No. Ser. No. 15/431,689, entitled AIRCRAFT PARACHUTE DEPLOYMENT AUTOPILOT, filed Feb. 13, 2017. The entire disclosure of each of the aforementioned contemporaneously filed applications is hereby incorporated by reference herein.

BACKGROUND OF THE INVENTION

1. Field of the Invention

The present invention relates generally to aircraft. More particularly, a preferred embodiment of the present invention concerns an aircraft including a parachute system.

2. Discussion of the Prior Art

Those of ordinary skill in the art will appreciate that parachute systems may be provided to slow the travel of a body. For instance, bodies such as spacecraft or skydivers falling toward the earth due to the influence of gravity might be provided with one or more parachute systems to slow their descent. In other cases, bodies such as automotive drag racing vehicles or naval jet airplanes might be provided with one of more parachute systems to slow their generally horizontal travel while in contact with the ground (e.g., a racetrack or aircraft carrier deck, respectively).

SUMMARY

According to one aspect of the present invention, an aircraft is provided. The aircraft includes a parachute assembly, a projectile object, and a bridle. The parachute assembly includes a deployable canopy. The parachute assembly is shiftable from a stowed position to a deployed position. The projectile object is configured to pull the parachute assembly toward the deployed position when traveling in a deployment direction. The bridle is connected to the projectile object and is configured to resist travel of the projectile object in the deployment direction. The bridle includes an extendable body, with extension of the body resisting travel of the projectile object in the deployment direction.

BRIEF DESCRIPTION OF THE DRAWING FIGURES

Preferred embodiments of the invention are described in detail below with regard to the attached drawing figures, wherein:

FIG. 4 is an enlarged perspective view of the parachute system within the nose of the aircraft, prior to deployment;

Figure 1:
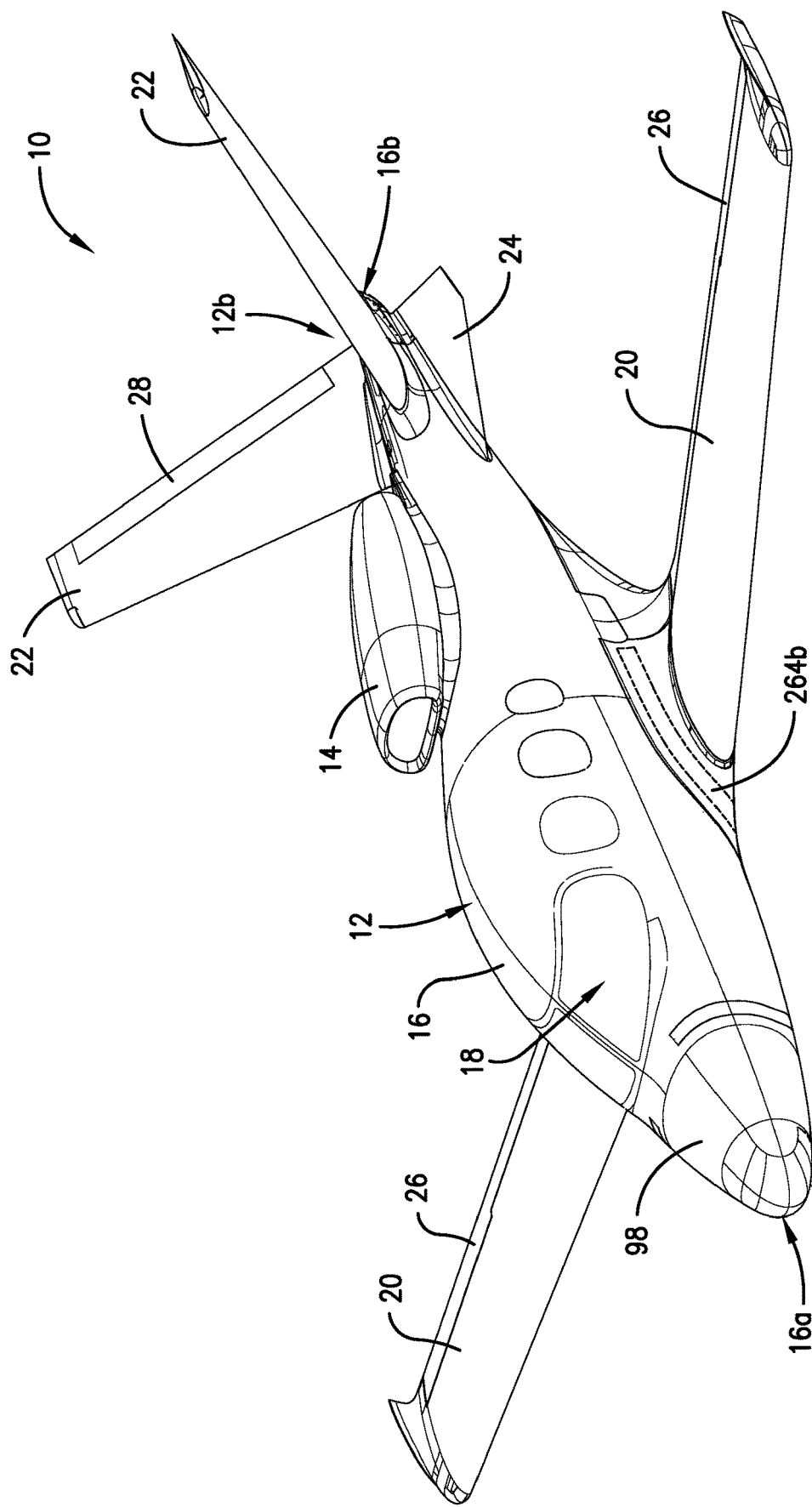
FIG. 1 is a top perspective view of an aircraft according to a preferred embodiment of the present invention.
Figure 2:
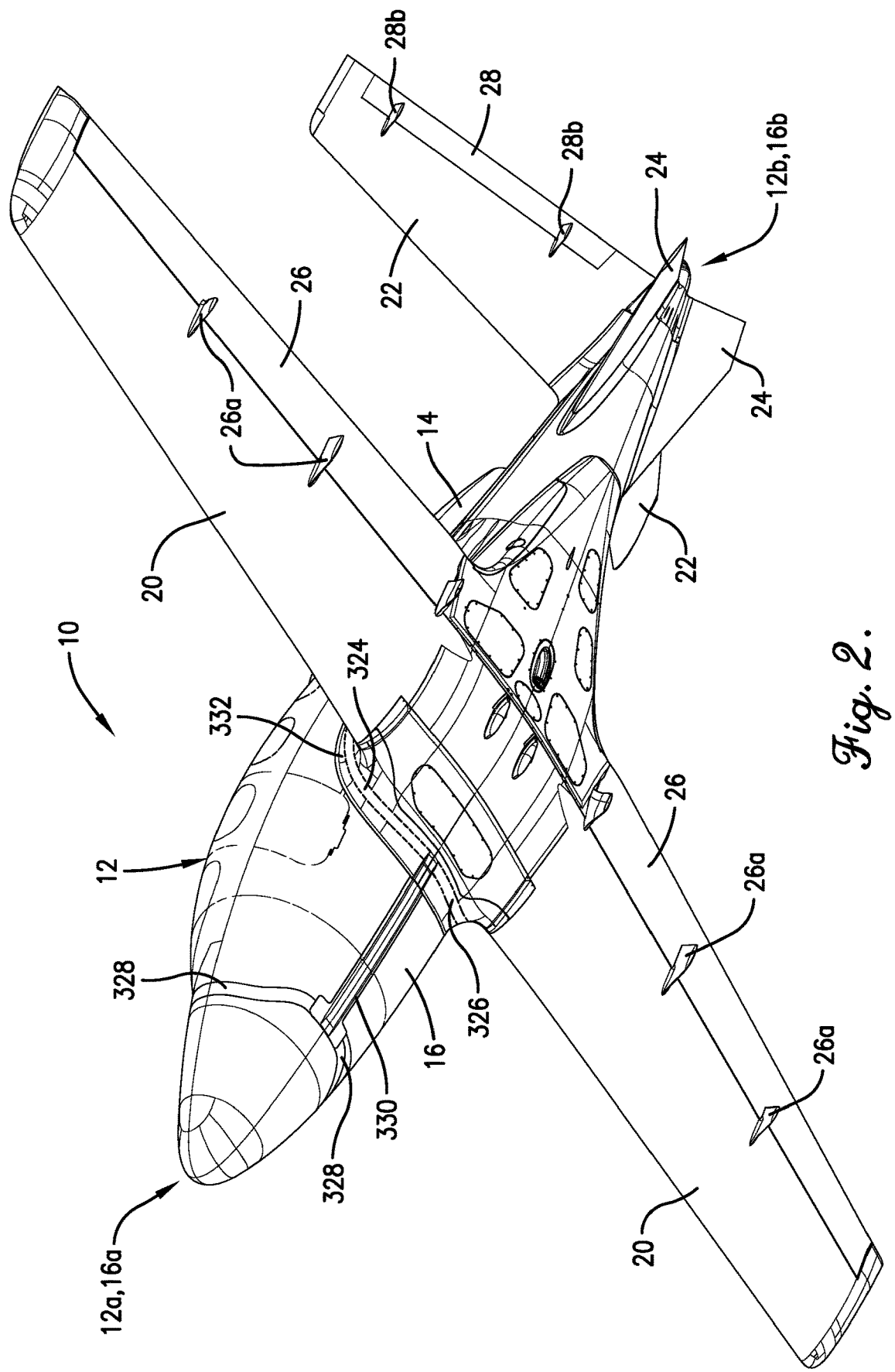
FIG. 2 is a bottom perspective view of the aircraft of FIG. 1.
Figure 3:
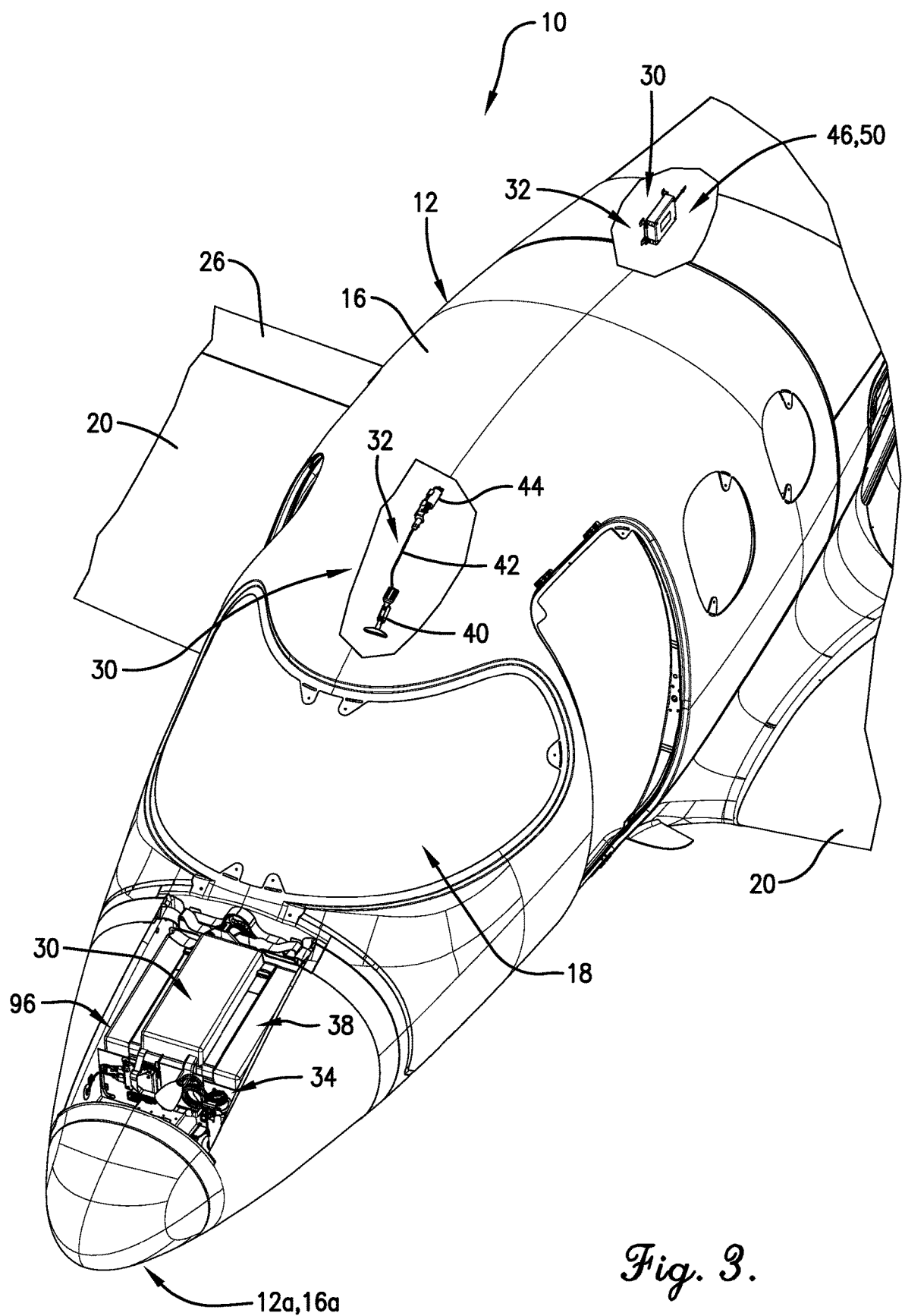
FIG. 3 is an enlarged, fragmented top perspective view of the aircraft of FIGS. 1 and 2, particularly illustrating the parachute assembly, activation handle and igniter switch assembly, and controller.
Figure 3A:
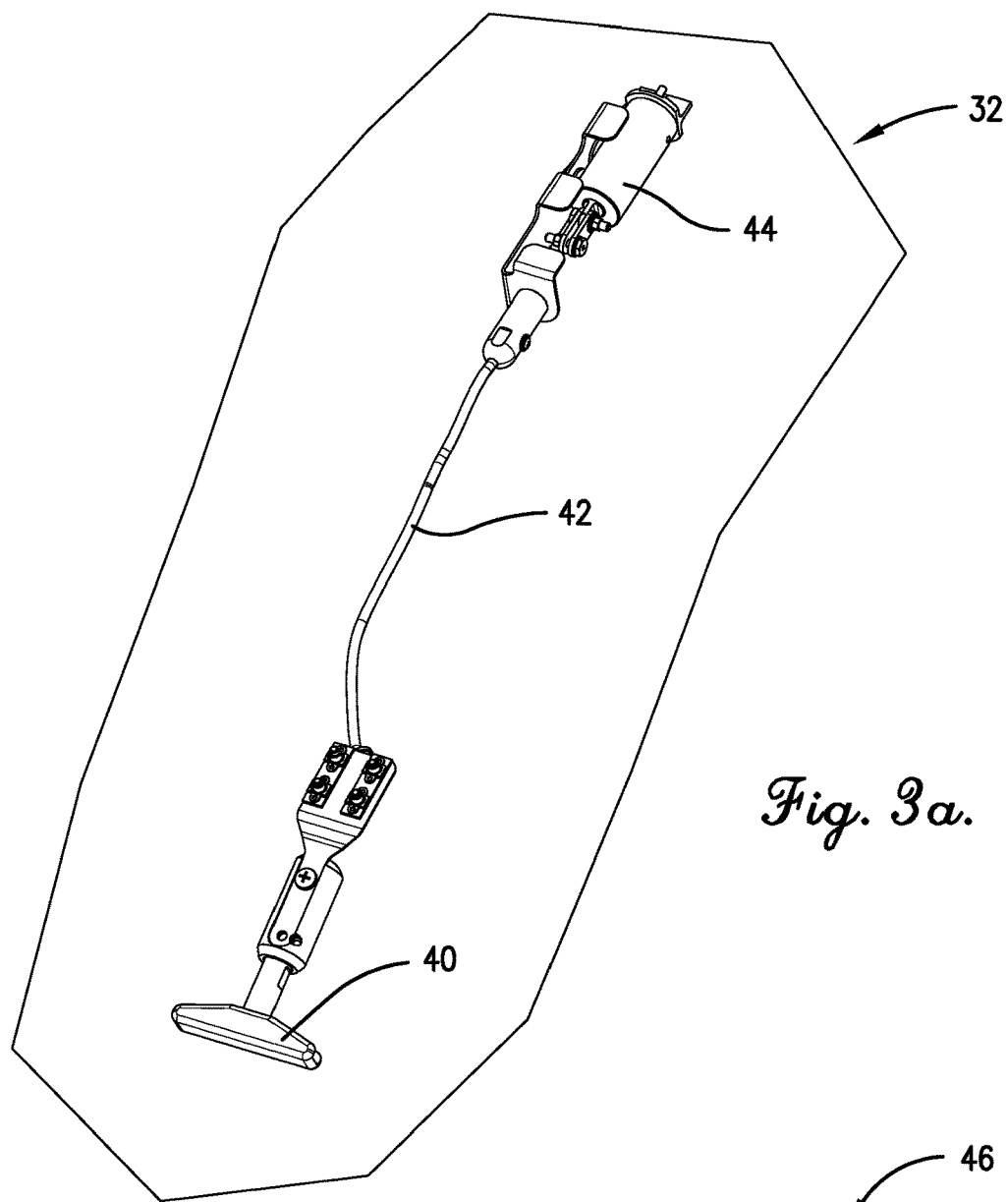
FIG. 3a is an enlarged perspective view of the activation handle and igniter switch assembly.
Figure 3B:
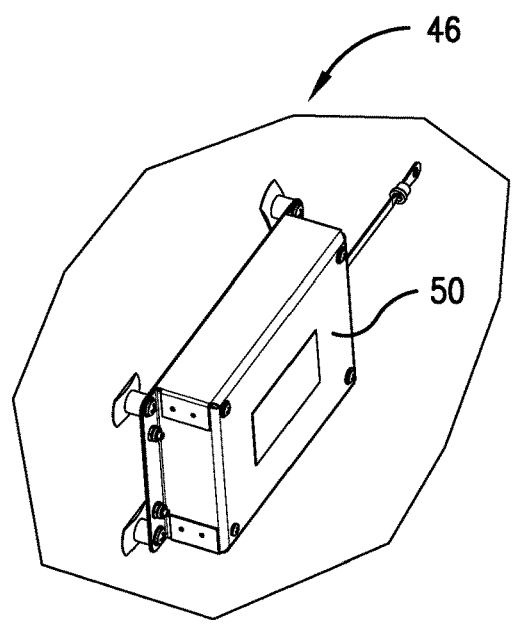
FIG. 3b is an enlarged perspective view of the controller.
Figure 5:
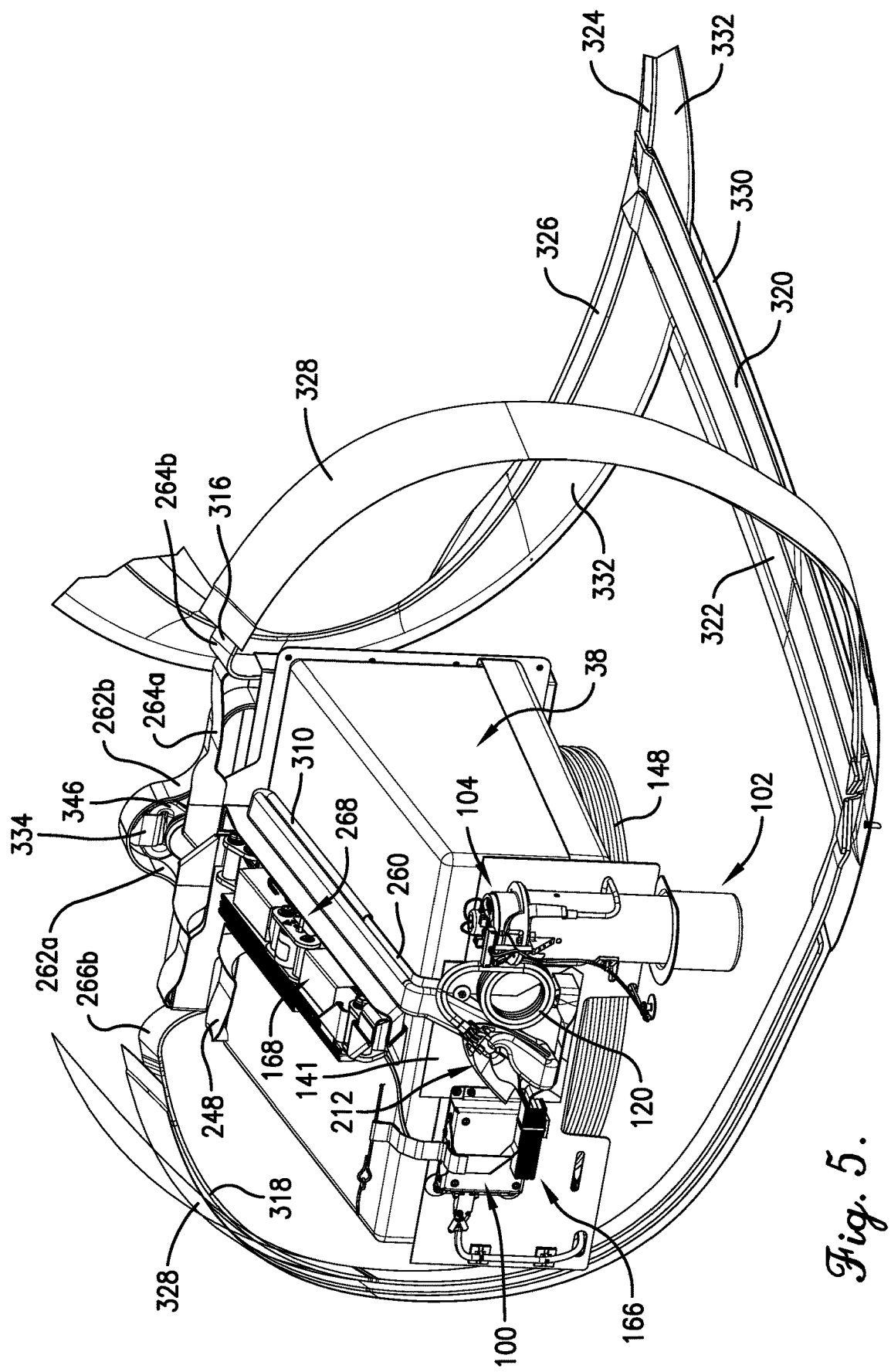
FIG. 5 is a top perspective view of the parachute system with portions of the fairings shown, and with surrounding structure removed for clarity.
Figure 6:
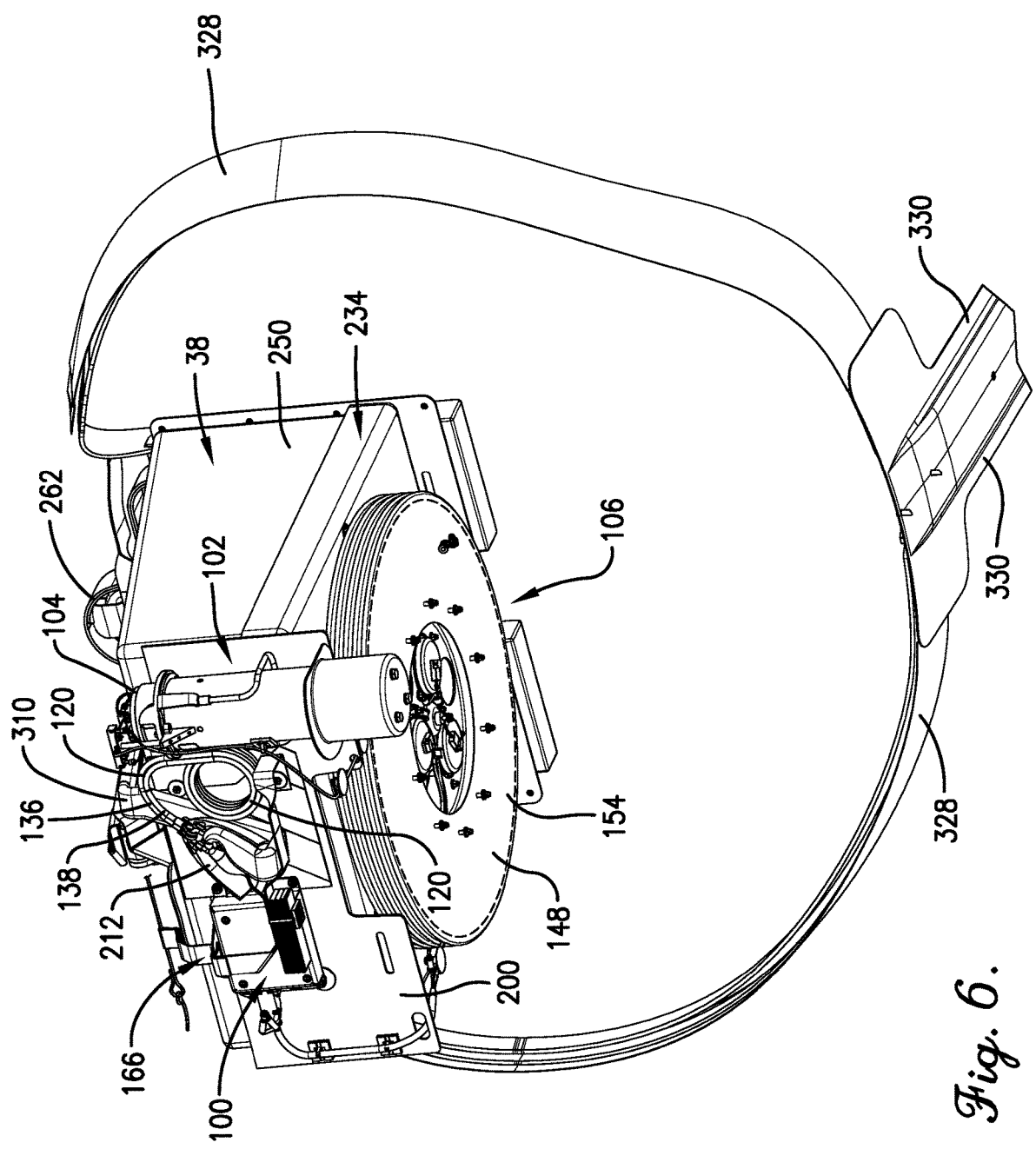
FIG. 6 is a bottom perspective view of the parachute system similar to FIG. 5.
Figure 7:
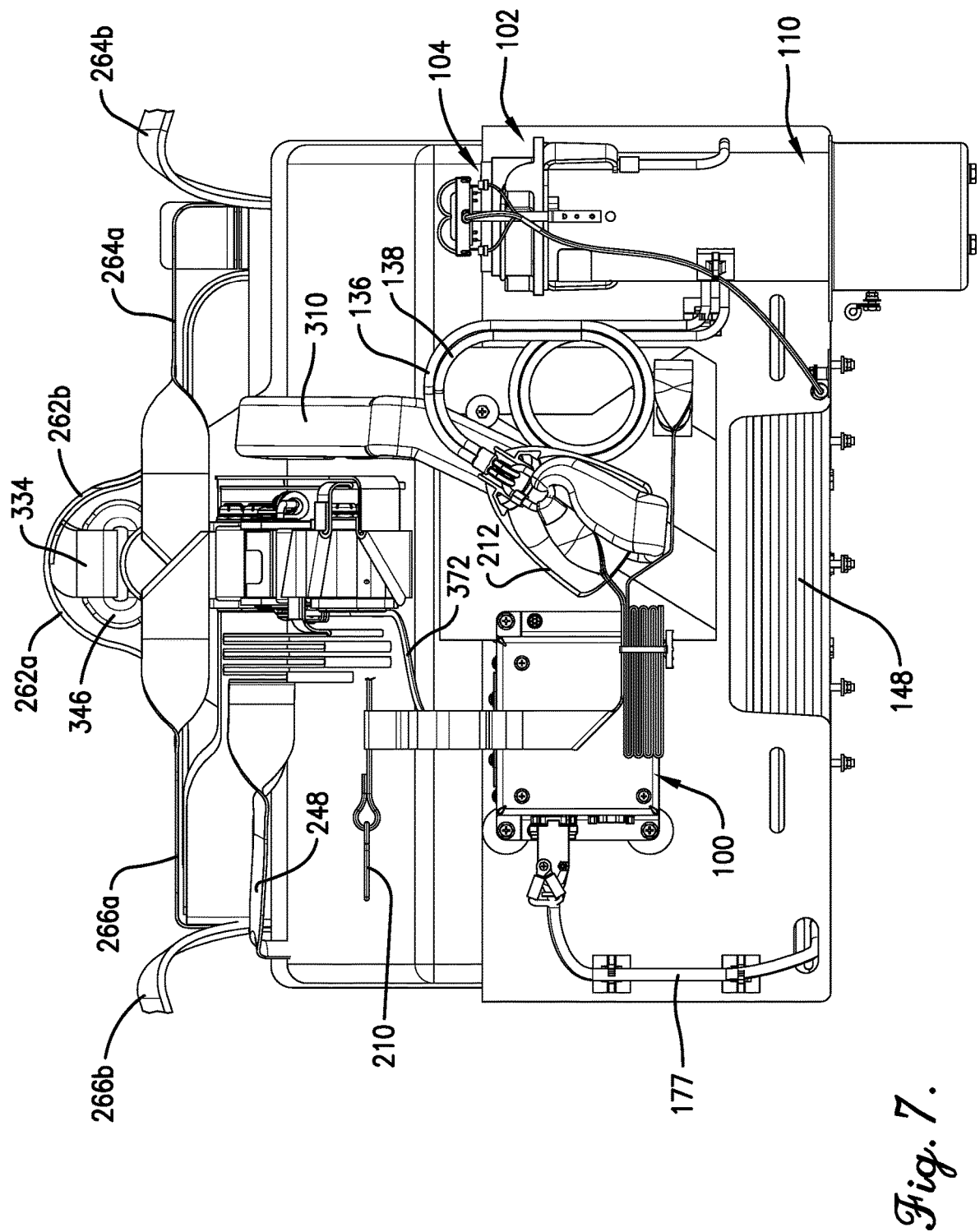
FIG. 7 is a front view of the parachute system.
Figure 8:
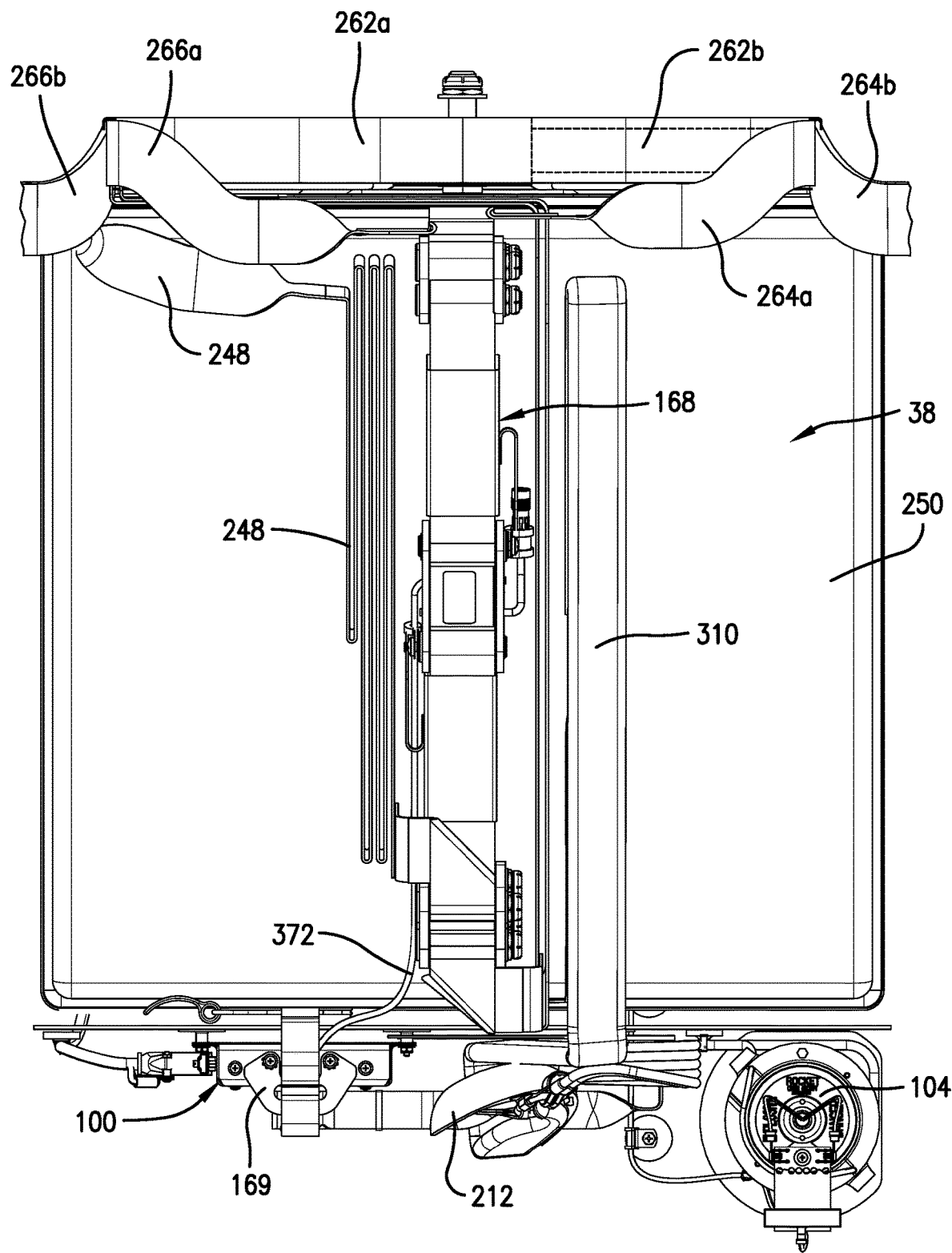
FIG. 8 is a top view of the parachute system.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein and unless otherwise specified, the terms axial, axially, and variations thereof mean the defined element has at least some directional component along or parallel to the axis. These terms should not be limited to mean that the element extends only or purely along or parallel to the axis. For example, the element may be oriented at a forty-five degree (45) angle relative to the axis but, because the element extends at least in part along the axis, it should still be considered axial. Similarly, the terms radial, radially, and variations thereof shall be interpreted to mean the element has at least some directional component in the radial direction relative to the axis, unless otherwise specified.

DETAILED DESCRIPTION OF THE PREFERRED EMBODIMENTS

Aircraft Overview

In a preferred embodiment of the present invention, an aircraft 10 is provided. The aircraft 10 is preferably an airplane. The aircraft 10 preferably broadly comprises a body 12 and a propulsion unit 14 for propelling the body 12. The body 12 preferably includes a fuselage 16 defining a cabin 18, a pair of wings 20 extending from the fuselage 16, a pair of upper stabilizers 22 extending from the fuselage 16 (i.e., a V-tail or butterfly tail), and a pair of lower stabilizers 24 extending from the fuselage 16. The propulsion unit 14 is preferably mounted to the fuselage 16. The wings 20 are preferably fixed wings, and the propulsion unit 14 preferably comprises a jet engine.

The body 12 preferably presents a nose 12a and a tail 12b opposite the nose 12a.

Each wing 20 preferably includes a roll control surface 26 actuatable by a roll control actuator 26a. The roll control surface 26 is preferably an aileron. Each upper stabilizer preferably includes a pitch control surface 28 actuatable by a pitch control actuator 28a. The pitch control surface 28 is preferably a combination surface combining the conventional functions of both an elevator and a rudder. Such combination surface may be referred to as a ruddervator. As will be discussed in greater detail below, however, a variety of aircraft configurations are permissible without departing from the scope of some aspects of the present invention.

The aircraft 10 is preferably a civilian airplane for business or private use. Still more particularly, the aircraft 10 is preferably a multi-seat light aircraft approved for single-pilot operation. In a preferred embodiment, as illustrated, the aircraft 10 is a multi-seat personal jet with a pilot plus passenger capacity up to seven. In alternative terms, the aircraft 10 may also referred to as a very light jet, entry-level jet, or microjet.

It is permissible according to some aspects of the present invention, however, for the aircraft to be an entirely different type of airplane or to be of an alternative aircraft type entirely. For instance, the aircraft might be manned or unmanned (e.g., a drone or unmanned aerial vehicle). The aircraft might be a rotorcraft such as a helicopter, a fixed wing aircraft, or an ornithopter. Onboard power might be provided by one or more jet engines (e.g., turbojets, turbofans, pulse jets, ram jets, and/or hybrids thereof), propellers, and/or rockets. The aircraft might also be devoid of onboard propulsion power (e.g., a glider or satellite). The aircraft might be a personal aircraft (e.g., a recreational ultralight), a small business aircraft (e.g., a crop duster), a large commercial aircraft (e.g., an international passenger jet), or a military aircraft (e.g., a fighter jet). As will be apparent to those of ordinary skill in the art, additional aircraft not listed above may also fall within the scope of the present invention.

In a preferred embodiment, as illustrated, the aircraft 10 weighs between about two thousand (2,000) lb and about five thousand (5,000) lb empty, with a maximum weight between about four thousand (4,000) lb and about eight thousand (8,000) lb. Most preferably, the maximum aircraft weight is about six thousand (6,000) lb. The wingspan is preferably between about twenty (20) feet and about sixty (60) feet. The length is preferably between about ten (10) feet and about fifty (50) feet. The height is preferably between about five (5) feet and about fifteen (15) feet. However, as noted above, a variety of aircraft types and, in turn, sizes, fall within the scope of some aspects of the present invention.

In a preferred embodiment, as illustrated, the aircraft 10 includes an aircraft or airframe parachute system 30. The parachute system 30 will be described in detail below. In a broad sense, however, the parachute system 30 preferably includes an activation system 32, an extraction system 34, a harness system 36, and a parachute assembly 38.

The parachute system 30 is preferably intentionally activated by a pilot or passenger. However, it is permissible according to some aspects of the present invention for activation to occur in a purposeful but automated manner based on some condition of the aircraft (e.g., automatically via a control system of an unmanned aircraft upon detection of rapid descent, etc.). Upon such intentional or purposeful activation, the aircraft parachute system 30 is configured to slow the descent of the aircraft 10, preferably resulting in a minimally damaging landing both for the aircraft 10 itself and for the pilot, passenger(s), cargo, etc. as specific to the given incident. More particularly, as will be discussed in detail below, it is preferred that the activation system 32, upon user input, initiates and monitors processes designed to place the aircraft 10 into an appropriate state for deployment of the parachute assembly 38. Such deployment is by means of the extraction system 34, which ejects the parachute assembly 38 away from the remainder of the aircraft 10, and further by means of the harness system 36, which both assists in control of the extraction process and secures the parachute assembly 38 to the remainder of the aircraft 10.

Although a variety of suitable reasons for activation exist, those for which control of the aircraft 10 has been lost (or the aircraft 10 is otherwise endangered) due to environmental conditions, electronic or mechanical system failure, pilot error or incapacitation, etc. are particularly contemplated. The present invention is not limited to specific circumstances, however, unless otherwise specified. In a broad sense, however, it will be understood by those of ordinary skill in the art that deployment of the parachute assembly 38 will be intended to provide a force in opposition to a direction of travel of the aircraft (regardless of whether or not such direction of travel is substantially downward).

Parachute System: Activation System

In a preferred embodiment, the activation system 32 broadly includes a deployment handle 40, an activation cable 42, an igniter switch assembly 44, and a deployment management system 46. The activation system 32 is configured to enable efficient activation of the parachute system 30 while also avoiding inadvertent activations. That is, the activation system 32 is preferably simple enough to enable emergency use while being both robust and well-protected against unintentional engagement. As noted above, the activation system 32 is also configured to facilitate and implement operations to place the aircraft 10 in a suitable state for deployment of the parachute assembly 38.

Deployment Handle, Activation Cable, and Igniter Switch Assembly

In a preferred method of use, engagement of the activation system 32 requires a user (preferably in the cabin 18) to (1) access and grip the deployment handle 40 and (2) pull the handle 40 down with at least about fifteen (15) lb of force and more preferably at least about thirty (30) lb of force. Most preferably, the handle 40 must be pulled down with at least about forty-five (45) lb of force. The handle 40 is preferably attached to the activation cable 42, which in turn is operably interconnected with the igniter switch assembly 44, such that the method described above results in engagement of the igniter switch assembly 44. Further details of the interactions of the handle 40, the cable 42, and the igniter switch assembly 44 are provided below.

Inadvertent engagement is preferably avoided by the aforementioned two-step nature of the activation method and the relatively high force required to pull the handle 40 down. Inadvertent engagement is further preferably avoided by definition of a recess (not shown), preferably in a ceiling of the cabin 18, in which the handle 40 is received. Access and gripping of the handle 40 is thus further restricted (i.e., the handle 40 does not simply hang down into the cabin 18), and pulling of the handle 40 requires an initial generally outward or horizontal motion to clear the recess prior to the aforementioned forceful downward pull.

Still further, in a preferred embodiment, a small mount of slack (e.g., two (2) inches) is provided in the cable 42 such that the deployment handle 40 can be shifted or unseated from the recess a small amount without the cable 42 engaging the igniter switch assembly 44.

Preferably, a pin (not shown) is also provided to prevent extraction of the deployment handle 40 during maintenance and/or ground operations.

Although a recessed handle 40 with built-in cable 42 slack and a retention pin, as described above, is preferred, it will be understood by those of ordinary skill in the art that it is permissible according to some aspects of the present invention for any of a variety of activation mechanisms, including but not limited to buttons, switches, alternative handles, voice activated systems, or mechanisms similar to the above (but non-recessed, lacking slack, and/or devoid of safety pins), etc. to act singly or in combination to engage the activation system.

Turning again to the preferred, illustrated embodiment, the deployment handle 40 preferably comprises anodized aluminum in a T-shape to facilitate easy gripping. Furthermore, the handle 40 is preferably painted, powder-coated, or otherwise colored red for easy identification. Other colors, materials, and/or shapes are permissible, however.

Preferably, the cable 42 comprises steel. Other materials may be alternatively or additionally used, however. For instance, the cable 42 could comprise braided Kevlar® or another textile material.

In a preferred embodiment, the igniter switch assembly 44 includes a mechanically activated single pole, single throw, normally open, double make (SPST-NO-DM) switch. Activation of the switch preferably requires application of a sufficient force (preferably at least about thirty (30) lb) via the cable 42 to overcome an opposing force provided by a resistive element housed therein. In a preferred embodiment, for instance, the force transferred via the cable 42 must be sufficient to compress a spring to allow the switch to close. Any one or more of a variety of switch types known in the art may be used without departing from the scope of some aspects of the present invention, however.

Deployment Management System

Upon engagement of the activation system 32 as described above, the deployment management system 46 is engaged. In a preferred embodiment, the deployment management system 46 includes an autopilot component 48 and a control box component 50. In various implementations, the functionalities of these components 48,50 may be performed by a single subsystem, or their performance may be distributed over two or more different subsystems.

Broadly characterized, when the parachute system 30 is activated, as in step 52, the autopilot component 48 idles or shuts off the propulsion unit 14, as in step 54; levels the wings 20, as in step 56; and pitches the nose 12a of the aircraft 10 up, as in step 58, to decelerate the aircraft 10 and position it in a desired orientation to facilitate deployment of the parachute assembly 38.

Furthermore, the control box component 50 determines whether a speed of the aircraft 10 is at or below a maximum deployment speed, as in step 60, and if not, whether the aircraft 10 is decelerating, as in step 62, and based thereon sends a deployment signal to the extraction system 34, as in step 63, to deploy the parachute assembly 38.

Further still, a pilot or other controller of the aircraft 10 may perform various relevant functions, as in step 64, such as shutting off the propulsion unit 16 and/or preparing the aircraft 10 for landing, to facilitate the overall process.

It may be desirable to be at or below the maximum deployment speed to avoid imparting overly large loads on the occupants (if any) and the structure of the aircraft 10 (e.g., the fuselage 16). Further, it may be desirable to level the wings 20 and pitch the nose 12a up in order to achieve a desirable orientation of and further slow the aircraft 10 to facilitate more effective deployment of the parachute assembly 38. Avoidance of ingestion of the parachute assembly 38 into the propulsion unit 14 is also desirable, with both idling/shut-off procedures and orientation of the aircraft 10 potentially aiding in achieving this goal.

Autopilot Component

Embodiments of the autopilot component 48 may function substantially as follows. In aircraft with an existing autopilot system 66 (e.g., higher-end aircraft and unmanned drones), such as the preferred, illustrated aircraft 10, this component 48 may be configured to work through the existing autopilot system 66 to accomplish its function. In aircraft (e.g., lower-end manned aircraft and unmanned drones) without an existing autopilot system, this component 48 may work directly with various actuators and control surfaces to accomplish its function.

When the handle 40 is pulled, the deployment management system 46 receives an Activation Signal. Receipt of the Activation Signal may cause the autopilot component 48 to send a Speed Control Signal to a propulsion unit speed controller 68 to idle the propulsion unit 16 or otherwise reduce the speed of the aircraft 10. Again, if the aircraft 10 has an existing autopilot system 66, then the autopilot component 48 may work through the existing autopilot system 66 to cause the Speed Control Signal to be sent to the speed controller 68.

Additionally, the autopilot component 48 may send a Roll Control Signal to the roll control actuator 26a to cause the roll control surface 26 to level the wings 20 or, in an aircraft without wings, otherwise reduce the roll angle below a maximum roll angle threshold. Again, if the aircraft 10 has an existing autopilot system 66, then the autopilot component 48 may work through the existing autopilot system 66 to cause the Roll Control Signal to be sent to the roll control actuator 26a.

In one implementation, the maximum roll angle may be +/−five (5) degrees, and the desired roll angle may be zero (0) degrees. Furthermore, the roll control function to achieve this roll angle may be performed at the highest gain (same as Level Mode).

Additionally, the autopilot component 48 may send a Pitch Control Signal to the pitch control actuator 28a to cause the pitch control surface 28 to pitch up or otherwise cause the pitch angle to be between a minimum pitch angle and a maximum pitch angle. Again, if the aircraft 10 has an existing autopilot system 66, then the autopilot component 48 may work through the existing autopilot system 66 to cause the Pitch Control Signal to be sent to the pitch control actuator 28a. In one implementation, the minimum pitch angle may be up twenty-five (25) degrees and the maximum pitch angle may be up thirty-five (35) degrees. The desired pitch angle may be up thirty (30) degrees. The pitch control function to achieve this pitch angle may be performed at the highest gain.

The speed, roll, and/or pitch control actions by the autopilot component 48 may be performed substantially simultaneously. Some or all of the functionality of the autopilot component 48 may be implemented in software executed on a microprocessor, in firmware, or in hardware, or in a combination thereof.

Furthermore, it is permissible according to some aspects of the present invention for the autopilot component 48 to signal only one of the controllers or actuators 68,26a,28a listed above, or any combination thereof, or to additionally or alternatively signal any other available controllers or actuators (e.g, those associated with landing gear, flaps, speed brakes, spoilers, etc.) in order to slow the aircraft 10.

In one implementation, the autopilot component 48 may remain active for thirty (30) seconds before self-clearing, and may be interrupted by pressing and holding a switch, such as an "AP DISC" (autopilot disconnect) switch provided in the cabin 18.

Control Box Component

Embodiments of the control box component 50 may function substantially as follows. When the handle 40 is pulled, the deployment management system 46 receives the Activation Signal. Receipt of the Activation Signal may cause the control box component 50 to determine the speed of the aircraft 10 using a speed sensor 70, and based thereon, determine whether the speed of the aircraft 10 is at or below a maximum deployment speed for deploying the parachute assembly 38, and if so, send a Deploy Signal and/or apply power to the extraction system 34 (via the igniter switch assembly 44) to deploy the parachute assembly 38.

In one implementation, the maximum deployment speed may be one hundred thirty-five (135) Knots Calibrated Air Speed (KCAS) and one hundred forty-five (145) Knots True Air Speed KTAS.

In an exemplary implementation, the control box component 50 may include two channels: a first channel, which may always be active, including an airspeed switch circuit 72; and a second channel, which may activate when the handle 40 is pulled, including a time-out circuit 74. Both the first and second channels may be connected to independent pitot and static pressure sources (which may be the same sources as ADC1 and ADC2).

The airspeed switch circuit 72 may use a first differential pressure sensor 76 and a first absolute pressure sensor 78 to sense pressure related to the speed of the aircraft 10, and a pair of comparators 80,82 to determine whether the aircraft 10 is at or below the maximum deployment speed. When the aircraft 10 is above the maximum deployment speed, the Deploy Signal may not be sent and/or power may be removed from the igniter switch assembly 44. When the aircraft 10 is at or below the maximum deployment speed, the Deploy Signal may be sent and/or power may be applied to the igniter switch assembly 44. The airspeed switch circuit 72 may be monitored for accuracy by the existing avionics of the aircraft 10.

The time-out circuit 74 may use a second differential pressure sensor 84, a second absolute pressure sensor 86, and a timer 88 to monitor for deceleration during the first few seconds (e.g., between five (5) seconds and ten (10) seconds, or most preferably eight (8) seconds) after the parachute system 30 has been activated. As in step 90, if deceleration is detected, the timer 88 may be reset to allow the aircraft 10 to continue to slow to at or below the maximum deployment speed. If deceleration is not detected, it may be indicative of a system or aircraft malfunction and the parachute assembly 38 may be deployed regardless of the speed of the aircraft 10. As in step 92, even if the aircraft 10 is decelerating, at between twenty (20) and forty (40) seconds, or most preferably at thirty-two (32) seconds, after activation, the Deploy Signal may be sent and/or power may be applied to the extraction system 34 regardless of the speed of the aircraft 10.

In one implementation, the control box component 50 may be an air data measuring circuit mounted in an aft avionic bay of the aircraft 10. Some or all of the functionality of the control box component 50 may be implemented in software executed on a microprocessor, in firmware, or in hardware, or in a combination thereof.

The control box component 50 may include a backup timer 94 configured to ensure deployment in the event of an airspeed activation system failure.

Parachute System: Extraction System

As noted previously, the extraction system 34 is broadly configured to eject the parachute assembly 38 away from the remainder of the aircraft 10 (i.e., away from the aircraft body 12).

In a preferred embodiment, the fuselage 16 of the aircraft 10 defines a fore or front end 16a and an aft or rear end 16b. The nose 12a of the aircraft 10 is disposed at the fore end 16a, while the tail 12b of the aircraft 10 is disposed at the aft end 16b. The nose 12a defines a recess or bay 96. The extraction system 34 is at least substantially housed in the bay 96 prior to deployment. More particularly, in a preferred embodiment, the fuselage 16 includes a cover 98 that encloses the bay 96 and thereby contains the extraction system 34 within the bay 96 prior to deployment. As will be discussed in greater detail below, portions of the extraction system 34 will also remain in the bay 96 after deployment of the parachute assembly 38.

In a preferred embodiment, as illustrated, the extraction system 34 includes an electronic sequencer 100, a projectile object assembly 102 including a projectile object 104, an ejector bag assembly 106, and a load plate 108.

The sequencer 100 is preferably configured both to receive input from the control box 50 and to provide output to the projectile object 104. More particularly, upon the meeting of the deployment conditions elucidated above, the control box 50 sends a deployment signal that is received by the sequencer 100. The sequencer 100 then in turn signals the projectile object 104 to launch via provision of electrical power thereto. As will be discussed in greater detail below, the sequencer 100 also preferably communicates with the ejector bag assembly 106.

Preferably, to ensure inadvertent power is not provided to the projectile object 104 (i.e., to ensure the projectile object 104 is not launched prior to the desired time as indicated by the control box 50), the sequencer 100 (and all other components housed in the bay 96) are electrically isolated from the remainder of the aircraft 10 until the igniter switch assembly 44 is closed.

Projectile Object Assembly

The projectile object assembly 102 is preferably a rocket assembly 102, wherein the projectile object 104 is a rocket 104. However, it is permissible according to some aspects of the present invention for the projectile assembly and object to be of an alternative type. For instance, in contrast to a rocket, the projectile object might be provided with an initial launch velocity but not include onboard power.

The rocket assembly 102 preferably includes a launch tube 110, the rocket 104, a signal receiver 112 (e.g., a printed circuit board 114 and associated components 116), a pick-up collar 118, and a sequencer cable (i.e., a rocket lanyard or cable) 120. The rocket 104 preferably presents a body 122, a motor 124, and an ignition assembly 126.

As discussed in more detail above, launch is initiated upon receipt of a signal from the control box 50. The signal is preferably relayed to the ignition assembly 126 by means of ignition wires 128 that transfer the signal to the signal receiver 112, which in turn communicates with the ignition assembly 126. The ignition assembly 126, upon receipt of the signal, activates the rocket motor 124, resulting in launch of the rocket 104 in a broad sense.

The rocket 104 is preferably disposed at least substantially within the launch tube 110 prior to launch. Preferably, the launch tube 110 includes a generally cylindrical body 130 corresponding to the generally cylindrical rocket body 122, such that the launch tube 110 guides the initial trajectory of the rocket 104.

Preferably, the deployment direction and general trajectory of the rocket 104 are generally orthogonal to and away from the aircraft body 12 as it is positioned at the time of rocket launch, after which time the aircraft body 12 will continue on its own trajectory (likely resulting in the rocket being positioned relatively rearward of the aircraft body 12). The trajectory of the rocket 104 is also preferably both generally straight and consistent or regular. However, it is permissible according to some aspects of the present invention for the direction to vary and for irregularities in the rocket path to be present. More particularly, the desired and actual directions of travel of the rocket will be understood by those of ordinary skill in the art to be dependent upon the particular application and associated conditions. For instance, irregularities in the pyrotechnics or explosives powering the motor will vary its trajectory, as will environmental conditions including wind. The speed of the aircraft in a broad sense will also influence the early stages of rocket deployment. Thus, a desired "generally straight" straight trajectory will likely include at least some angular and/or curvilinear variations.

The rocket 104 is preferably an unguided rocket, although a guided device (e.g., one enabling greater control over the trajectory of the rocket) is also permissible without departing from the scope of some aspects of the present invention.

In a preferred embodiment, the pickup collar 118 includes a generally annular ring 132 and a pair of brackets 134 extending generally axially from the ring 132. The sequencer cable 120 is routed through each of the brackets 134 to present a pair of sequencer cable legs 136,138 having respective ends 136a,138a. The ring 132 is preferably sized and positioned so as to circumscribe the rocket body 122.

Preferably, the rocket body 122 includes a lead end 122a and a trail end 122b. A radially outwardly extending flange 140 is preferably disposed near the trail end 122b. The pickup collar 118 is preferably initially disposed near the lead end 122a.

The sequencer cable legs 136, 138 are preferably coiled for stowage and placed in a coil stowage bag 141. (The cable legs 136 and 138 are removed from the stowage bag 141 in the illustrated embodiment for clarity.)

In a preferred embodiment, the launch tube 110 aids in positioning both of the pickup collar 118 and the signal receiver 112. More particularly, the launch tube 110 further preferably includes a bracket 142 comprising a shelf component 144 and a pillar 146 extending upwardly from the shelf component 144. The pickup collar 118 preferably rests on the shelf component 144, while the pillar 146 and the ignition assembly 126 of the rocket 104 cooperatively support the signal receiver 112. Alternative support schemes are permissible according to some aspects of the present invention, however.

The rocket 104 is preferably a tractor rocket producing approximately two hundred seventy (270) lbs average thrust. The rocket 104 preferably burns for approximately one and seven tenths (1.7) seconds and has a total impulse of approximately four hundred sixty (460) lb-sec.

Travel of the rocket 104 in the deployment direction is preferably at least in part resisted by a rocket bridle 147 fixed to the rocket 104. The rocket bridle 147 will be discussed in greater detail below.

Ejector Bag Assembly

The ejector bag assembly 106 preferably includes an inflatable cushion 148, a plurality of inflators 150 configured to inflate the cushion 148, and an inflator mount 152 positioning and supporting the inflators 150.

More particularly, in a preferred embodiment, the cushion 148 preferably comprises a generally cylindrical fabric bag 154 compressed in such a manner, when the cushion 148 is in a deflated configuration, as to form a plurality of annular overlaid portions 156 (i.e., pleats or folds). Alternatively shaped and/or arranged cushions are permissible according to some aspects of the present invention, however.

The fabric is preferably a heat-resistant fabric and, more preferably, comprises aramid fibers. Most preferably, the fabric is Kevlar®, although one or more alternative or additional fabrics or other flexible, generally gas-impermeable materials may be used without departing from the scope of some aspects of the present invention.

In addition to heat resistance, the fabric preferably provides good properties when subjected to operational pressures.

It is particularly noted that a flexible material of a non-fabric type might also be used without departing the scope of some aspects of the present invention.

The cushion 148 further preferably comprises thread 158 forming a plurality of stitches 160 joining each set of overlaid portions 156. Preferably, the stitches 160 extend annularly through each set of overlaid portions 156, although alternative patterns are permissible.

As will be discussed in greater detail below, such stitches 160 must thus be torn to enable unfolding of the overlaid portions 156 and of the cushion 148 in general, as required for inflation of the cushion 148. It is permissible according to some aspects of the present invention, however, for the thread and stitches to be omitted.

The inflators 150 are preferably gas-generant inflators configured to, upon activation, generate and emit a gas (e.g, nitrogen) into the cushion 148. In a preferred embodiment, the inflators 150 each produce a one and eight tenths (1.8) molar output when one and seventy-five hundredths (1.75) amps are applied for five tenths (0.5) milliseconds. However, alternative performance is permissible and should be tailored to the particular application.

Preferably, three (3) inflators 150a,b,c are provided, although more or fewer (including only one) may be provided without departing from the scope of some aspects of the present invention.

The inflator mount 152 preferably comprises a disk 162 defining a plurality of openings 164 for receiving the inflators 150, although any one of a variety of means of positioning the inflators is permissible without departing from the scope of some aspects of the present invention.

As noted previously, the sequencer 100 is preferably configured both to receive input from the control box 50 and to signal the rocket 104 to launch. The sequencer 100 is also configured to signal the inflators 150 to generate gas.

More particularly, as will be discussed in greater detail below, the extraction system 34 further preferably includes an mechanical connector 166 extending between and interconnecting the rocket 104 and the sequencer 100. The sequencer 100 preferably includes a sequencer box 167. Upon sufficient travel of the rocket 104, the mechanical connector 166 pulls a tang 169 initially mounted to the sequencer box 167 (e.g., by screws 169a but alternatively by other means) away from the sequencer box 167. Such removal activates a switch assembly 171. Thus, in a more specific sense, the mechanical connector 166 extends between and interconnects the rocket 104 and the switch assembly 171.

The switch assembly 171 preferably includes a pair of redundant switch components or contacts 173 that are shiftable from an inactive position to an active position. In the illustrated embodiment, for instance, the contacts 173 when depressed by the tang 169 are in the inactive position and when raised upon release by the tang 169 are in the active position. Alternative styles and/or the use of only a single contact or more contacts are permissible according to some aspects of the present invention, however.

As will also be discussed in greater detail below, activation of the switch 172 by removal of the tang 169 results in signals being passed through inflation wires 175a,b,c (housed in a sheath 177) to activate corresponding ones of the inflators 150a,b,c and initiate inflation of the inflatable cushion 148.

Activation Harness

The mechanical connector 166 is preferably generally continuous in form, although a multi-segmented connector (e.g., chain comprising a plurality of links) is permissible according to some aspects of the present invention.

The mechanical connector 166 is preferably at least substantially flexible to enable folding and unfolding without significant application of force. That is, the mechanical connector 166 preferably comprises a flexible material.

In further detail still, the mechanical connector 166 preferably comprises a flexible strap and, for purposes of clarity will hereafter be referred to as the activation harness 166. The activation harness is preferably generally flat so as to present a generally rectangular lateral cross-section having a greater width than height.

Preferably, the flexible material of the activation harness 166 comprises aramid fibers (e.g., Kevlar®), although other materials may be used without departing from the scope of some aspects of the present invention. Significant strength is preferable, however, as are good thermal performance characteristics.

Figure 16:
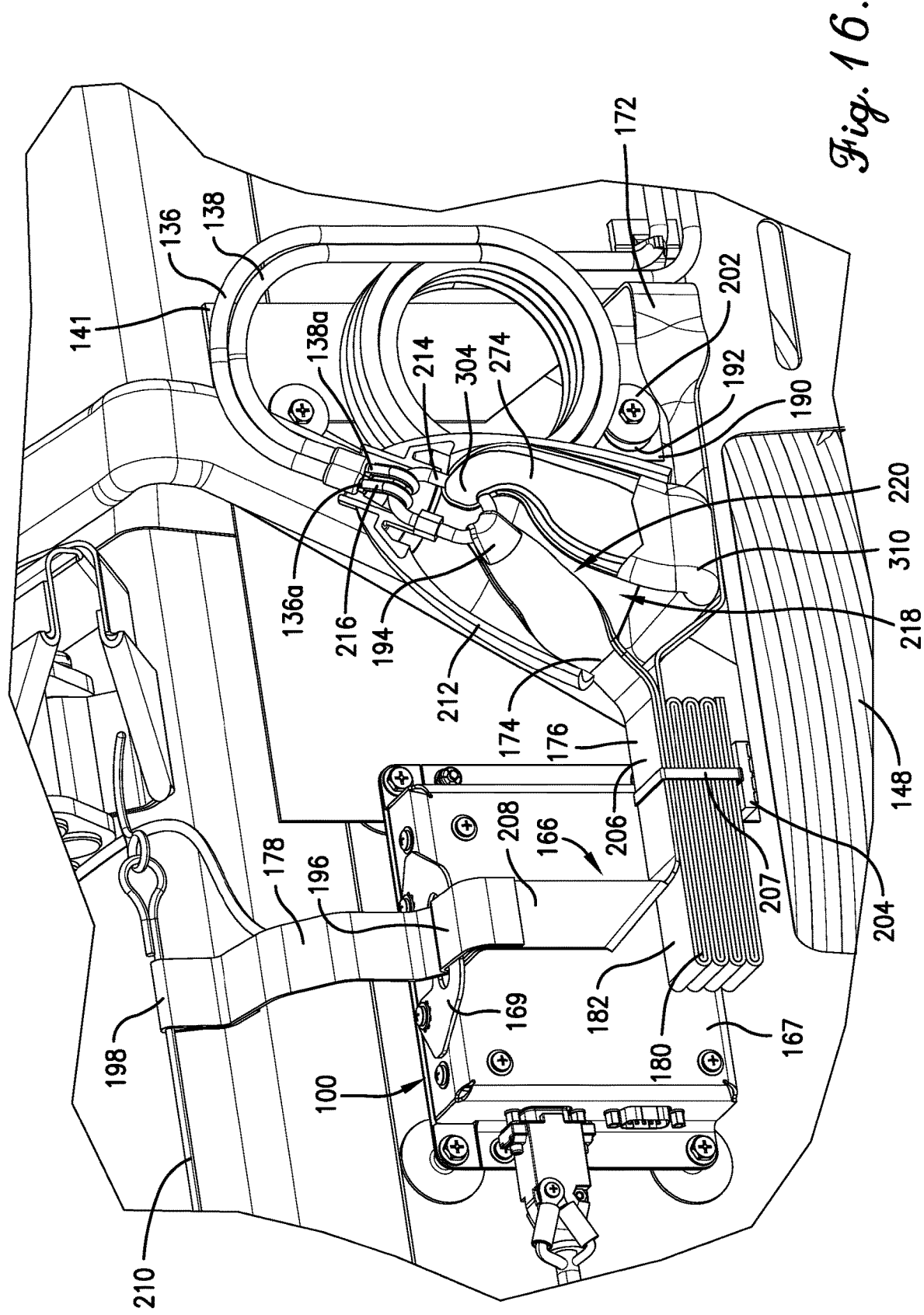
FIG. 16 is an enlarged front perspective view of a portion of the parachute system, particularly illustrating components of the extraction system.
Figure 17:
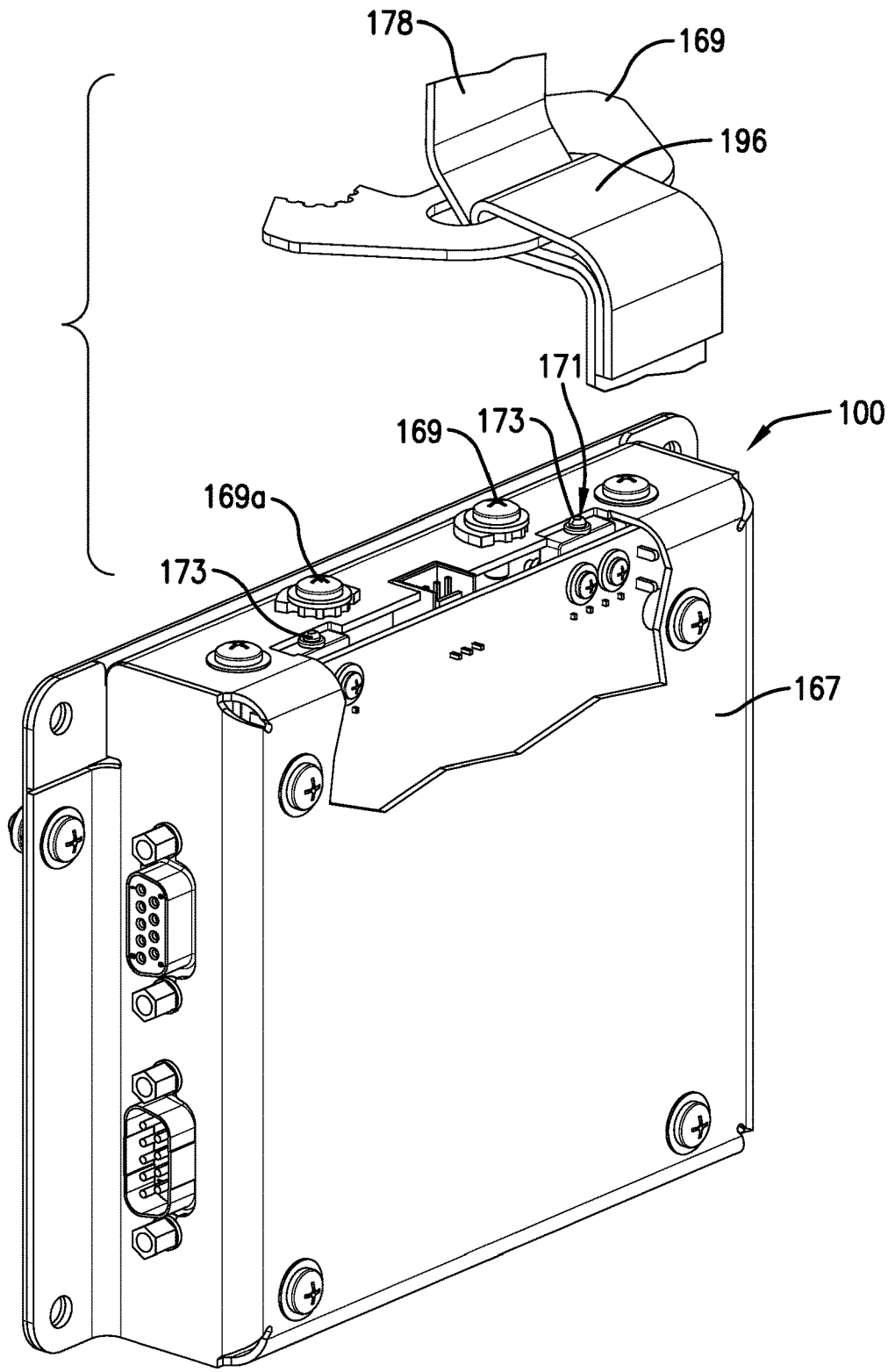
FIG. 17 is an enlarged, partially fragmented and exploded view particularly illustrating the sequencer and activation tang.
Figure 18:
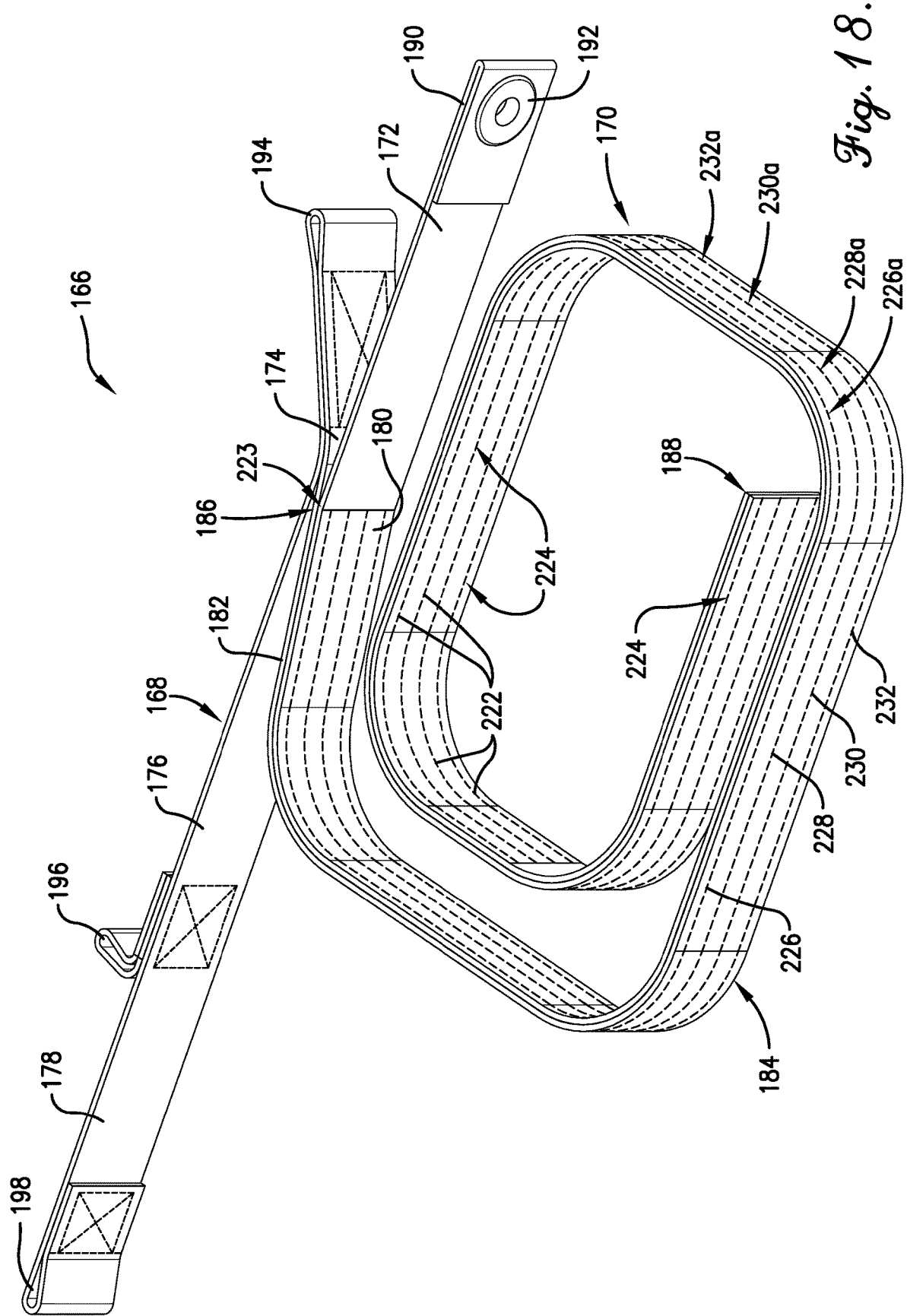
FIG. 18 is a detailed view of the activation harness.
Figure 19:
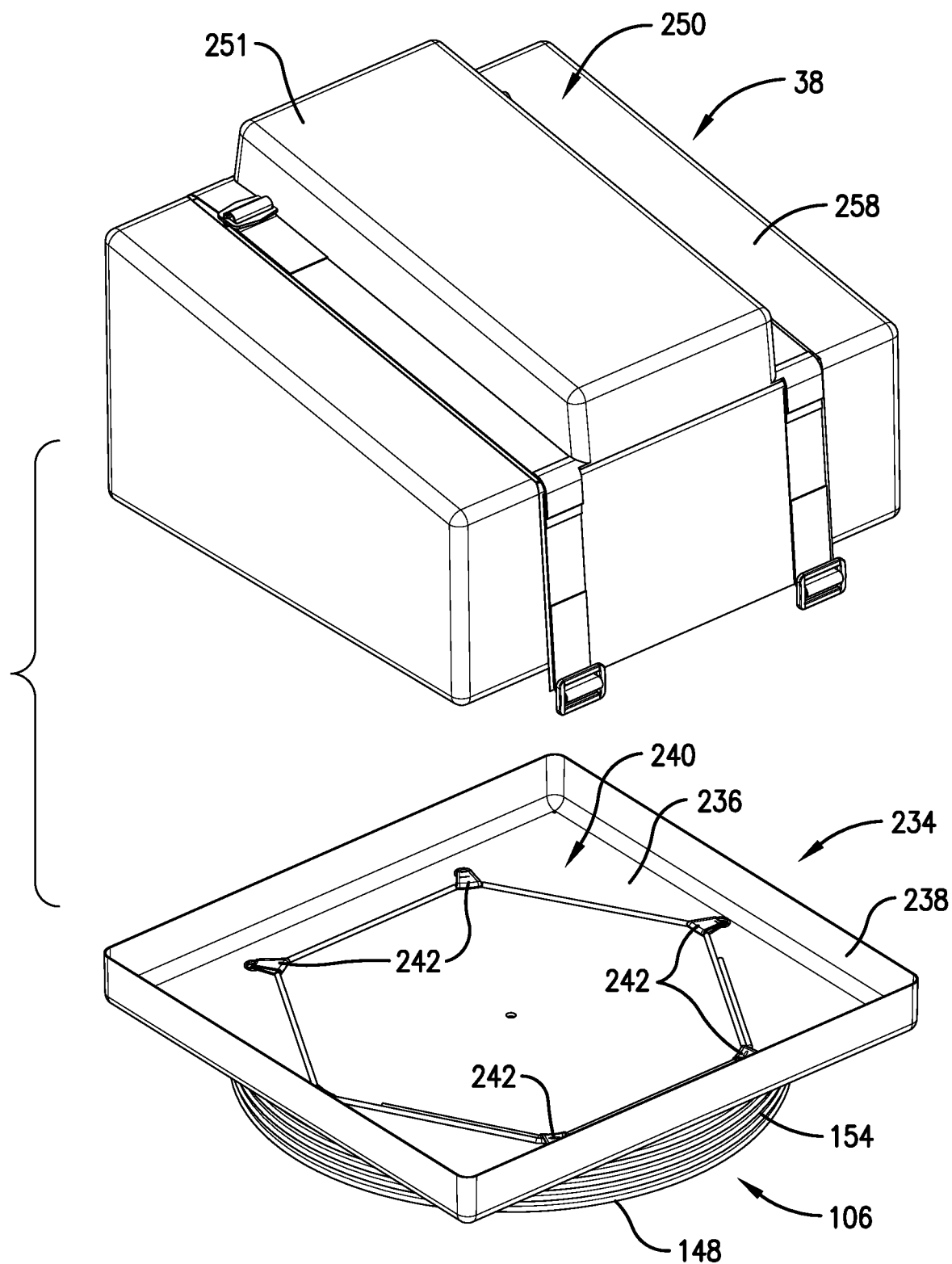
FIG. 19 is a partially exploded top perspective view of the parachute assembly, load plate, and inflatable cushion.
Figure 20:
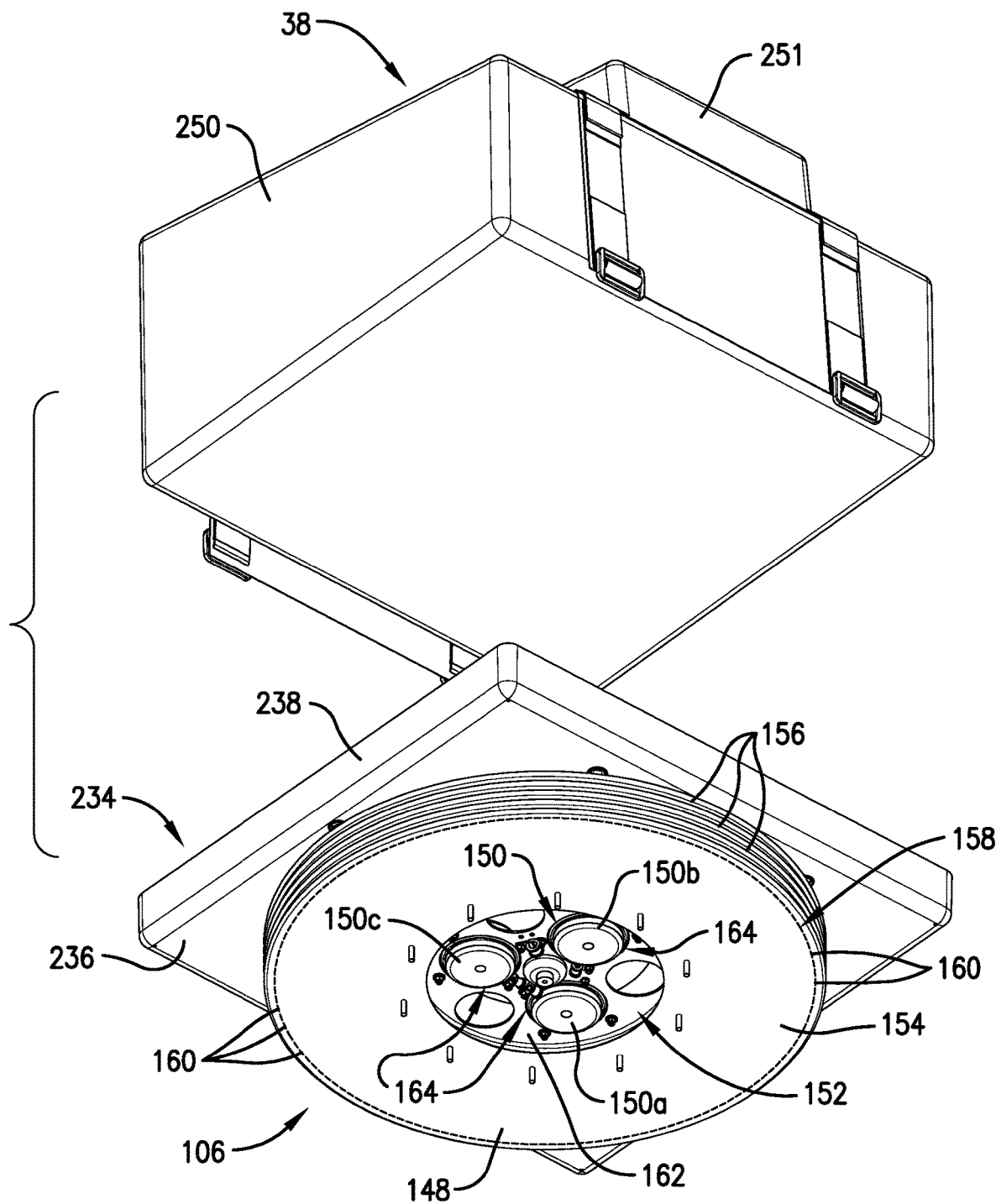
FIG. 20 is a partially exploded bottom perspective view of the parachute assembly, load plate, and inflatable cushion.

In a preferred embodiment, as best shown in FIGS. 16 and 18, the activation harness 166 includes an elongated body 168 and a plurality of appendages extending therefrom. More particularly, the body 168 includes an extendable or incrementally deployable portion 170, an aircraft fixation portion 172, a rocket connection portion 174, a sequencer portion 176, and a parachute release portion 178.

As will be discussed in greater detail below, the deployable portion 170 preferably includes a first portion 180 and said second portion 182 that, when the activation harness 166 is an a stowed position, are fixed to one another along a cooperatively defined joined length 184 thereof. More particularly, the first and second portions 180 and 182 preferably overlie in their entireties each other along the joined length, although offset arrangements are permissible according to some aspects of the present invention.

The first portion 180 is preferably continuously formed with the aircraft fixation portion 172. The second portion 182 is preferably continuously formed with the rocket connection portion 174. Alternatively phrased, the joined length of the deployable portion 170 preferably presents an initiation end 186 and completion end 188 opposite the initiation end. The aircraft fixation portion 172 and the rocket connection portion 174 each preferably extend from the initiation end.

An integrally formed aircraft fixation fold 190 preferably extends from the aircraft fixation portion 172. A grommet 192 is preferably fixed within the aircraft fixation fold 190.

An integrally formed rocket connection loop 194 preferably extends from the rocket connection portion 174.

The sequencer portion 176 preferably extends from the rocket connection end 194, in a direction generally opposite that of the aircraft fixation portion 172. A discrete sequencer loop 196 is preferably fixed to the sequencer portion 176.

The parachute release portion 178 is preferably continuously formed with the sequencer portion 178. Preferably, an integrally formed parachute release loop 198 extends from the parachute release portion 178.

The aircraft body 12 preferably includes a bulkhead 200. When installed in the nose bay 96, the activation harness 166 is preferably secured to the aircraft 10 by means of fixation of the grommet 192 to the bulkhead 200 by a fastener 202. The fastener may be of any suitable type known in the art, including but not limited to screws, bolts, and latches. The activation harness 166 might alternatively or additionally be secured by entirely different means, including but not limited to adhesives, retention pins, etc. associated with the bulkhead or instead with another portion of the aircraft.

The aircraft fixation portion 172 is then preferably routed generally horizontally toward the sequencer 100. A platform 204 preferably extends generally horizontally from the bulkhead 200. The deployable portion 170 is preferably arranged in a zig-zag or boustrophedonic configuration. The zig-zagged portion 170, as well as a segment 206 of the sequencer portion 176, are secured by a fastener 207 such as a zip-tie and placed on the platform 204.

A remaining segment 208 of the sequencer portion 176 is routed substantially vertically along the sequencer 100. The sequencer loop 196 preferably encircles a portion of the activation tang 169. (The tang 169 is preferably slid into the loop 196 prior to being fixed to the sequencer box 176.)

The parachute release portion 178 is preferably routed substantially upwardly from the sequencer box 176, with the parachute release loop 198 encircling a portion of a parachute release mechanism 210 that will be discussed in greater detail below.

Preferably, the rocket connection portion 174 angles generally upwardly away from the zig-zagged deployable portion 170 into a boot 212. Preferably, the rocket connection loop 194 encircles a link 214 disposed inside the boot 212. The cable ends 136a,138a of the legs 136,138 of the sequencer cable 120 are likewise preferably disposed inside the boot 212 and fixed to the link 114 (preferably via encirculation, as illustrated). Thus, the activation cable 166 is mechanically linked to the rocket 104.

More particularly, the boot 212 is preferably shaped in a catenary dome-like manner to present a smaller peak opening 216 and a larger base opening 218 at opposite ends of an interior 220. The rocket connection portion 174 and loop 194 extend into the interior 220 via the base opening 218. In contrast, the cable ends 136a,138a enter the interior 220 via the peak opening 216.

The boot 212 preferably comprises a thermally protective material while also providing physical (i.e., structural) protection to the link 114 and associate connections.

Turning again to the deployable portion 170, as noted previously, the first portion 180 and said second portion 182 are, when the activation harness 166 is an a stowed position, fixed to one another along the cooperatively defined joined length 184. More particularly, in a preferred embodiment, the first and second portions 180 and 182 are stitched to one another along the joined length by a plurality of stitches 222 formed by thread 224.

Preferably, as illustrated, four (4) generally longitudinal rows or lines 226, 228, 230, and 232 of stitches 222 are formed. It is permissible according to some aspects of the present invention, however, for more or fewer lines (including only one line) to be formed. Furthermore, lines might instead extend laterally across the deployable portion, the stitches might be irregularly distributed, and/or the stitches might be in the form of a regular pattern (e.g., a grid).

In a preferred embodiment, the stitches 222 are straight stitches. However, some or all of the stitches might be of alternative types, such as zig-zag stitches or chain stitches.

The lines 226, 228, 230, and 232 are preferably evenly spaced apart and parallel or at least substantially so. However, uneven spacing and non-parallelism are permissible according to some aspects of the present invention.

The lines 226, 228, 230, and 232 preferably extend continuously along the entirety of the joined length 184, from the initiation end 186 to the completion end 188, although a shorter extent and/or internal gaps are permissible according to some aspects of the present invention.

The thread 224 preferably includes four (4) pieces 226a, 228a, 230a, and 232a, each of which forms the stitches 222 of a corresponding one of the lines 226, 228, 230, and 232. However, it is permissible according to some aspects of the present invention for more or fewer threads to be utilized.

The thread pieces 226a, 228a, 230a, and 232a are preferably each of consistent weight along the lengths thereof. Furthermore, the thread pieces 226a, 228a, 230a, and 232a are preferably equal to each other in thread weight. Variations between thread pieces and/or along the lengths thereof are permissible according to some aspects of the present invention, however.

As will be apparent to one of ordinary skill in the art and as will be discussed in greater detail below, separation of the first and second portions 180 and 182 from one another along the joined length 184 requires severance of the stitches 222 at a shiftable tear-out progress point 223. Thus, the stitches 222 provide a resistive force against separation of the first and second portions 180 and 182.

Although joining of the first and second portion 180 and 182 by means of stitching 222 is preferred, it is noted that alternatively means of fixing the portions to one another may additionally or alternatively be provided. For instance, adhesives or glues, interweaving, fasteners, ties, tacks, overmolding, etc. might be used without departing from the scope of some aspects of the present invention.

Furthermore, as will also be discussed in greater detail below, it is noted that the completion end 188 is a cut end (i.e, as opposed to a looped end). Thus, upon the tearing or severance of all of the stitches 222, the first and second portion 180 and 182 will be completely separated from one another. More broadly, the first portion 180 and the aircraft fixation portion 170 will be entirely separated from the second portion 182, the rocket connection portion 174, the sequencer portion 176, and the parachute release portion 178 when the first and second portions 180 and 182 are unjoined.

In a preferred embodiment, the first and second portions 180 and 182 (i.e., the joined length) are each between about thirty (30) inches and about sixty (60) inches long. More preferably, the first and second portions 180 and 182 are each between about forty (40) inches and about fifty (50) inches long. Most preferably, the first and second portions are about forty-six (46) inches long.

The activation harness 166 preferably presents a generally transverse width perpendicular to the length thereof. The width is preferably between about five tenths (0.5) inches and two (2) inches. The width is more preferably between about seventy-five hundredths (0.75) inches and about one and five tenths (1.5) inches. The width is most preferably about one (1) inch.

Variations in dimension are permissible according to some aspects of the present invention, however, with appropriate dimensions being dependent on the particular application.

It is particularly noted that, although the mechanical connector 166 as described herein in preferably a strap-type fabric harness, other configurations fall within the scope of the present invention. Part of all of the connector might be in the form of a cable, chain, linkage, spring element, thong, band, belt, string, sash, girdle, cord, rope, tether, strand, lace, braiding, twine, ribbon, tape, tie, leash, ligature, etc.

Furthermore, as will be discussed in greater detail below, among other things, the activation harness 166 preferably assists in the control of the rocket 104 after launch thereof.

Load Plate

In a preferred embodiment, the extraction system 34 further includes a load plate 234 disposed between the cushion 148 and the parachute assembly 38.

The load plate 234 preferably includes a laterally extending base 236 and a circumferentially extending lip 238 extending generally upwardly from the base 236. The base 236 and the lip 238 thereby cooperatively define a well 240.

Preferably, the base 236 is in the shape of a trapezoid, although other shapes are permissible without departing from the scope of some aspects of the present invention.

As will be discussed in greater detail below, the load plate 234 is configured to aid in relative positioning of the cushion 148 and the parachute assembly 38; provide a protective mechanical, chemical, and thermal barrier between the cushion 148 and the parachute assembly 38, and provide early directional guidance to the parachute assembly 38 as the cushion 148 begins to inflate.

The load plate 234 preferably comprises carbon fiber, although other materials may be used without departing from the scope of some aspects of the present invention. Such materials should possess particularly high heat-resistant properties, however.

In a preferred embodiment, the cushion 148 is fixed to the load plate 234 by means of ties 242, although other securement means (e.g., adhesives, clips, buckles, etc.) may be used.

Parachute System: Parachute Assembly

As noted previously, the parachute system 30 preferably includes an activation system 32, an extraction system 34, a harness system 36, and a parachute assembly 38.

The parachute assembly 38 preferably broadly includes a canopy 244, a plurality of suspension lines 246 fixed to the canopy, a riser 248 fixed to the suspension lines 246, and a deployment bag 250 at least substantially containing the canopy 244, the suspension lines 246, and the riser 248 prior to deployment of the parachute assembly 38.

Most preferably, the parachute assembly 38 further includes a slider 250 for controlling the rate of inflation or expansion of the canopy 244 after deployment.

Canopy

Figure 37:
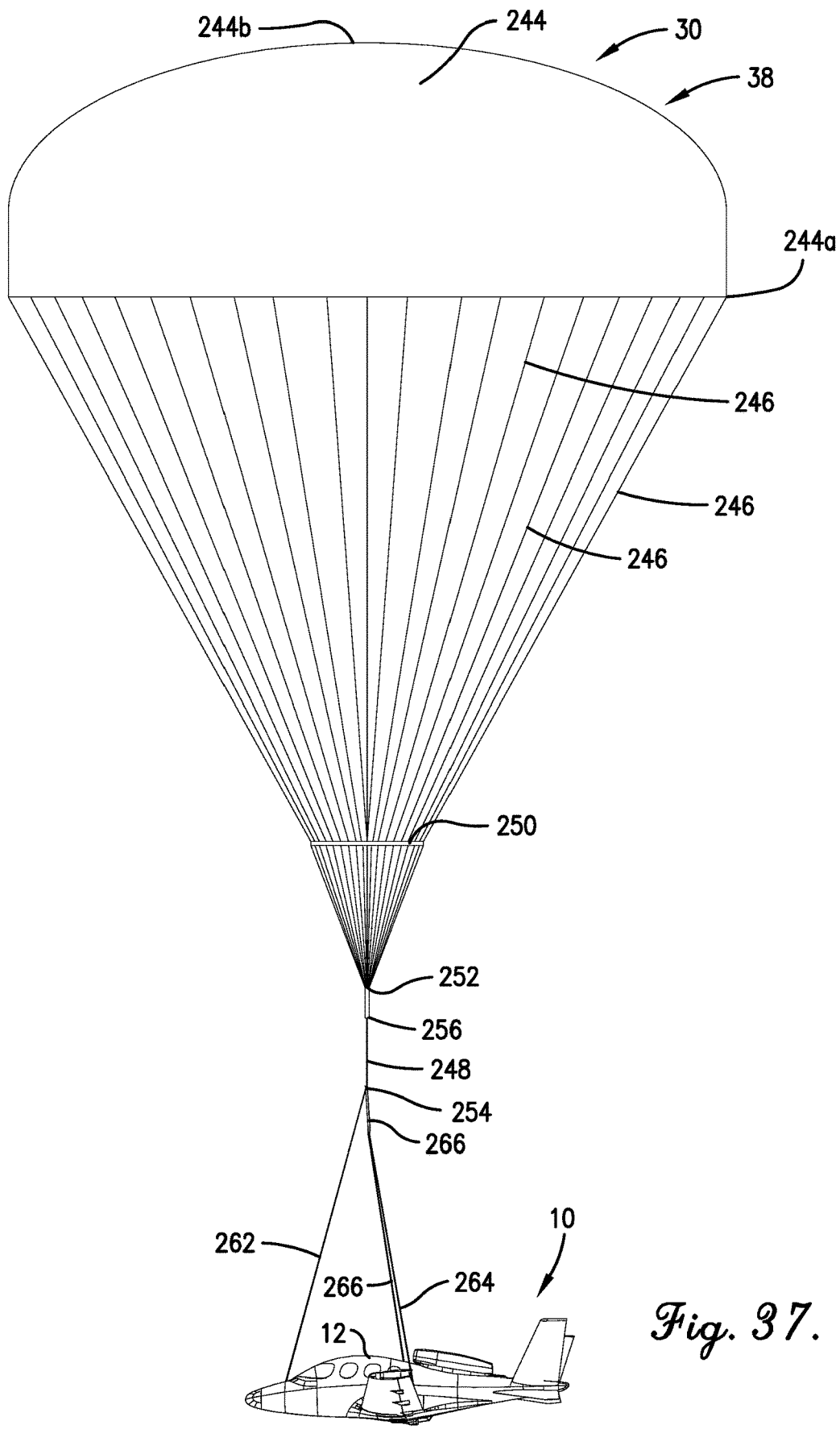
FIG. 37 is a side perspective view of the aircraft in a tenth stage of deployment of the parachute assembly, particularly illustrating a fully inflated canopy and released or expanded snub line.
Figure 38:
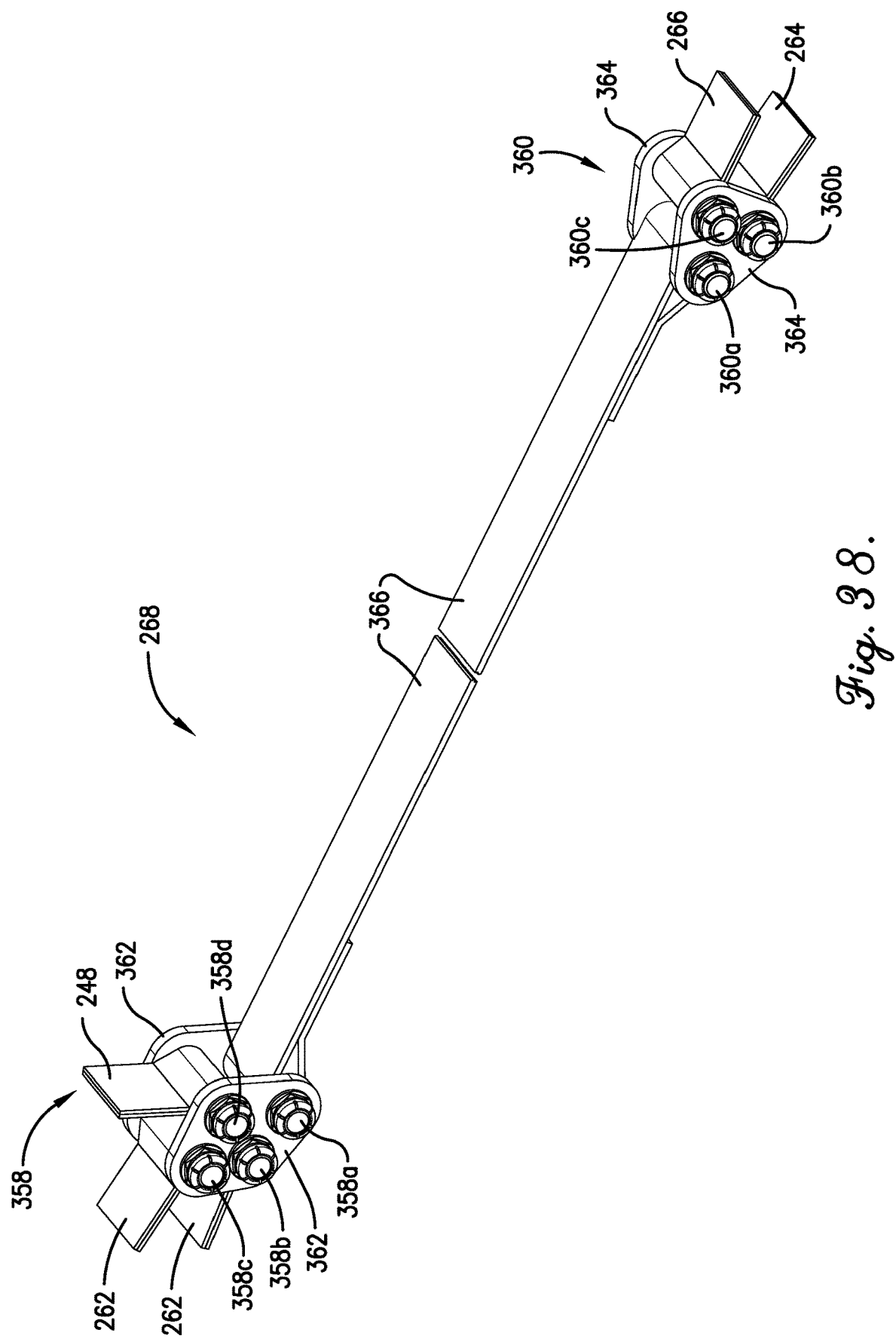
FIG. 38 is a detailed, partially fragmented view of the expanded snub line mechanism as shown in FIG. 37.
Figure 39:
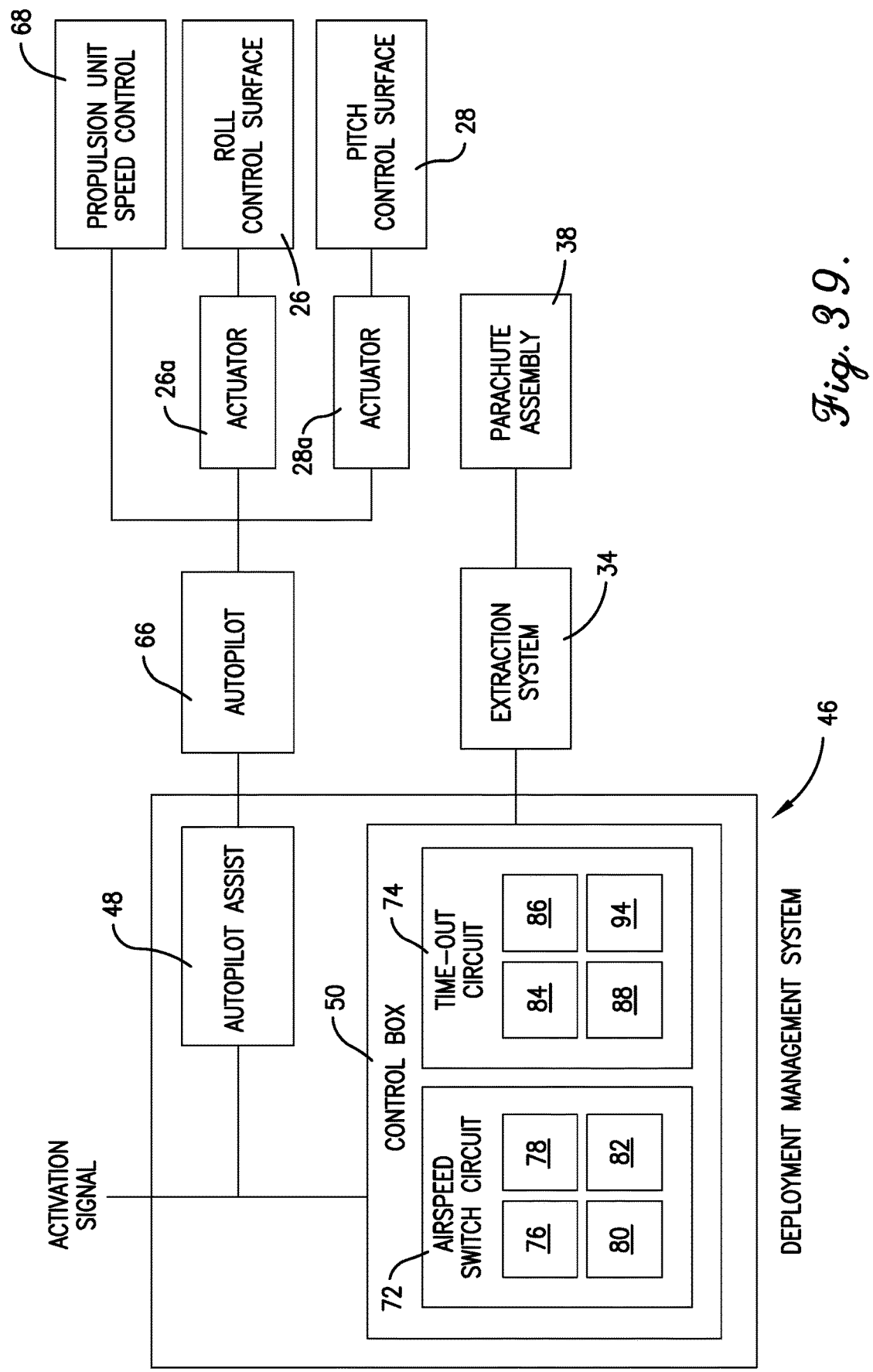
FIG. 39 is a diagram particularly illustrating the deployment management system.
Figure 40:
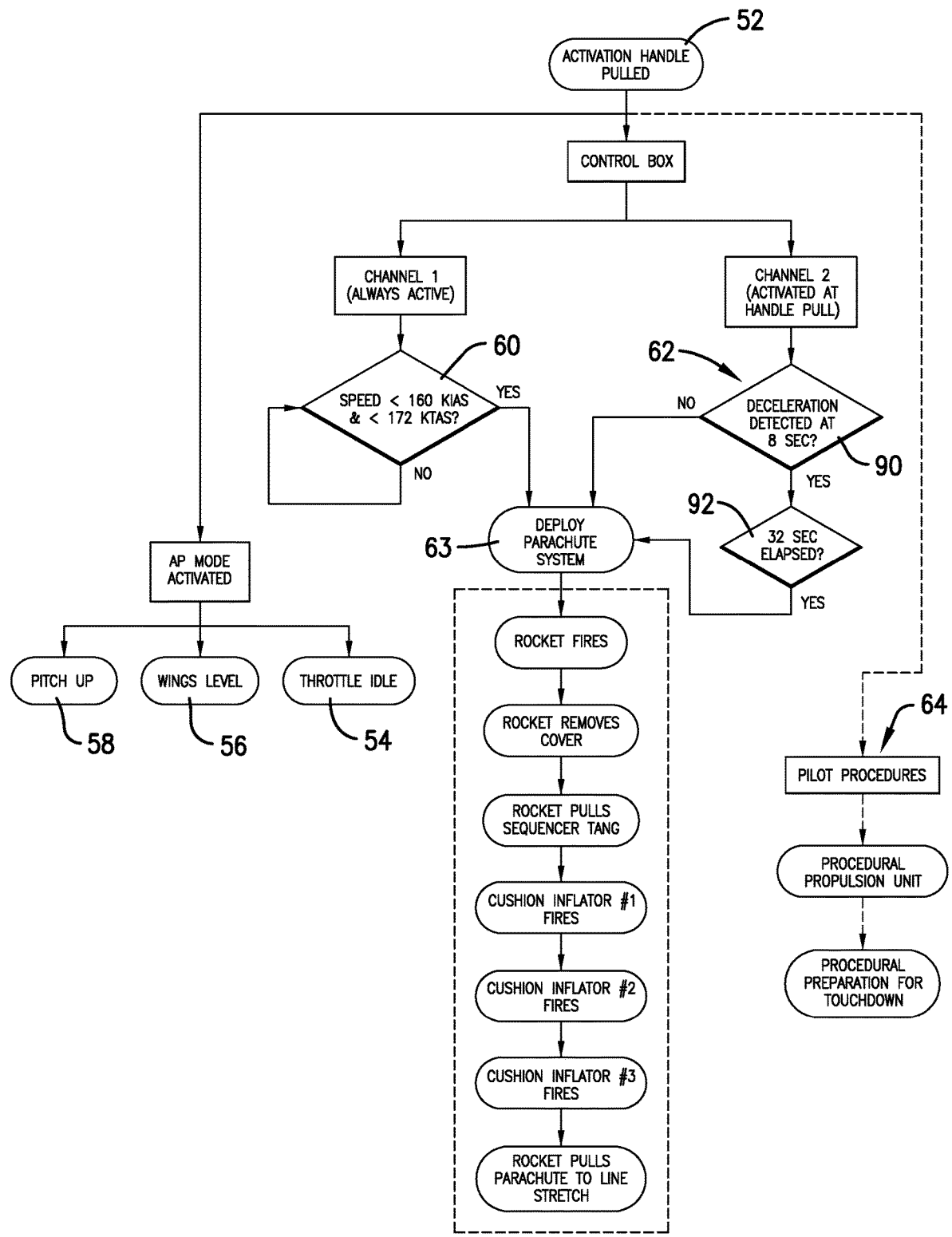
FIG. 40 is a flowchart illustrating operation of the parachute system, including the deployment management system.

As shown in FIG. 37, the canopy 244 when fully inflated is preferably a round, dome-like canopy presenting a radial edge 244a and an apex 244b. The radial edge 244a preferably presents a diameter between about fifty (50) feet and about one hundred thirty (130) feet. The diameter is more preferably between about seventy (70) feet and about one hundred ten (110) feet. The diameter is most preferably about eighty-seven and five tenths (87.5) feet.

When the canopy 244 is fully open, the suspension lines 246 preferably extend from respective connection points at a radially outer margin of the canopy 244 to a common junction 252 spaced axially from the canopy 244. Furthermore, the riser 248 preferably presents a proximal end 254 (nearer to the aircraft 10 after parachute assembly 38 deployment is complete) and a distal end 256 (farther from the aircraft 10 and nearer to the canopy 244 after parachute assembly 38 deployment is complete). The distal end 256 is preferably secured to the suspension lines 246 and the junction 252 by any appropriate means known in the art.

Preferably, the fully open canopy 244 presents a length, measured from the junction 252 to the apex 244b of between about one hundred (100) feet and about one hundred sixty (160) feet. More preferably, the length is between about one hundred fifteen (115) feet and about one hundred forty-five (145) feet. Most preferably, the length is about one hundred thirty (130) feet.

The canopy 244 is preferably non-steerable, although canopies with steering capabilities are not precluded from the scope of the present invention.

The canopy 244 preferably comprises and eighty (80) gore fabric, although other gores and/or material types are permissible according to some aspects of the present invention.

Deployment Bag

The deployment bag 250, as noted previously, at least substantially contains the canopy 244, the suspension lines 246, and the riser 248 prior to deployment of the parachute assembly 38. The deployment bag 250 also preferably functions to pay out the canopy 244, the suspension lines 246, and the riser 248 during the deployment process, as will be discussed in greater detail below.

The deployment bag 250 is preferably generally wedge-shaped in form, although other geometries are permissible according to some aspects of the present invention. Preferably, however, the shape of the bag 250 corresponds with that of the load plate 234. That is, the deployment bag 250 is preferably sized and shaped to fit securely into the well 240, with the lip 238 both circumscribing and engaging the deployment bag 250 (and thus also circumscribing the packet canopy 244). Any shifting of the deployment bag 250 (e.g., during the deployment process, as will be described below), will preferably result in directional guidance being provided to the bag by means of the lip 238, which effectively acts as a bumper or barricade preventing lateral shifting.

In a preferred embodiment, the deployment bag 250 includes a main body 258 and a plurality of straps 260 fixed to and extending from the main body 258. Preferably, the straps 260 connect to the rocket bridle 147 which, in turn, is fixed to the rocket 104. Thus, the rocket 104 and the deployment bag 250 are interconnected.

Parachute System: Harness System

In a broad sense, as previously discussed, the parachute system 30 preferably includes an activation system 32, an extraction system 34, a harness system 36, and a parachute assembly 38. The harness system 36 preferably includes the aforementioned rocket bridle 147, a fore or front harness 262, pilot and copilot aft or rear harnesses 264 and 266, and a snub line mechanism 268.

Rocket Bridle

In a preferred embodiment, the rocket bridle 147 is at least substantially flexible to enable folding and unfolding without significant application of force. That is, the rocket bridle 147 preferably comprises a flexible material.

In further detail still, the rocket bridle 147 preferably comprises a flexible strap. The rocket bridle 147 is preferably generally flat so as to present a generally rectangular lateral cross-section having a greater width than height.

Preferably, the flexible material of the rocket bridle 147 comprises aramid fibers (e.g., Kevlar®), although other materials may be used without departing from the scope of some aspects of the present invention. Significant strength is preferable, however, as are good thermal performance characteristics.

Figure 27:
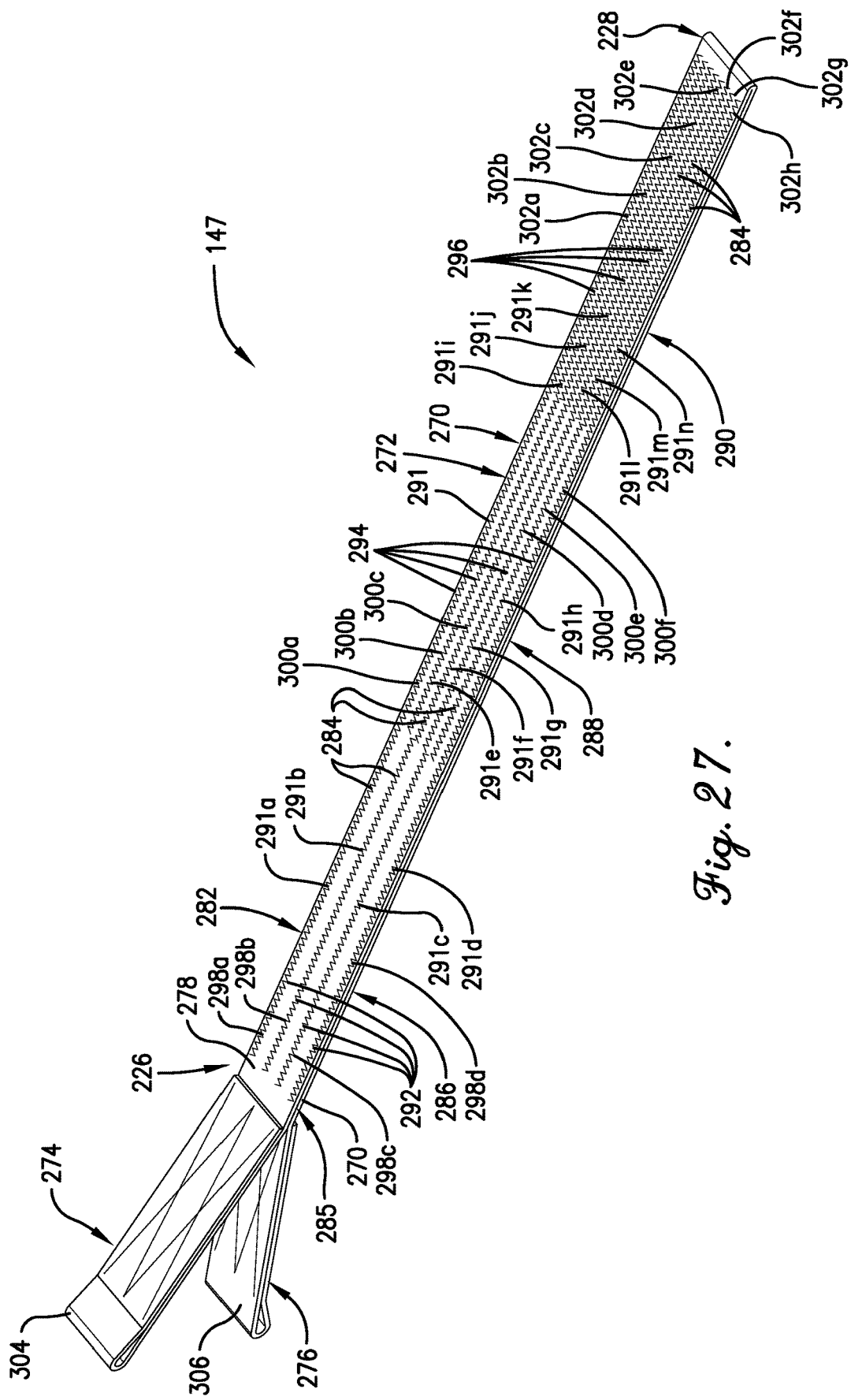
FIG. 27 is a detailed view of the rocket bridle.

In a preferred embodiment, as best shown in FIG. 27, the rocket bridle 147 includes an elongated body 270 and a plurality of appendages extending therefrom. More particularly, the body 270 includes an extendable or incrementally deployable portion 272, a projectile portion 274, and a parachute portion 276.

As will be discussed in greater detail below, the deployable portion 272 preferably includes a first portion 278 and a second portion 280 that, when the rocket bridle 147 is in a stowed position, are fixed to one another along a cooperatively defined joined length 282 thereof. More particularly, the first and second portions 278 and 280 preferably overlie each other in their entireties along the joined length, although offset arrangements are permissible according to some aspects of the present invention.

In greater detail still, in a preferred embodiment, the first and second portions 278 and 280 are stitched to one another along the joined length 282 by a plurality of stitches 284 formed by thread 286.

As will be apparent to one of ordinary skill in the art and as will be discussed in greater detail below, separation of the first and second portions 278 and 280 from one another along the joined length 282 therefore requires severance of the stitches 284 at a shiftable tear-out ptoress point 285. Thus, the stitches 284 provide a resistive force against separation of the first and second portions 278 and 280. Alternatively stated, a force must be applied to the rocket bridle 147 to separate the first and second portions 278 and 280 from one another along the joined length 282.

In a preferred embodiment, the rocket bridle 147 is configured such that separation of the first and second portions 278 and 280 from one another along the joined length 282 provides increasing resistive forces against travel of the rocket 104 or, alternatively stated, requires increasing levels of force to be applied to the bridle 147 for separation to occur along the length 282.

More particularly, the joined portion or length 282 preferably includes an initiation segment 286, an intermediate segment 288, and a completion segment 290. The intermediate segment 288 preferably extends between and interconnects the initiation and completion segments 286 and 290, respectively. Preferably, a first force is necessary to effect separation along the initiation segment 286, a second force is necessary to effect separation along the intermediate segment 288, and third force is necessary to effect separation along the completion segment 290. The third force is preferably greater than the second force, which is preferably greater than the first force.

In a preferred embodiment, the initiation segment 286 is longer than the intermediate segment 288 and the completion segment 290, although alternative relative dimensioning is permissible according to some aspects of the present invention.

Preferably, the stitches 284 are grouped into sets 292, 294, 296 corresponding to the segments 286, 288, 290. More particularly, the stitches 284 of set 292 preferably form a first plurality of generally longitudinal rows or lines 298a-d through the initiation segment 286. The stitches 284 of set 294 preferably form a second plurality of generally longitudinal rows or lines 300a-f through the intermediate segment 288. The stitches 284 of set 296 preferably form a third plurality of generally longitudinal rows or lines 302a-h through the completion segment 290. Thus, four (4) lines 298 of stitches 284 are preferably formed through the initiation segment 286; six (6) lines 300 of stitches 284 are preferably formed through the intermediate segment 288; and eight (8) lines 302 of stitches 284 are preferably formed through the completion segment 290.

The provision of an increasing number of lines from segment 286 to segment 288 and from segment 288 to segment 290 preferably results in increasingly secure fixation of the first and second portions 278 and 280 along the length 282 thereof. Thus, as noted above and as will be described in greater detail below, separation of the first and second portions 278 and 280 from one another along the joined length 282 provides increasing resistive forces against travel of the rocket 104.

In a preferred embodiment, the stitches 284 are zig-zag stitches. However, some or all of the stitches might be of alternative types, such as straight stitches or chain stitches.

The lines 298a-d, the lines 300a-f, and the lines 302a-h are preferably evenly spaced apart and parallel or at least substantially so. However, uneven spacing and non-parallelism are permissible according to some aspects of the present invention.

The lines 298a-d, the lines 300a-f, and the lines 302a-h each preferably extend continuously along the entirety of the corresponding segment 286, 288, or 290, respectively, although shorter extents and/or internal gaps are permissible according to some aspects of the present invention.

In the illustrated embodiment, the stitches 284 are formed of thread 291 including fourteen (14) pieces 291a-n, with the piece 291a and the piece 291d forming stitches 284 along the entire joined length 282. It is permissible for more or fewer threads, including only a single thread, to be provided, however.

The pieces 291a-n preferably are each of consistent weight along the lengths thereof. Furthermore, the thread pieces 291a-n are preferably equal to each other in thread weight. Variations between thread pieces and/or along the lengths thereof are permissible according to some aspects of the present invention, however.

Although generally parallel, longitudinal lines are preferred, lines might instead extend laterally across the joined length, the stitches might be irregularly distributed, and/or the stitches might be in the form of a regular pattern (e.g., a grid).

As discussed for the activation harness 166 above, it is noted that alternative or additional means may also be provided to secure the first and second portions 278 and 280 along the joined length.

Furthermore, as will also be discussed in greater detail below, it is noted that opposite initiation and completion ends 226 and 228 can be defined along the joined length 282. The completion end 228 is preferably a looped or folded (i.e., continuous, non-cut) end, such that upon the tearing or severance of all of the stitches 284, the first and second portions 278 and 280 will simply extend continuously with one another rather than being severed entirely from one another.

Thus, it is noted that the body 270 is extendable to a maximum extension that is approximately twice its original state. Furthermore, based on the presence and location of the stitches 284, the body 270 begins to resist travel of the projectile object or rocket 104 in the deployment direction when extension of the body 270 is less than twenty (20) percent of its maximum extension and, more preferably, when extension of the body 270 is less than five (5) percent of its maximum extension. Most preferably, resistance to travel of the projectile object or rocket 104 commences substantially simultaneously with extension of the body 270.

In a preferred embodiment, the first and second portions 278 and 280 (i.e., the joined length) are each between about ten (10) inches and about fifty (50) inches long. More preferably, the first and second portions 278 and 280 are each between about twenty (20) inches and about forty (40) inches long. Most preferably, the first and second portions are about thirty (30) inches long.

The rocket bridle 147 preferably presents a generally transverse width perpendicular to the length thereof. The width is preferably between about one (1) inch and about three (3) inches. The width is more preferably between about one and five tenths (1.5) inches and about two and five tenths (2.5) inches. The width is most preferably about two (2) inches.

Variations in dimension are permissible according to some aspects of the present invention, however, with appropriate dimensions being dependent on the particular application.

As noted previously, the bridle 147 preferably interconnects the projectile object or rocket 104 and the parachute assembly 38. More particularly, the bridle 147 preferably includes a projectile end 304 and a parachute end 306. Both ends 304 and 306 are preferably initially disposed adjacent the initiation segment 286.

As best shown in FIG. 16, the projectile end 304 is preferably looped around the link 214 disposed inside the boot 212, so as to consequently be connected to the rocket 104 via the legs 136,138 of the sequencer cable 120. Thus, after launch of the rocket 104 and as discussed in greater detail below, separation of the stitches 284 applies a resistive force to the rocket 104.

It is noted that the bridle 147 is also likewise linked to the activation cable 166 via the link 214.

Figure 9:
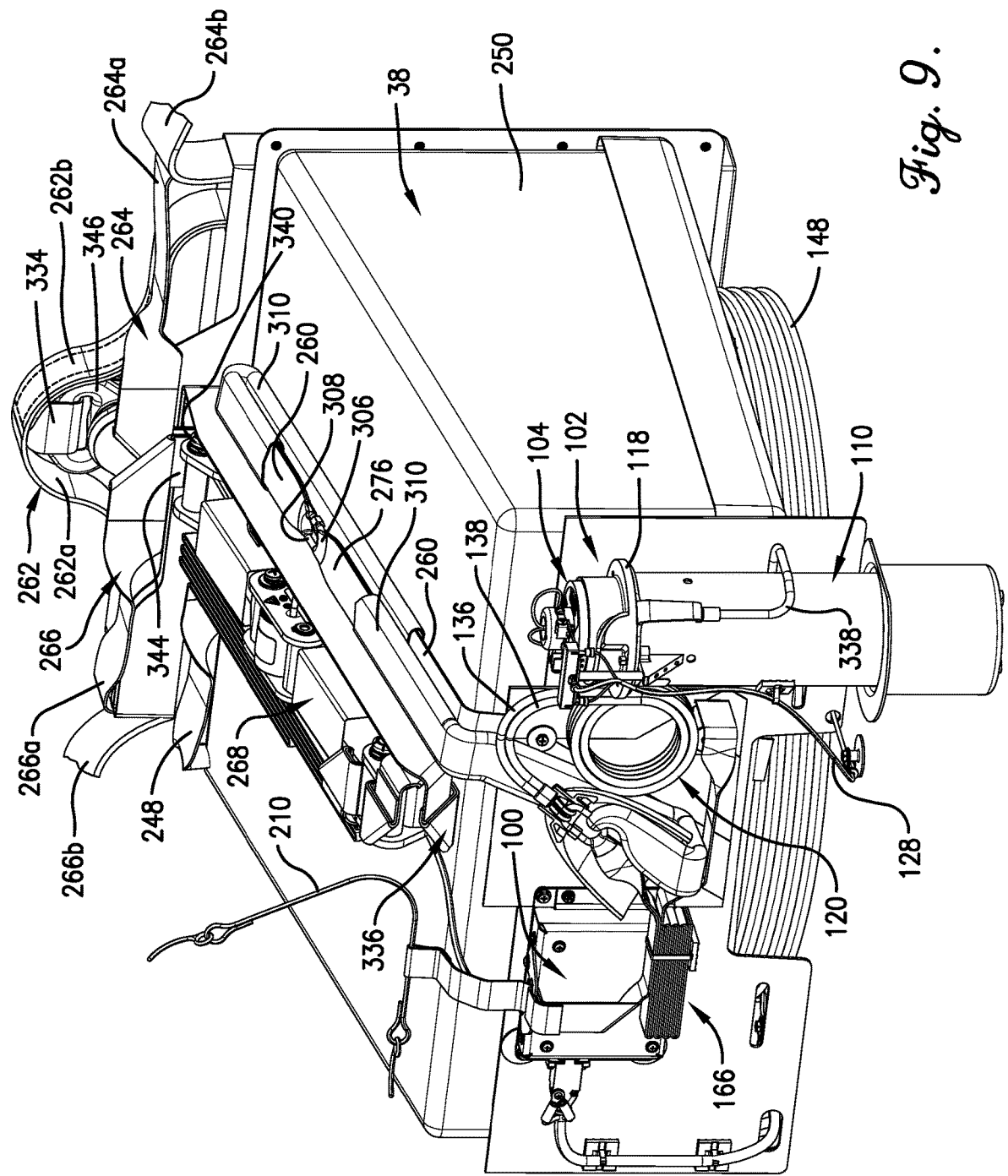
FIG. 9 is a top, front perspective view of the parachute system.
Figure 10:
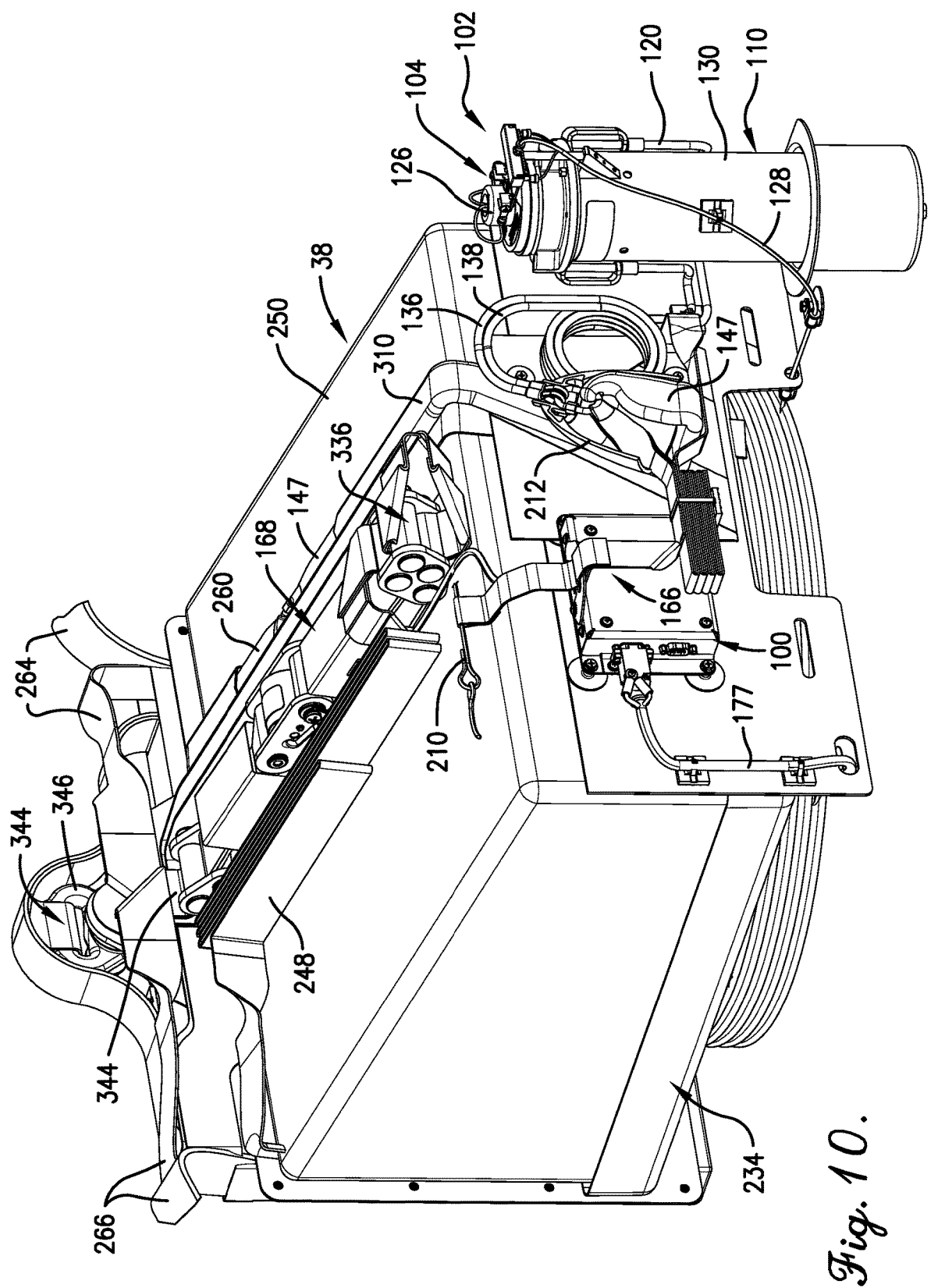
FIG. 10 is an alternative top, front perspective view of the parachute system.
Figure 11:
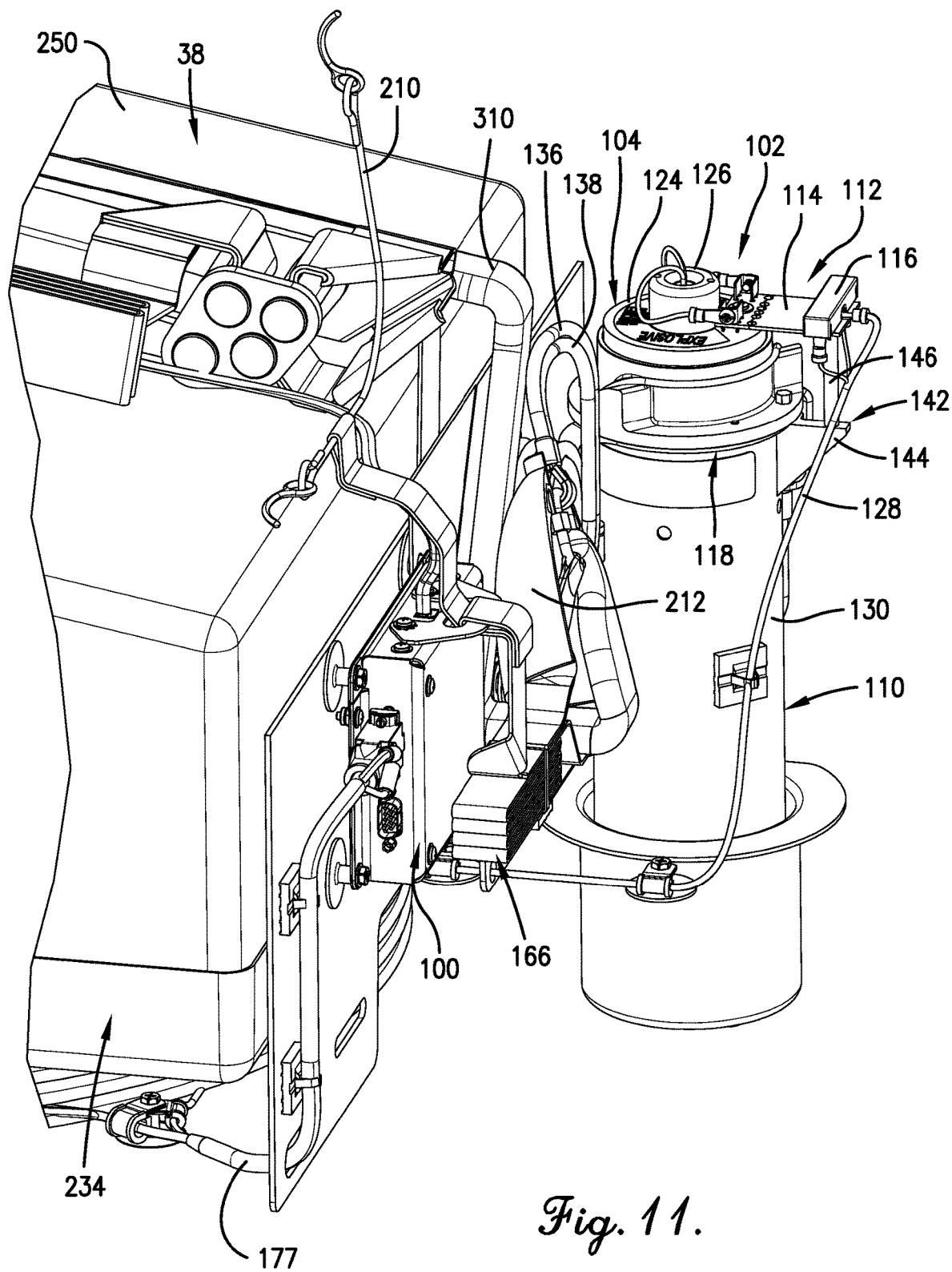
FIG. 11 is an enlarged front perspective view of a portion of the parachute system, particularly illustrating components of the extraction system.

As best shown in FIG. 9, the parachute end 306 is preferably secured to the deployment bag straps 260 by means of a link 308. Alternative link mechanisms may be provided, however. Thus, the rocket 104 is connected to the parachute assembly 38 by means of the rocket bridle 147.

Although connection of the bridle 147 to the parachute assembly 38 (and, more particularly, the deployment bag straps 260) is preferred, it is noted that, according to some aspects of the present invention, the bridle might be alternatively fixed at its proximal end. For instance, in an alternative embodiment, the bridle might include an aircraft end rather than a parachute end, with the aircraft end being secured to the aircraft body. Launch and subsequent travel of the rocket would still result in separation of the stitches and application of a resistive force to the rocket, as discussed briefly above.

In a preferred embodiment, a sheath 310 is provided about the rocket bridle 147. In the illustrated embodiment, the sheath 310 extends along the entirety of the rocket bridle 147 and also along a portion of the deployment bag straps 260. Greater or lesser extents are permissible according to some aspects of the present invention, however.

The sheath 310 preferably provides both mechanical or physical protection and thermal protection to the bridle 147.

The sheath 310 preferably comprises a flexible material and more preferably comprises a fabric material. The fabric is preferably a heat-resistant fabric and, more preferably, comprises aramid fibers. Most preferably, the fabric is Kevlar®, although one or more alternative or additional fabrics may be used without departing from the scope of some aspects of the present invention.

It is particularly noted that a flexible material of a non-fabric type might also be used without departing from the scope of some aspects of the present invention.

It is particularly noted that, although the bridle 147 as described herein is preferably a strap-type fabric harness, other configurations fall within the scope of the present invention. Part of all of the connector might be in the form of a cable, chain, linkage, spring element, thong, band, belt, string, sash, girdle, cord, rope, tether, strand, lace, braiding, twine, ribbon, tape, tie, leash, ligature, etc.

Front and Rear Harnesses

The front harness 262 and the rear harnesses 264 and 266 preferably act to interconnect the parachute assembly 38 to the aircraft body 12. When the parachute assembly 38 has been deployed and the canopy 244 is open, the interconnection is such that the harnesses 262,264,266 suspend or support the aircraft body 12 from the canopy 244.

The front and rear harnesses 262,264,266 may largely be configured in keeping with common knowledge in the art, although certain preferred features are described herein.

Figure 12:
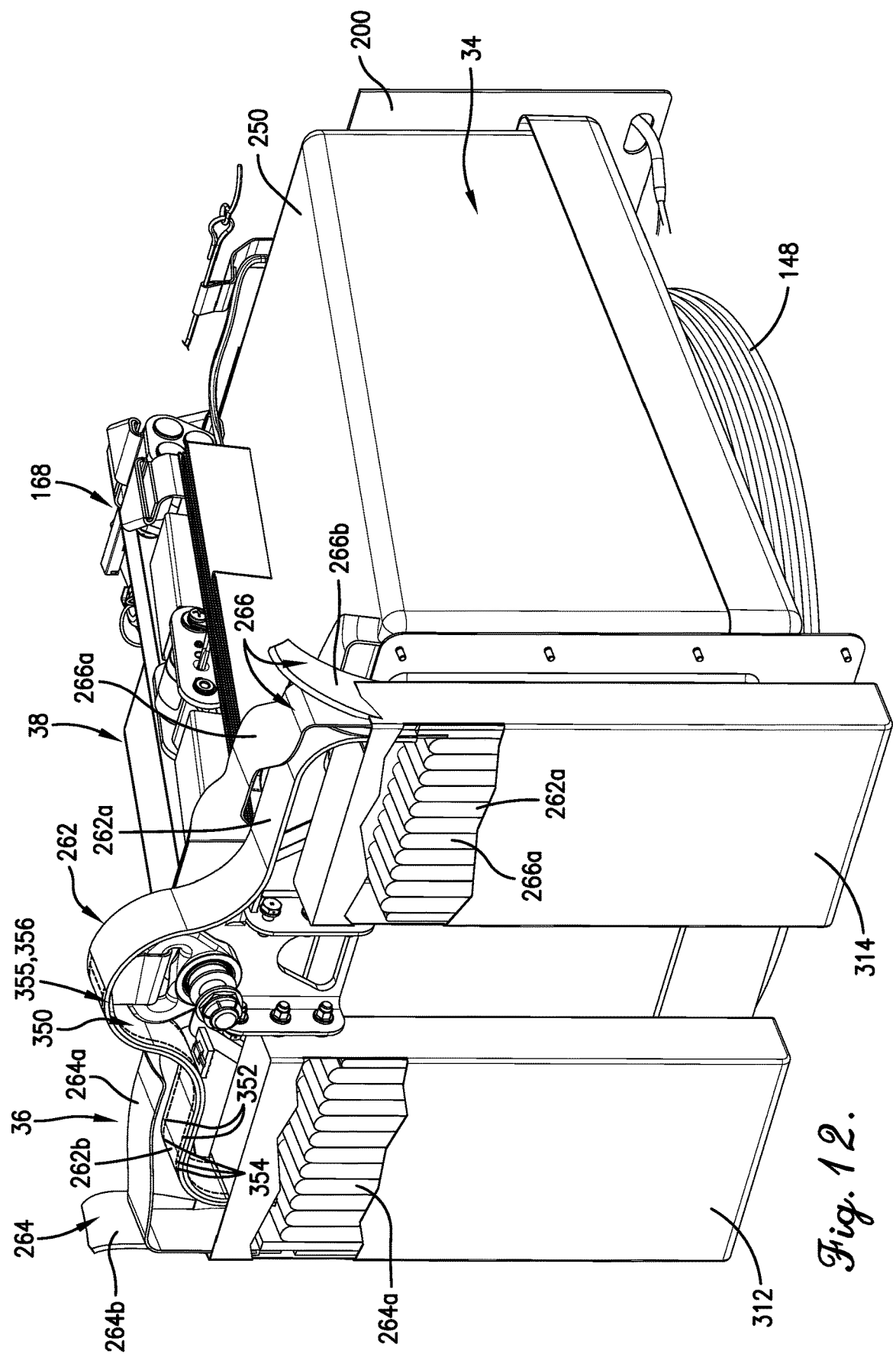
FIG. 12 is a rear perspective view of the parachute system, particularly illustrating portions of the harness system.
Figure 13:
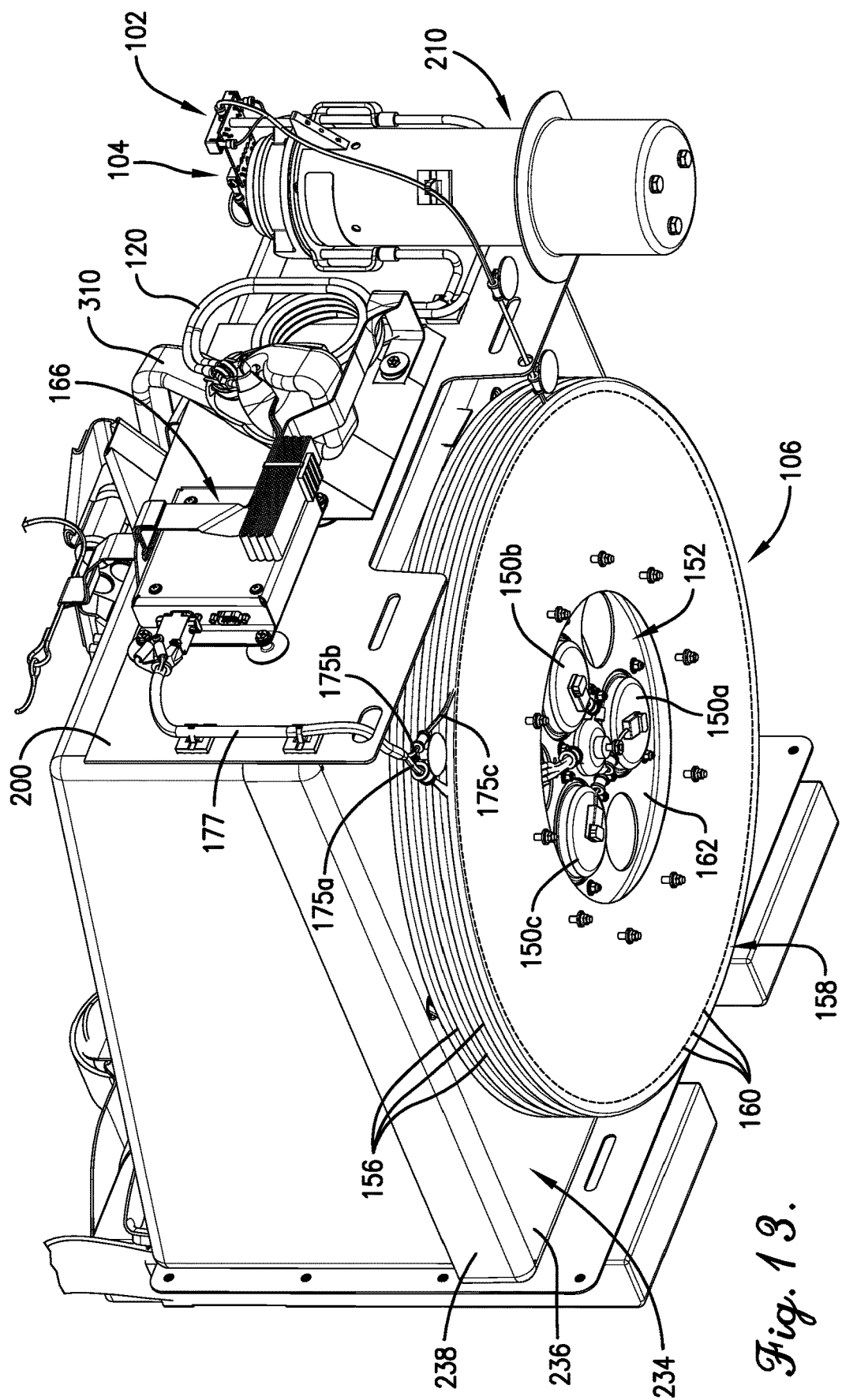
FIG. 13 is a bottom perspective view of the parachute system, particularly illustrating portions of the extraction system.
Figure 14:
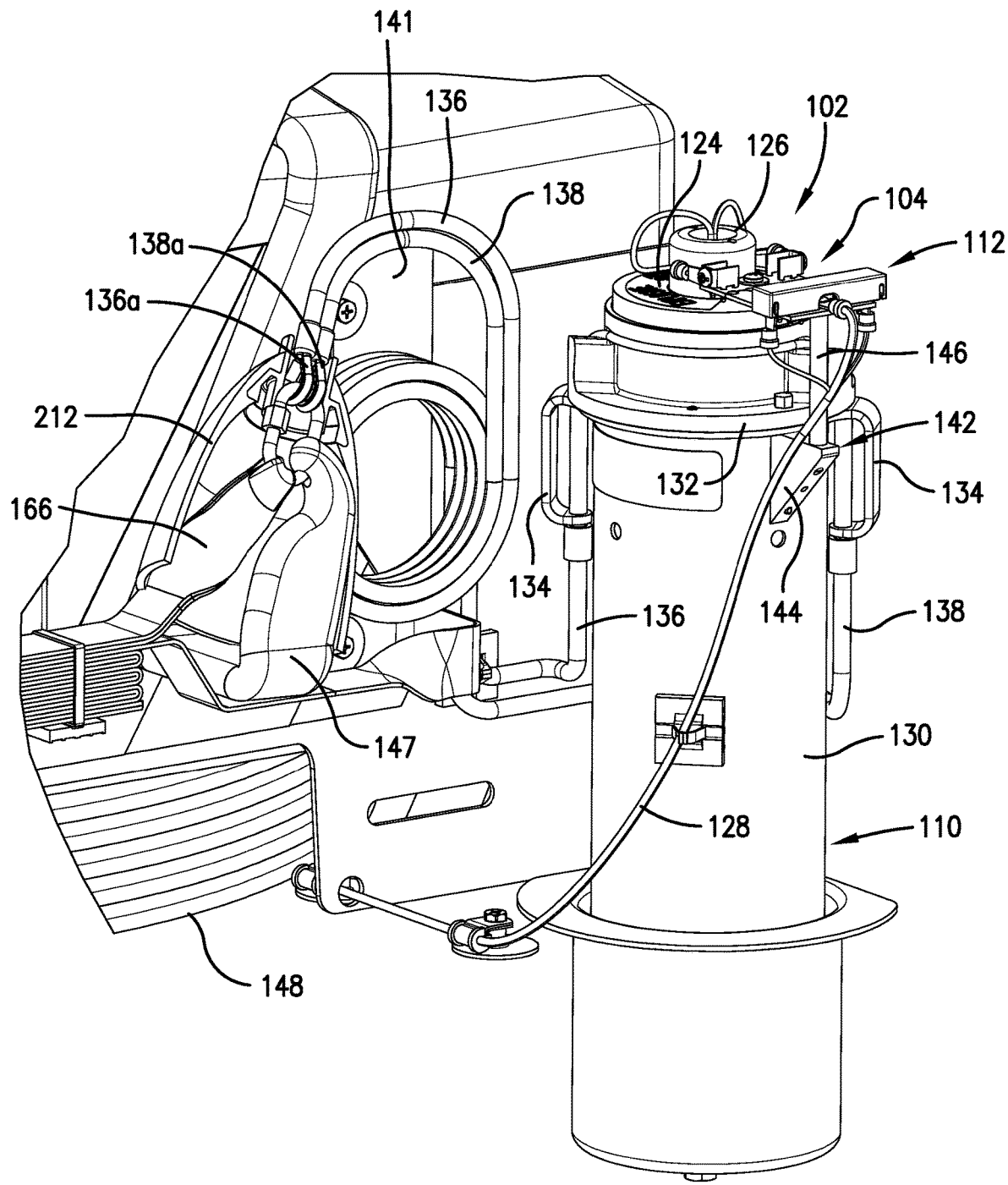
FIG. 14 is an enlarged front perspective view of a portion of the parachute system, particularly illustrating components of the extraction system.
Figure 15:
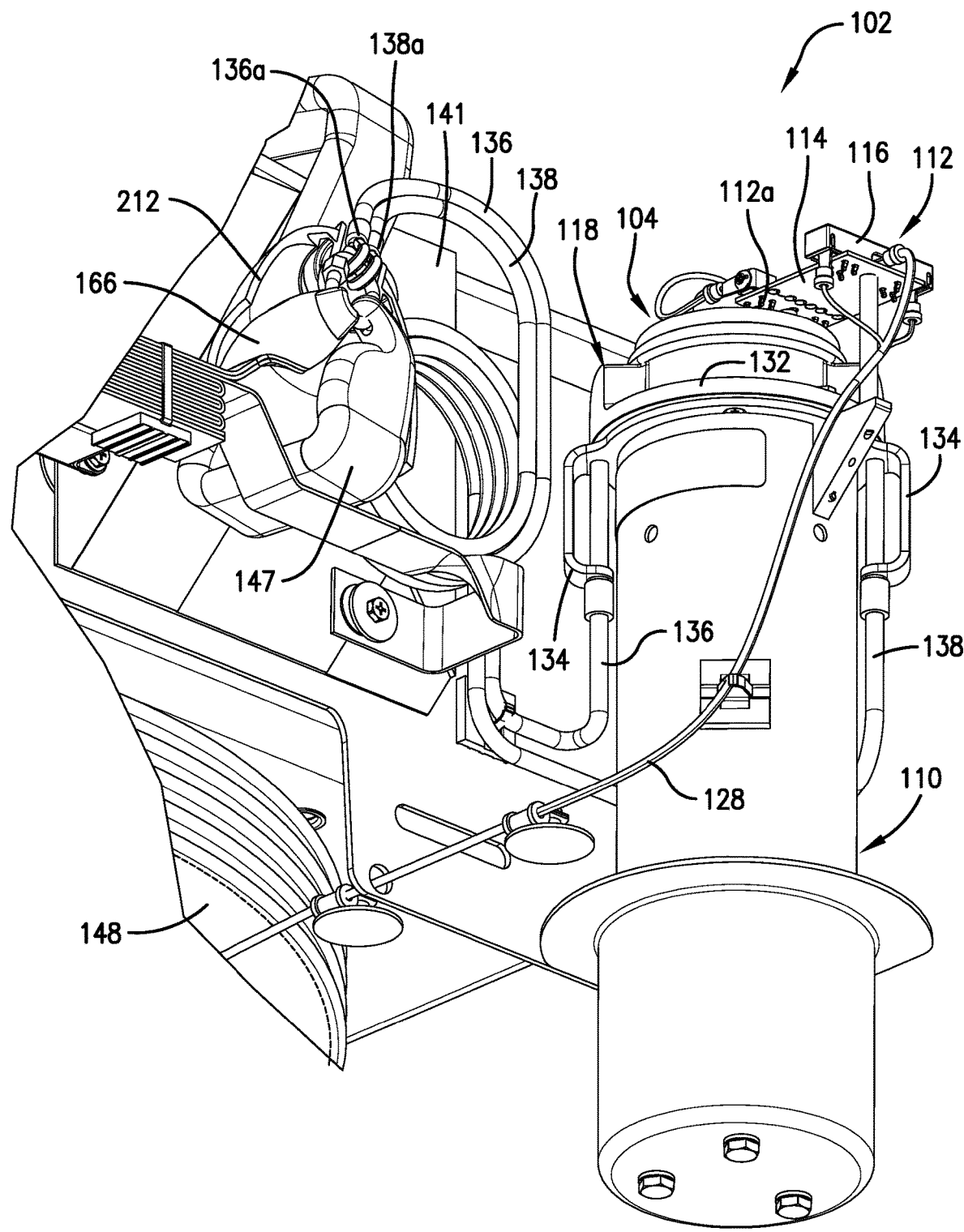
FIG. 15 is an alternative view of the components of the extraction system shown in FIG. 14.

For instance, as best shown in FIG. 12, in a preferred embodiment, the harnesses 262,264,266 are in part stowed in pilot and copilot stow bags 312 and 314, respectively. (Routing of the harnesses 262,264,266 therein is shown only schematically in the figures.) More particularly, in a preferred embodiment, the front harness 262 includes a first portion 262a and a second portion 262b. The pilot rear harness 264 includes a first portion 264a and a second portion 264b. The copilot rear harness 266 includes a first portion 266a and a second portion 266b. The first portion 262a of the front harness 262 and the first portion 266a of the copilot rear harness 266 are preferably substantially stowed in the copilot stow bag 314. The second portion 262b of the front harness 262 and the first portion 264a of the pilot rear harness 264 are preferably substantially stowed in the pilot stow bag 312.

Remaining portions of the rear harnesses 264,266 (i.e., the second portions 264b,266b) are preferably routed along the aircraft body 12 as illustrated. More particularly, the second portions 264b,266b preferably included respective nose portions 316,318; belly portions 320,322; and wing/body portions 324,326. Furthermore, the aircraft 10 preferably includes a nose fairing 328, a belly fairing 330, and a wing/body fairing 332. The nose portions 316,318 are preferably routed under the nose fairing 328; the belly portions 320,322 are preferably routed under the belly fairing 330; and the wing/body portions 324,326 are preferably routed under the wing/body fairing 332.

The front harness 262 preferably presents a proximal or aircraft end 334 and a distal or parachute end 336. The pilot rear harness 264 preferably presents a proximal or aircraft end 338 and a distal or parachute end 340. The copilot rear harness 266 preferably presents a proximal or aircraft end (not shown) and a distal or parachute end 344.

The front harness aircraft end 334 is preferably fixed to a bracket or loop 346 secured to the aircraft body 12. The front harness parachute end is preferably fixed to the snub line mechanism 268, as will be discussed in greater detail below.

The rear harness aircraft ends 338 and 342 are preferably fixed to respective brackets 348 (one shown) secured to the aircraft body 12. The rear harness parachute ends 340 and 344 are preferably fixed to the snub line mechanism 268, as will be discussed in greater detail below.

In a preferred embodiment, the front harness 262 includes an incrementally deployable portion 350 similar in nature to the deployable portion 170 discussed above with respect to the activation harness 166 and the deployable portion 272 discussed above with respect to the rocket bridle 147. It is noted that, with certain exceptions to be discussed in detail below, many of the concepts and details associated with the deployable portion 350 are the same as or very similar to those described in detail above in relation to the deployable portions 170 and 272. Therefore, for the sake of brevity and clarity, redundant descriptions will be generally avoided here. Unless otherwise specified, the detailed descriptions presented above with respect to the deployable portions 170 and 272 should therefore be understood to apply at least generally to the deployable portion 350 as well.

With particular regard to the deployable portion 350 of the front harness 262, however, it is noted that the portion 350 comprises at least substantially the entirety of the second portion 262b of the front harness 262. Preferably, two (2) lines 352 of stitches 354 are formed therethrough, such that deployment of the second portion 262b generates a resistive force (or, alternatively stated, requires an application of force to tear or sever the stitches 354 at a shiftable tear-out progress point 355). Such a configuration is useful to prevent dumping and excessive slack during deployment.

Preferably, the deployable portion 350 presents a commencement end 356 adjacent the bracket 346 and a termination end (not shown) inside the pilot stow bag 312. Similar to that of the rocket bridle 147, the termination end is preferably looped or folded such that completion of the tear-out process simply results in continuous extension of the second portion 262b.

Snub Line Mechanism

The snub line mechanism 268 is preferably initially disposed in a pocket of the deployment bag 250.

Figure 21:
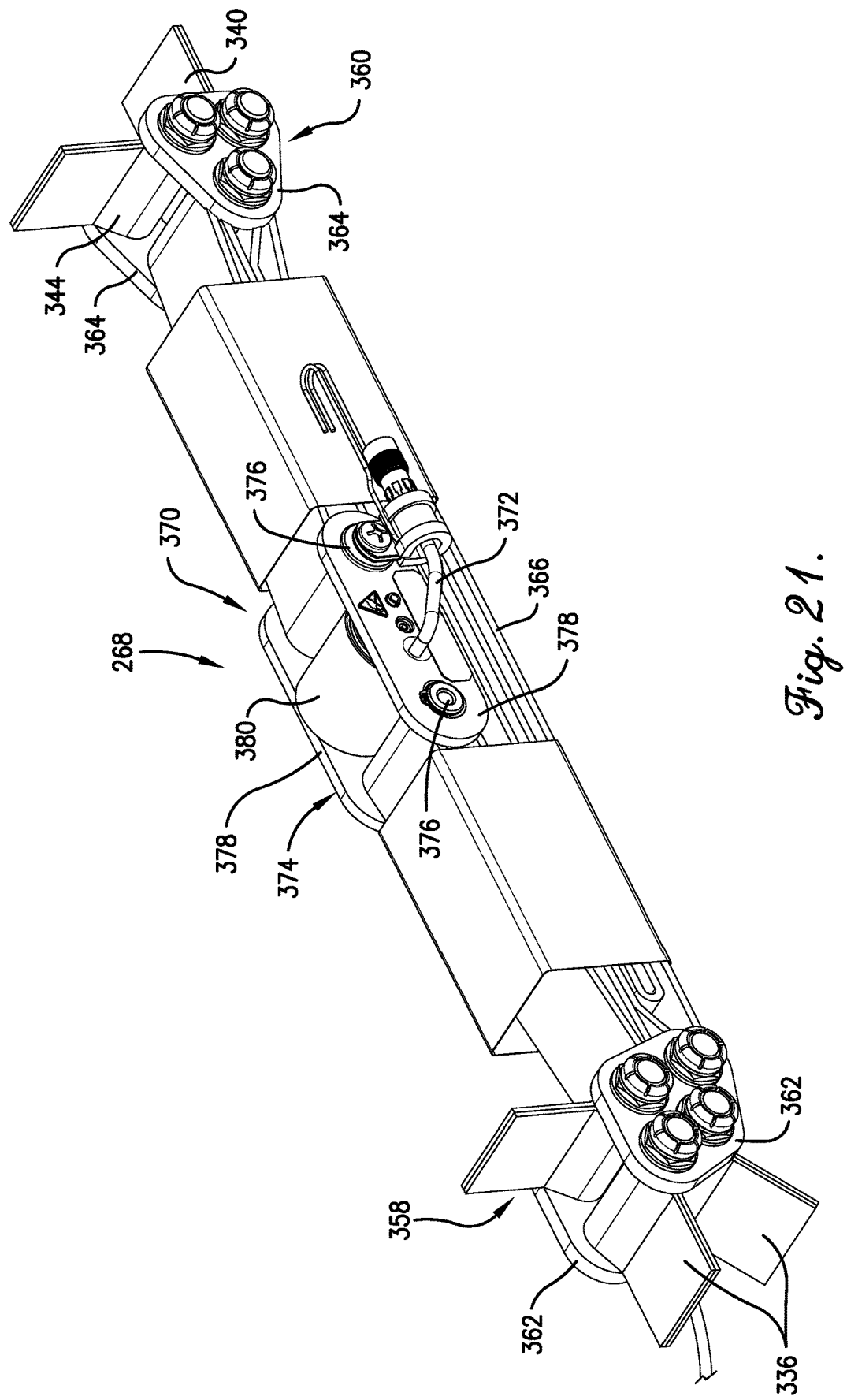
FIG. 21 is a detailed view of the snub line mechanism.
Figure 22:
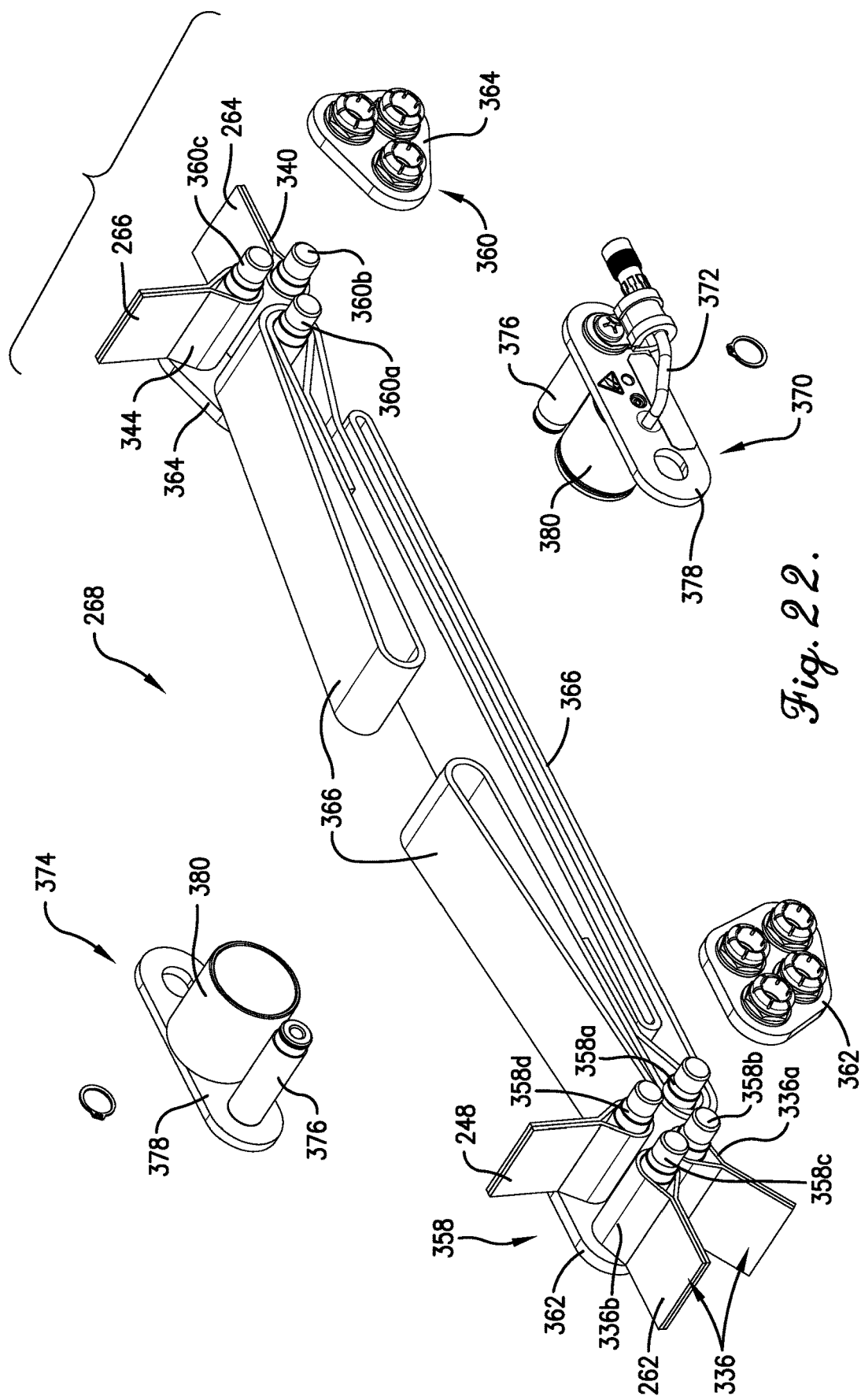
FIG. 22 is a detailed, partially exploded view of the snub line mechanism.
Figure 23:
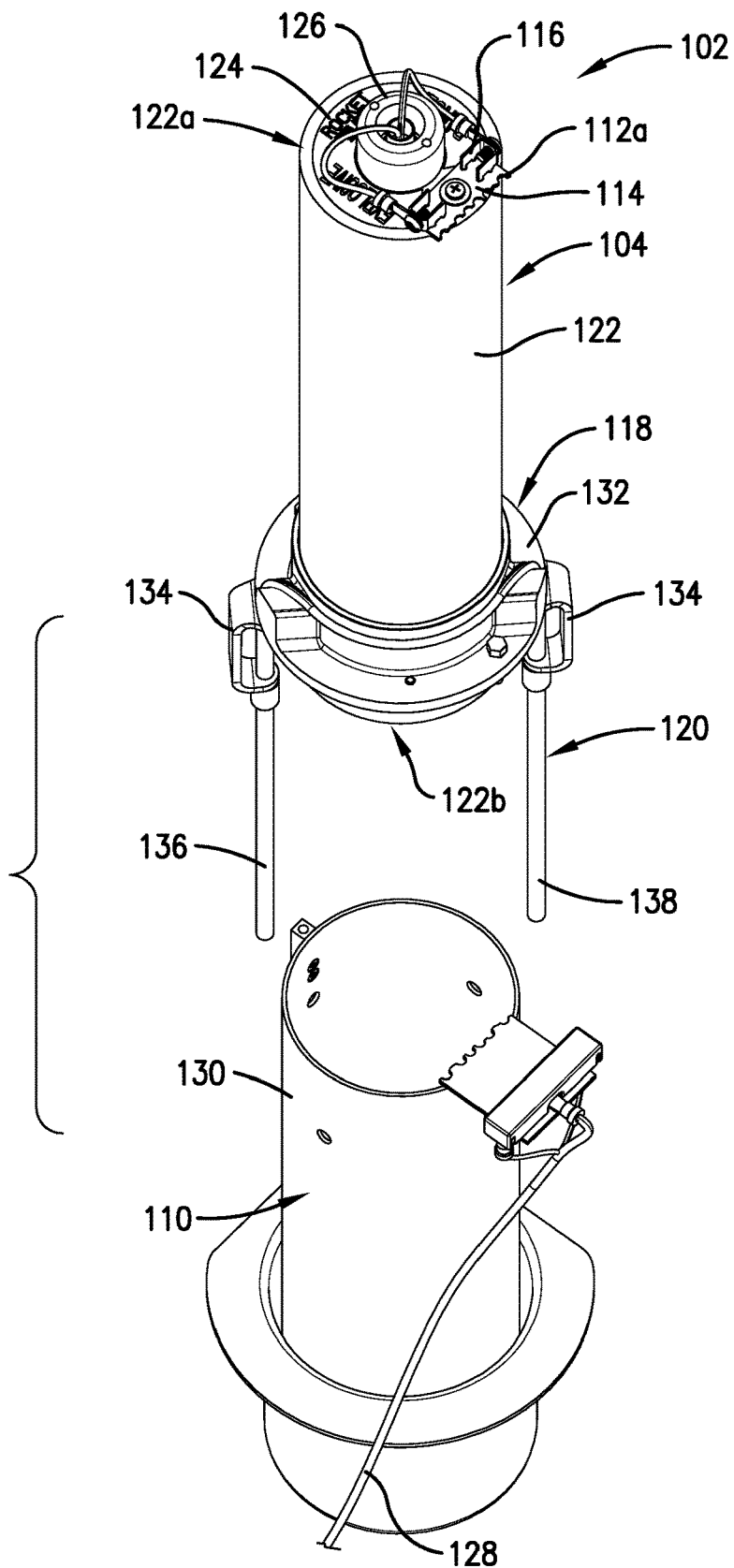
FIG. 23 is a partially exploded top perspective view of the rocket assembly.
Figure 24:
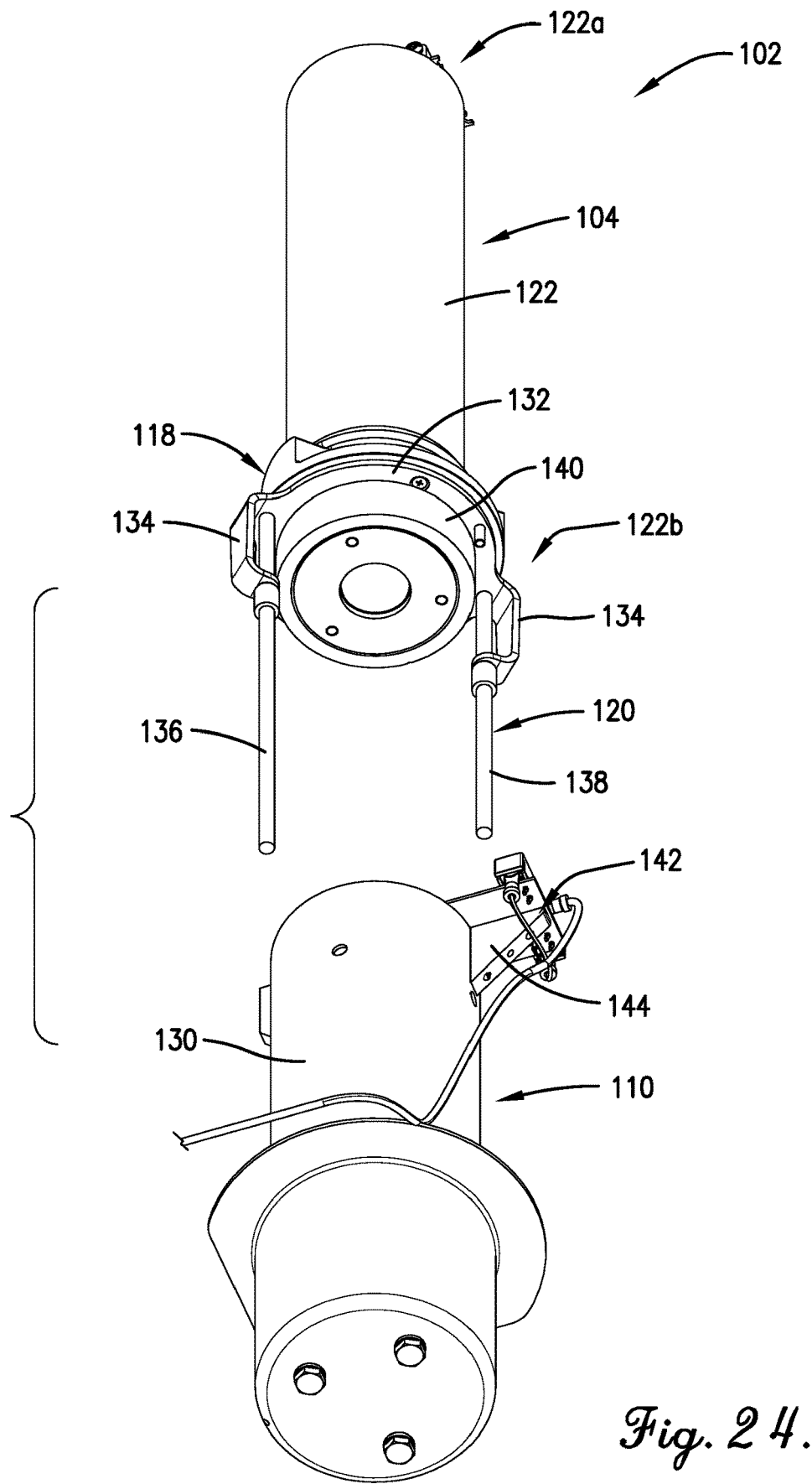
FIG. 24 is a partially exploded bottom perspective view of the rocket assembly.
Figure 25:
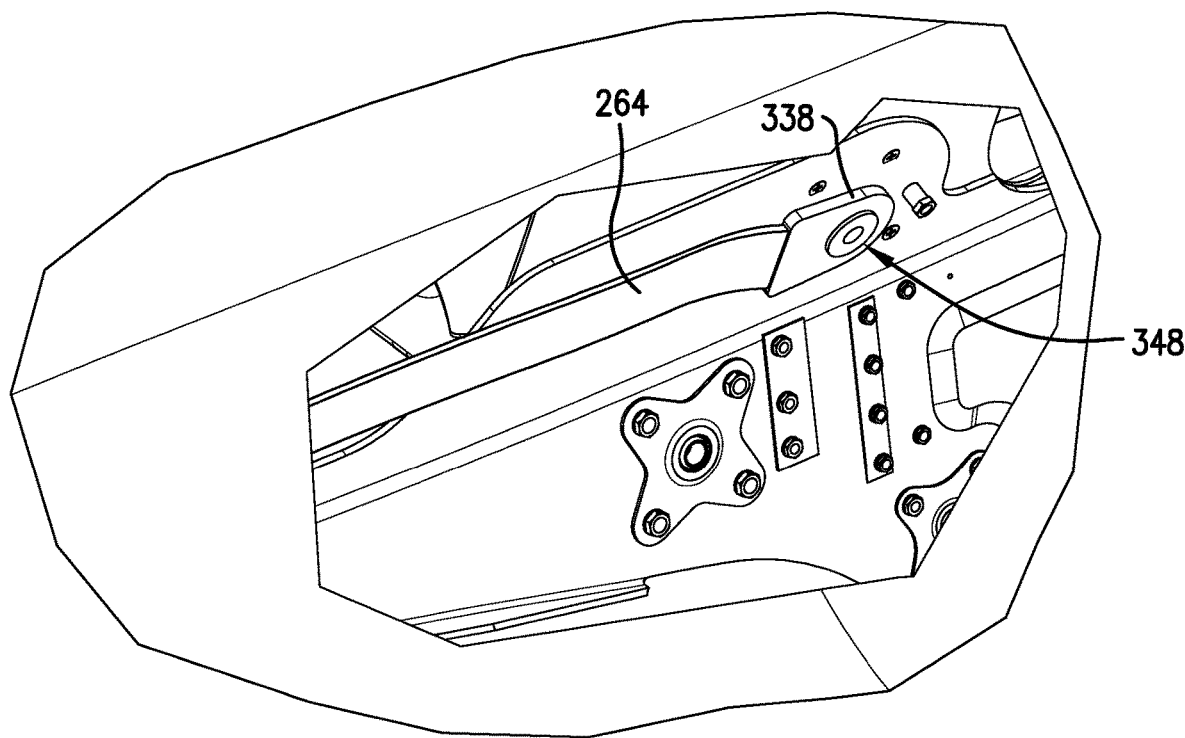
FIG. 25 is a detailed view of a rear harness attachment from an external viewpoint.
Figure 26:
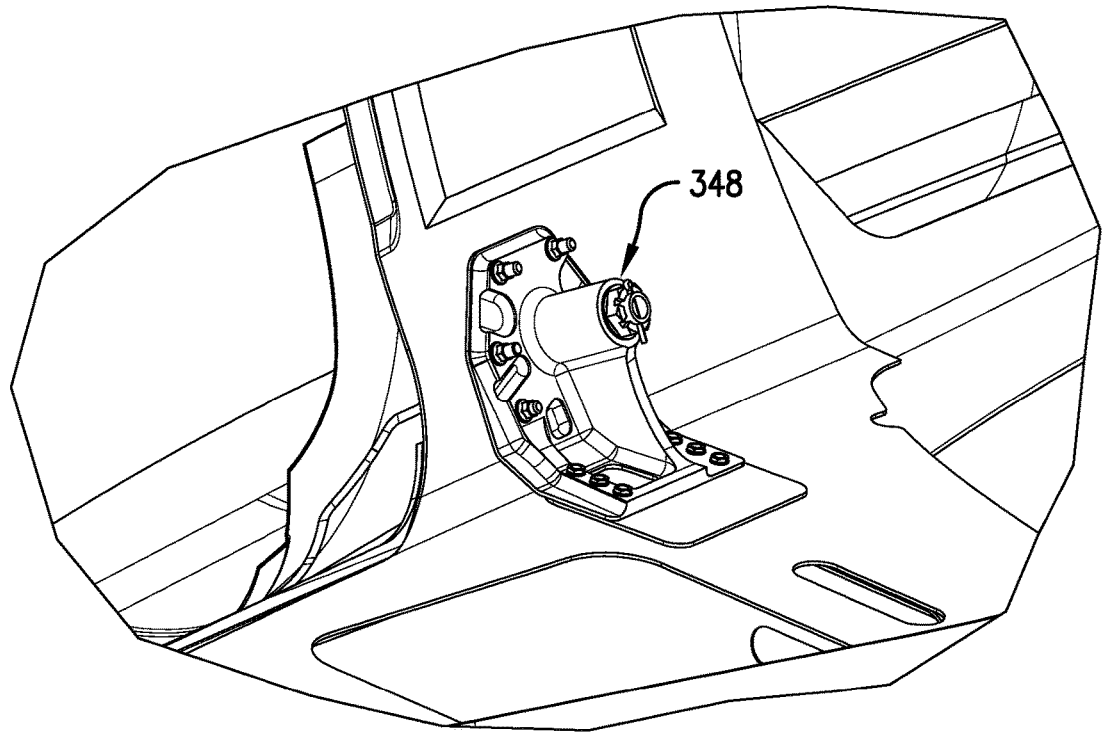
FIG. 26 is a detailed view of a rear harness attachment from an internal viewpoint.

As best shown in FIGS. 21 and 22, the snub line mechanism 268 preferably includes a fore four-point link attachment 358 and an aft three-point link attachment 360. The four-point link attachment 358 preferably includes four (4) pins 358a-d. The three-point link attachment 360 preferably includes three (3) pins 360a-c. The pins 358a-d are preferably bookended by plates 362. The pins 360a-c are preferably bookended by plates 364.

A snub line 366 preferably extends between the pins 358a and 360a. The snub line 366 is preferably wound within an interior 368 of the snub line mechanism 268 in an appropriate manner, with such windings being illustrated only schematically herein.

The front harness parachute end 336 is preferably a split end including loops 336a and 336b. Loops 336a and 336b are preferably secured to pins 358b and 358c, respectively, of the four-point link attachment 360. The proximal end 254 of the riser 248 is preferably secured to pin 358d.

The pilot and copilot rear harness parachute ends 340 and 344 are preferably secured to pins 360b and 360c, respectively, of the three-point link attachment 360.

Thus, the aircraft body 12 is linked to the canopy 244 by means of the suspension lines 246, the riser 248, the snub line mechanism 268, and the harnesses 262,264,266.

The snub line mechanism 268 preferably includes a release mechanism 370. The release mechanism 370 is preferably electrically interconnected with the sequencer 100 by means of a snub line signal line 372.

As will be discussed in greater detail below, activation of the release mechanism 370 upon receipt of a signal through the signal line 372 ultimately results in deployment of the snub line 366. More particularly, the release mechanism 370 preferably includes a locking assembly 374 including a pair of pins 376, a pair of brackets 378, and an explosive squib in a housing 380. The snub line 366 is looped about each of the pins 376 to prevent deployment (i.e. unwinding). The squib preferably disengages the locking assembly 374 by explosively shifting the housing 380 and, in turn, outwardly shifting the brackets 378 and pins 376, which enables the snub line 366 to slide off of the pins 376 and expand until it is held taut by the pins 358a and 360a of the line attachments 358 and 360.

Operation of the Parachute System

As described in detail above, operation of the parachute system 30 preferably commences in response to an intentional or purposeful input such as the pulling of the activation handle 40 (or, in an unmanned aircraft, detection of a predetermined abnormality, etc.). Initial stages of operation are then preferably controlled by the deployment management system 46, which, under certain conditions elucidated above, sends a deployment signal to the extraction system 34.

In greater detail, upon receipt of the deployment signal from the control box 50 via the ignition wires 128, the signal receiver 112 of the rocket assembly 102 prompts the ignition assembly 126 to active the rocket motor 124. The body 122 and motor 124 of the rocket 104 then depart in a deployment direction from a stowed or launch position and are guided by the launch tube 110. Such departure occurs at a rocket launch time.

Figure 28:
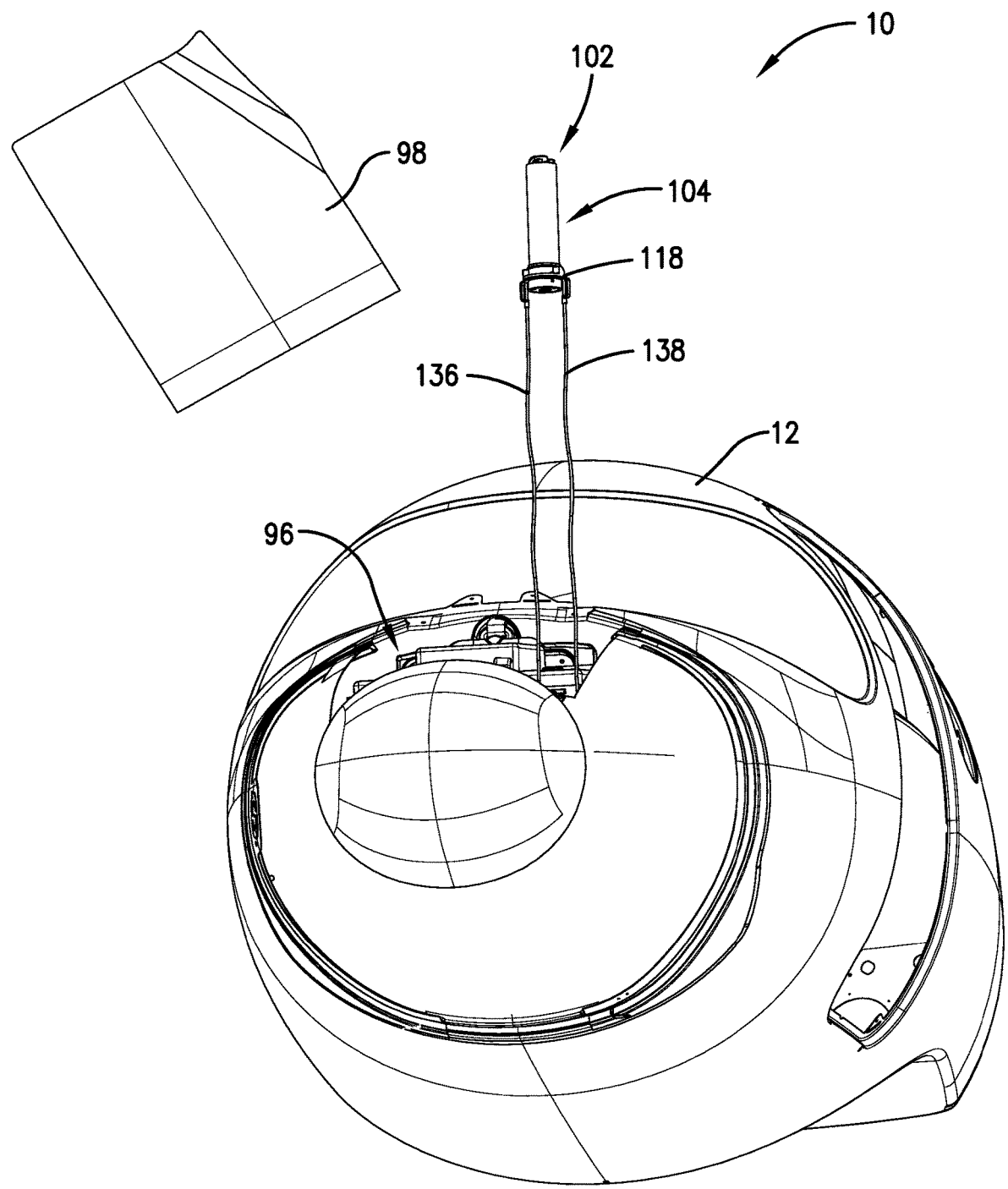
FIG. 28 is a fragmentary perspective view of the aircraft during a first stage of deployment of the parachute assembly, illustrating the rocket shortly after launch and the nose bay cover removed from the remainder of the aircraft body.

With reference to FIG. 28, the rocket 104 preferably impacts the cover 98 of the nose bay 96, forcibly removing it from the remainder of the aircraft body 12.

As the rocket 104 travels at least substantially in the deployment direction (as noted above, trajectory aberrations are likely), it breaks away a portion 112a of the signal receiver 112 and picks up the pick-up collar 118. More particularly, the fixed pick-up collar 118 initially slides down (in a relative sense) the upwardly moving rocket body 122 before being captured by the flange 140 near the trail end 122b of the rocket body 122.

As the rocket 104 continues its trajectory generally away from the aircraft body 12, the sequencer cable legs 136 and 138, which are routed through the brackets 134 of the pick-up collar 118, begin to uncoil from their stowed positions in the stowage bag 141. When the cable legs 136 and 138 have been pulled taut, they engage the activation harness 166 and the rocket bridle 147 via the interconnecting link 214 disposed in the protective boot 212.

More particularly, the parachute end 306 of the rocket bridle 147, along with the sheath 310 protecting the rocket bridle 147, begin to be lifted by the rocket 104 generally in the deployment direction. Similarly, the rocket connection loop 194 and, in turn, the rocket connection portion 174 of the activation harness 166, via the connection of the loop 194 to the link 214, begin to be lifted by the rocket 104 generally in the deployment direction.

The sequencer portion 176 is subsequently forcefully engaged so as to break the fastener (e.g., zip-tie) 206 and begin paying out. Similarly, the deployable portion 170, though not yet tearing out, begins to pay out. The aircraft fixation portion 172 preferably retains some slack.

Figure 29:
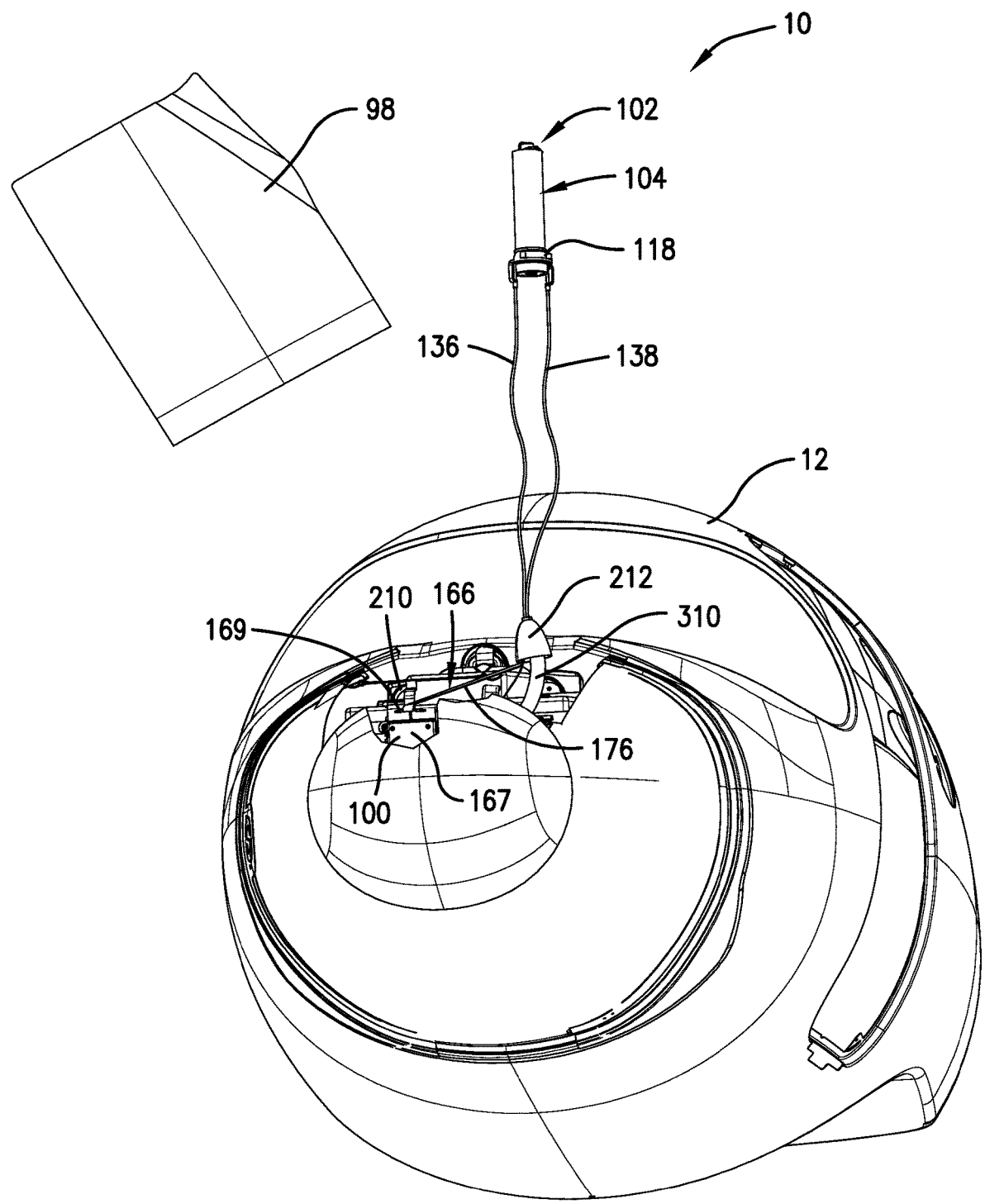
FIG. 29 is a fragmentary perspective view of the aircraft in a second stage of deployment of the parachute assembly, illustrating the rocket in the activation position (with exaggerated spacing of the just-removed tang from the sequencer for clarity)

With reference to FIG. 29, as the rocket 104 continues its travel, it reaches an activation position in which the sequencer portion 176 becomes taut and tears the activation tang 169 away from the sequencer box 167 to activate the switch assembly 171 via shifting (e.g., popping out) of the now-uncovered redundant contacts 173. The sequencer 100, due to the now-active switch assembly 171, then sends a signal through the inflation wire 175a to activate the first inflator 150a and initiate inflation of the inflatable cushion 148 at an inflation start time. This state is shown in an exaggerated state (e.g., with the tang 169 shifted a visible distance from the sequencer box for purposes of clarity) in FIG. 29.

It is noted that such an arrangement ensures by mechanical means that the rocket 104 is a sufficient clearance distance from the still-stowed parachute assembly 38 before the cushion 148 ejects or, most preferably, even begins to eject, the parachute assembly 38 from the nose bay 96. This protects against interference between the outgoing rocket 104 and the likewise outgoing parachute assembly 38. For instance, in a preferred embodiment, the rocket 104 is spaced at least three (3) feet from its initial launch or stowage position and at least three (3) feet from the stowed position of the parachute assembly 38 when it reaches the activation position. Most preferably, the rocket 104 is spaced at least five (5) feet from its initial launch or stowage position and at least five (5) feet from the stowed position of the parachute assembly 38 when it reaches the activation position. Such preferred distance will vary according to the particular application, however, as will be readily apparent to those of ordinary skill in the art.

It is also noted that such an arrangement ensures that the rocket 104 always leads (and, eventually, pulls) the parachute assembly 38.

Figure 30:
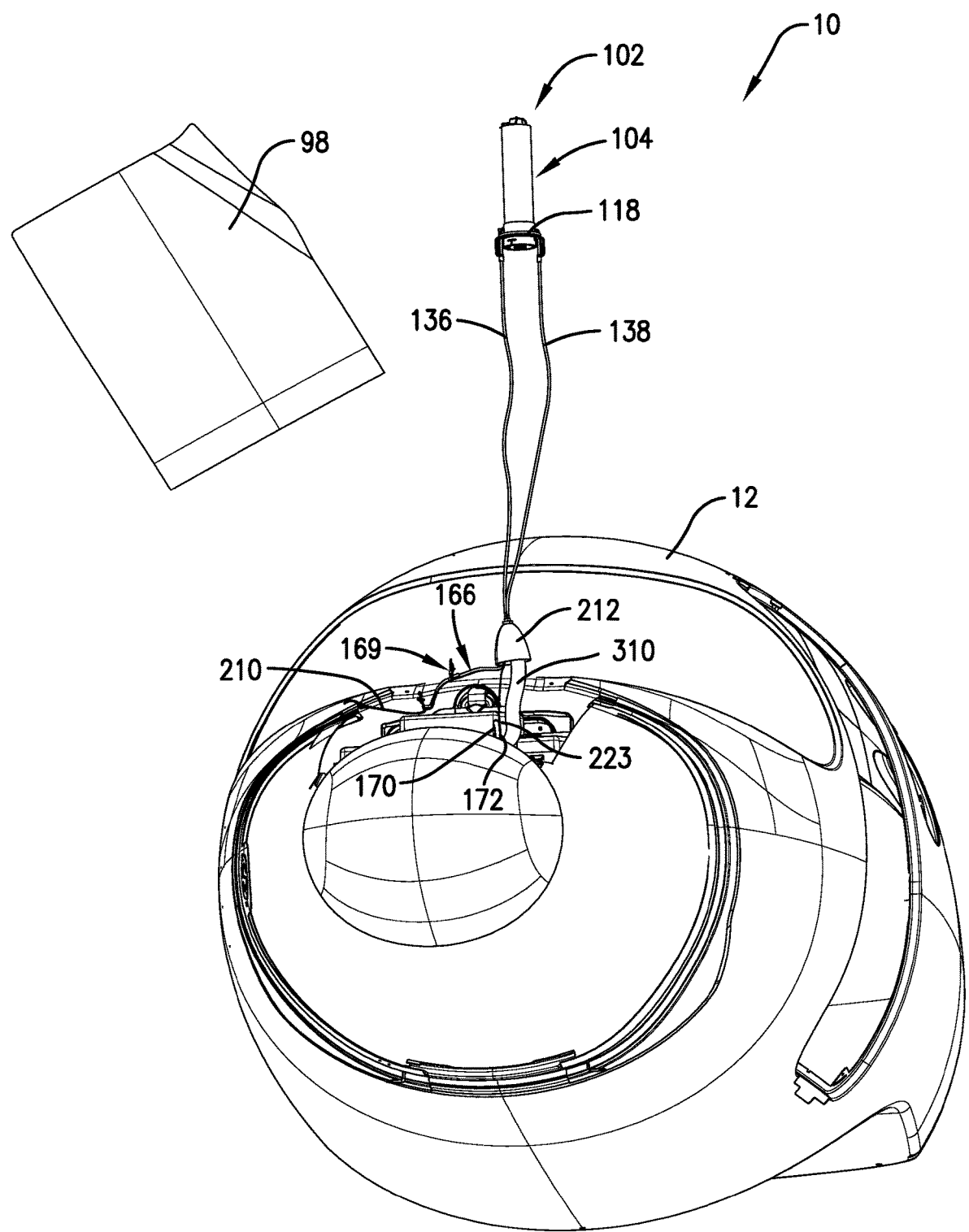
FIG. 30 is a fragmentary perspective view of the aircraft in a third stage of deployment of the parachute assembly, with the release mechanism activation and initial pickup of the boot and rocket bridle being shown.

With reference to FIG. 30, as the cushion 148 beings to inflate, travel of the rocket 104 continues, with the parachute release portion 178 coming taut and the parachute release loop 198 engaging the parachute release mechanism 210 mentioned briefly above. The parachute release mechanism 210 is preferably initially fixed to the deployment bag 250 in such a manner as to secure a retaining strap 251 that prevents inadvertent payout of various components of the parachute assembly 38 (e.g., the riser 248, the suspension 246, and the canopy 244), as well as full deployment of the rocket bridle 147. Engagement of the release mechanism 210 releases the retaining strap 251 so that controlled payout can proceed as discussed below.

Also as the cushion 148 begins to inflate, the deployable portion 170 of the activation harness 166 begins to incrementally deploy. More particularly, the aircraft fixation portion 172 comes taut, so that the aircraft fixation portion 172 and the rocket connection portion 174 provide substantially opposite forces at the initiation end 186 of the deployable portion 170. Such opposed forces pull the first and second portions 180 and 182 away from each other, resulting in tear-out of initial ones of the stitches 222 at the tear-out progress point 223.

Figure 31:
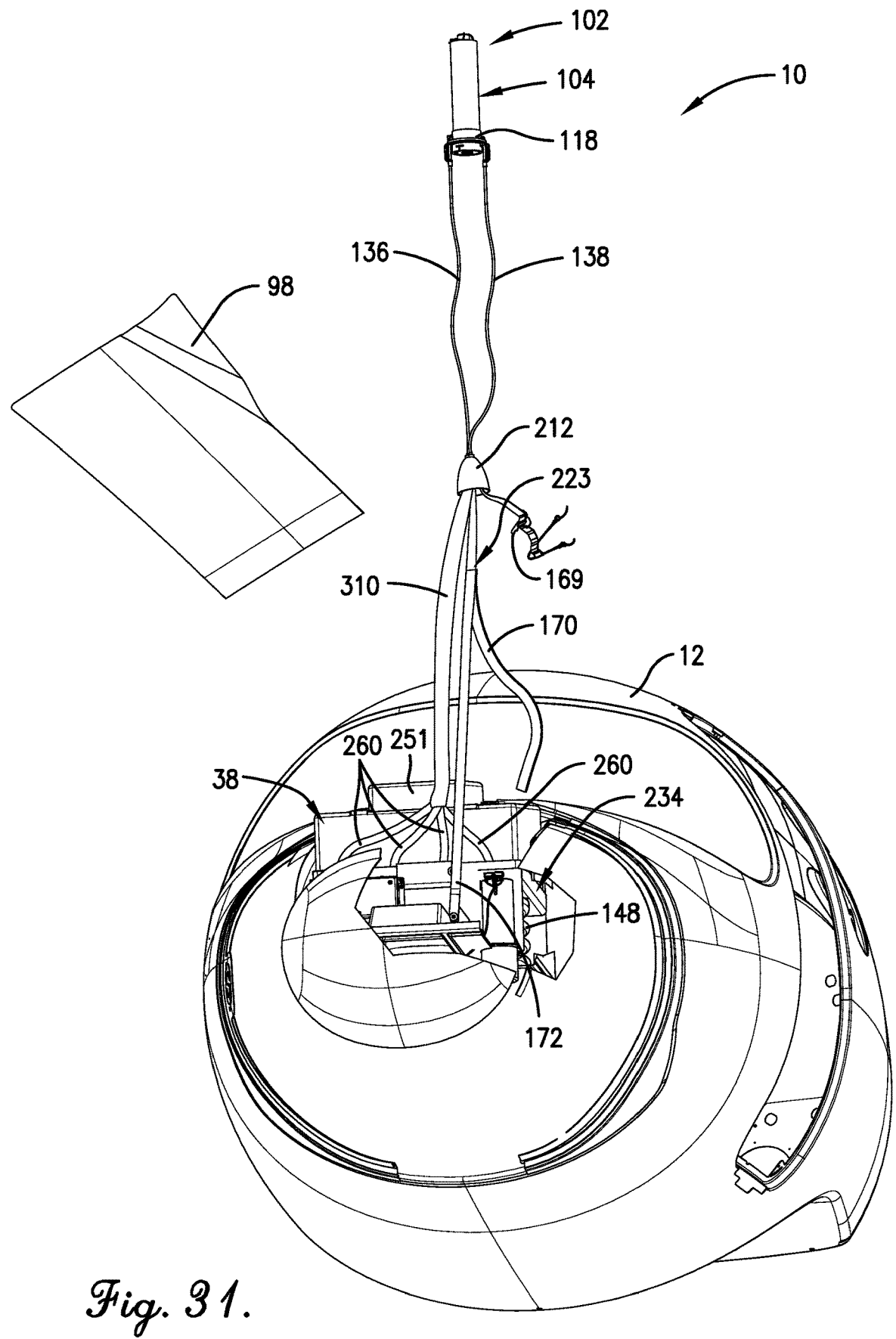
FIG. 31 is a fragmentary perspective view of the aircraft in a fourth stage of deployment of the parachute assembly, particularly showing initial engagement of the deployment bag straps and early tear-out of the activation harness, as well as progressing inflation of the cushion.

With reference to FIG. 31, continued travel of the rocket 104 results in continued tear-out of the stitches 222 at the (shifting) progress point 223. Thus, as the rocket 104 moves away from the aircraft body 12, the joined length 184 shrinks, while the aircraft fixation portion 172 and the rocket connection portion 174 each become progressively longer (by incorporating portions of the first and second portions 180 and 182, respectively, that are no longer joined to one another).

Resistive forces against travel of the rocket 104 as provided by the tear-out of the stitches 222 is desirable to provide increased control over the rocket trajectory. That is, as will be readily understood by those in the art, rocket flight "noise" or irregularity (i.e., unpredictability) is greatly reduced when at least a small load is provided in opposition to the rocket's path.

Figure 32:
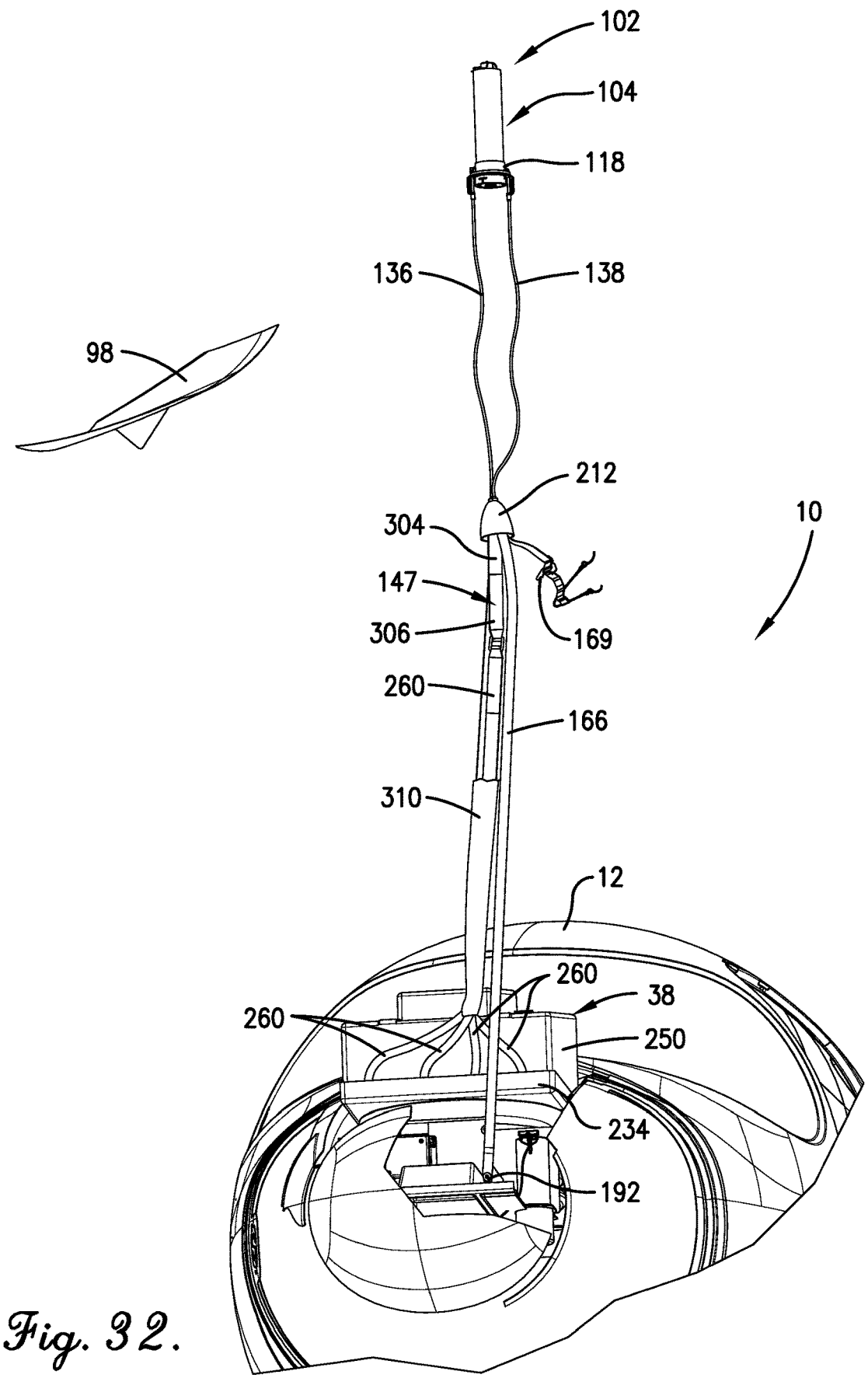
FIG. 32 is a fragmentary perspective view of the aircraft in a fifth stage of deployment of the parachute assembly, illustrating continued rocket travel, continued inflation of the cushion, and continued tear-out of the activation harness, and further including fragmentation to expose the deployment bag straps and rocket bridle within the sheath.

With reference to FIG. 32, about eighteen (18) milliseconds after the inflation start time, the sequencer 100 signals the second inflator 150b via the inflation wire 175b to become active and continue inflation of the inflatable cushion 148.

Continued travel of the rocket 104 has preferably resulted in the parachute end 306 of the rocket bridle 147 beginning to pull the straps 260 of the deployment bag 250. However, incremental tear-out of the deployable portion 272 of the bridle 147 preferably has not yet begun.

Figure 33:
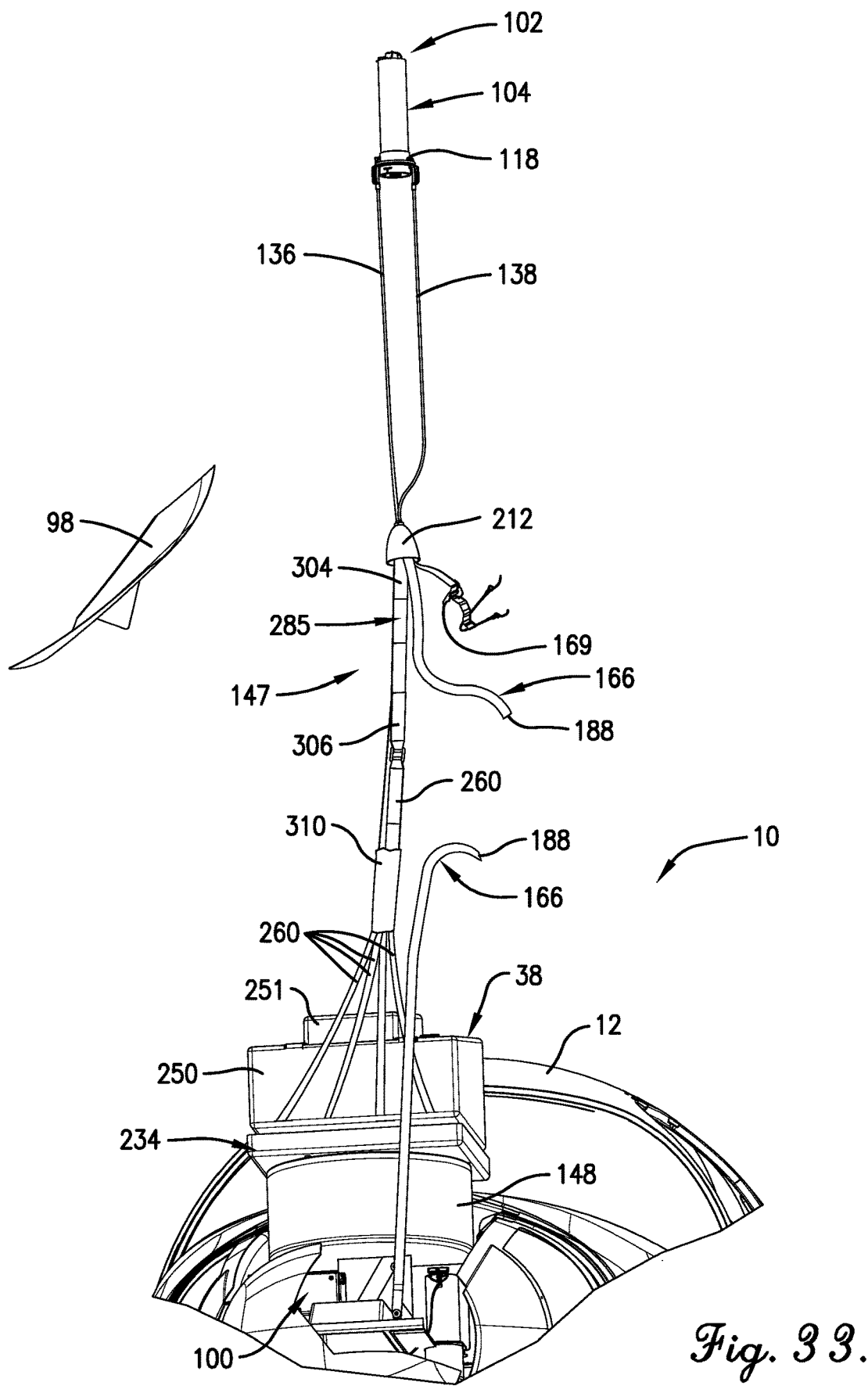
FIG. 33 is a fragmentary perspective view of the aircraft in a sixth stage of deployment of the parachute assembly, particularly illustrating completion of the cushion stroke, completion of the activation incremental tear-out, and early tear-out of the rocket bridle.

With reference to FIG. 33, about thirty (30) milliseconds after the inflation start time, the sequencer 100 signals the third inflator 150c via the third inflation wire 175c to become active and complete the inflation of the inflatable cushion 148. The activation harness 166 completes its tear-out process (i.e., the first and second portions 180 and 182 separate completely at the completion end 188), thereby releasing the rocket 104 from the aircraft body 12, to which it had been attached by the grommet 192. The parachute assembly 38, subject to the push provided by the inflating cushion 148 in addition to the pull provided by the rocket bridle 147, begins to lift away from the load plate 234. The rocket bridle 147 begins its tear-out process, whereby the stitches 284 are severed at the tear-out point 285 to enable gradual separation of the first and second portions 278 and 280 from one another.

It is noted that, similar to the activation harness 166, the rocket bridle 147 thus provides resistive forces against travel of the rocket 104 and, in turn, increased control over the rocket trajectory.

It is also noted that relatively low-shock transfer of the load associated with the parachute assembly 38 from the cushion 148 to the rocket 104 is facilitated by the deployable portion 272 of the rocket bridle 147. More particularly, the progressive resistance provided by the initiation, intermediate, and completion segments 286,288,290, as discussed in detail above, assists in gradual transfer of the loading from the cushion 148 to the rocket 104 (the cushion 148 initially bears the entire load of the parachute assembly 38, while the rocket 104 takes over the entire load shortly after inflation of the cushion 148 is complete) and, more broadly, reduces the shock associated with such a transfer.

It is also noted that, as the cushion 148 is inflating, the stitching 160 is tearing out of the overlaid portions 156.

Furthermore, as will be apparent to those of ordinary skill in the art, as a result of inflation of the cushion 148, the load plate 148 and the parachute assembly 38 are being shifted (i.e., lifted) by the cushion 148 from initial stowed positions. Still further, the rocket 104 is continuing its travel away from the aircraft body 104.

Preferably, provision of the three (3) inflators 150a-c rather than a single inflator results in reduced loads being transferred to the aircraft body 12. Furthermore, use of the three (3) inflators 150a-c preferably increases the force with which the parachute assembly 38 is ejected from the nose bay 96 by the cushion 148.

With regard to the latter point, it is noted that the parachute assembly 38 is preferably ejected fully out of the nose bay 96 by means of the cushion 148, decreasing the likelihood of detrimental interference with the aircraft body 12 occurring during the remainder of the extraction process. Such ejection process to clear the nose bay 96 preferably occurs in less than about one hundred (100) milliseconds, more preferably in less than about seventy-five (75) ms, and most preferably in about fifty (50) milliseconds.

Figure 34:
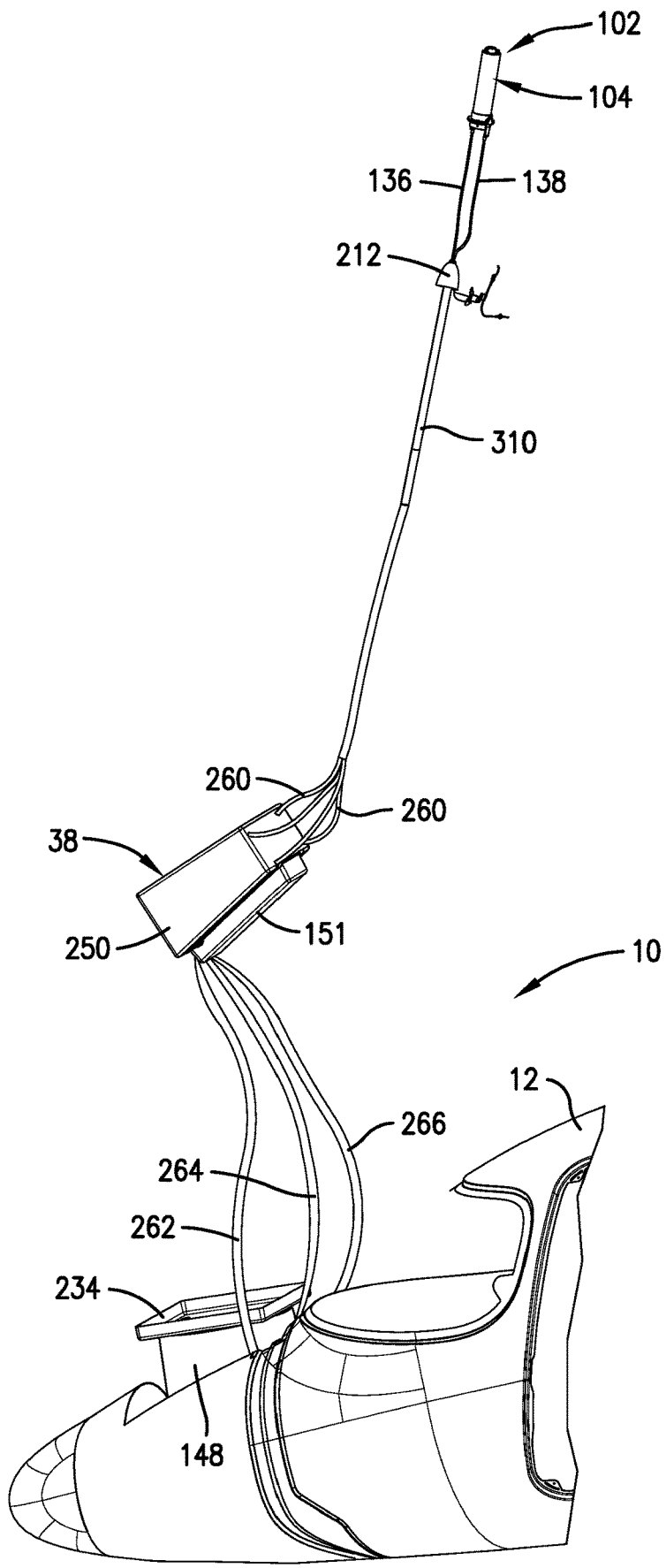
FIG. 34 is a fragmentary side perspective view of the aircraft in a seventh stage of deployment of the parachute assembly, particularly illustrating early harness payout, reorientation of the deployment bag, and continued rocket travel.

With reference to FIG. 34, as the rocket 104 continues its travel with the parachute assembly 38 in tow, the deployment bag 250 preferably rotates such that the side thereof to which the snub line mechanism 268 is mounted faces generally downward (i.e., generally opposite the deployment direction). The first portion 262a of the front harness 262 begins paying out from the copilot stow bag 314, and the first portions 264a and 266a of the rear harnesses 264 and 266, respectively, begin paying out of the pilot and copilot stow bags 312 and 314, respectively.

Figure 35:
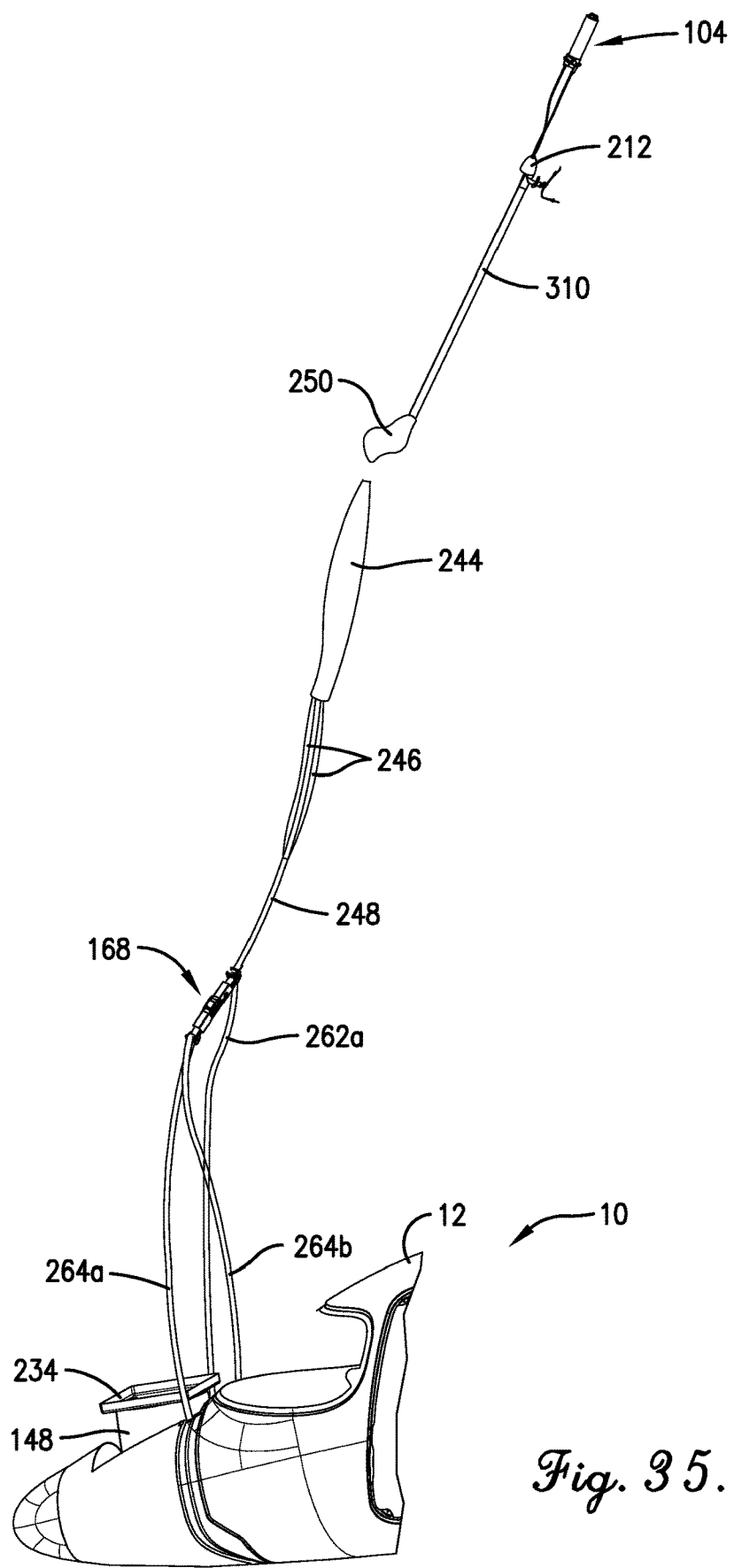
FIG. 35 is a fragmentary side perspective view of the aircraft in an eighth stage of deployment of the parachute assembly, particularly illustrating the rocket having removed the deployment bag and released the canopy, riser, suspension, and snub line mechanism.

With reference to FIG. 35, when payout of the first portions 262a,264a,266a is complete, the rocket 104 reaches a line stretch position and preferably removes the deployment bag 250 from the remainder of the parachute assembly 38, releasing the pressure-packed canopy 244, along with the riser 248 and the suspension 246. The snub line mechanism 268, still in its initial compact form, also falls away from the deployment bag 250.

At this time, it is preferred that between one (1) and three (3) seconds have elapsed since launch time. Most preferably, about one and sixty-five hundredths (1.65) seconds have elapsed since launch time.

Figure 36:
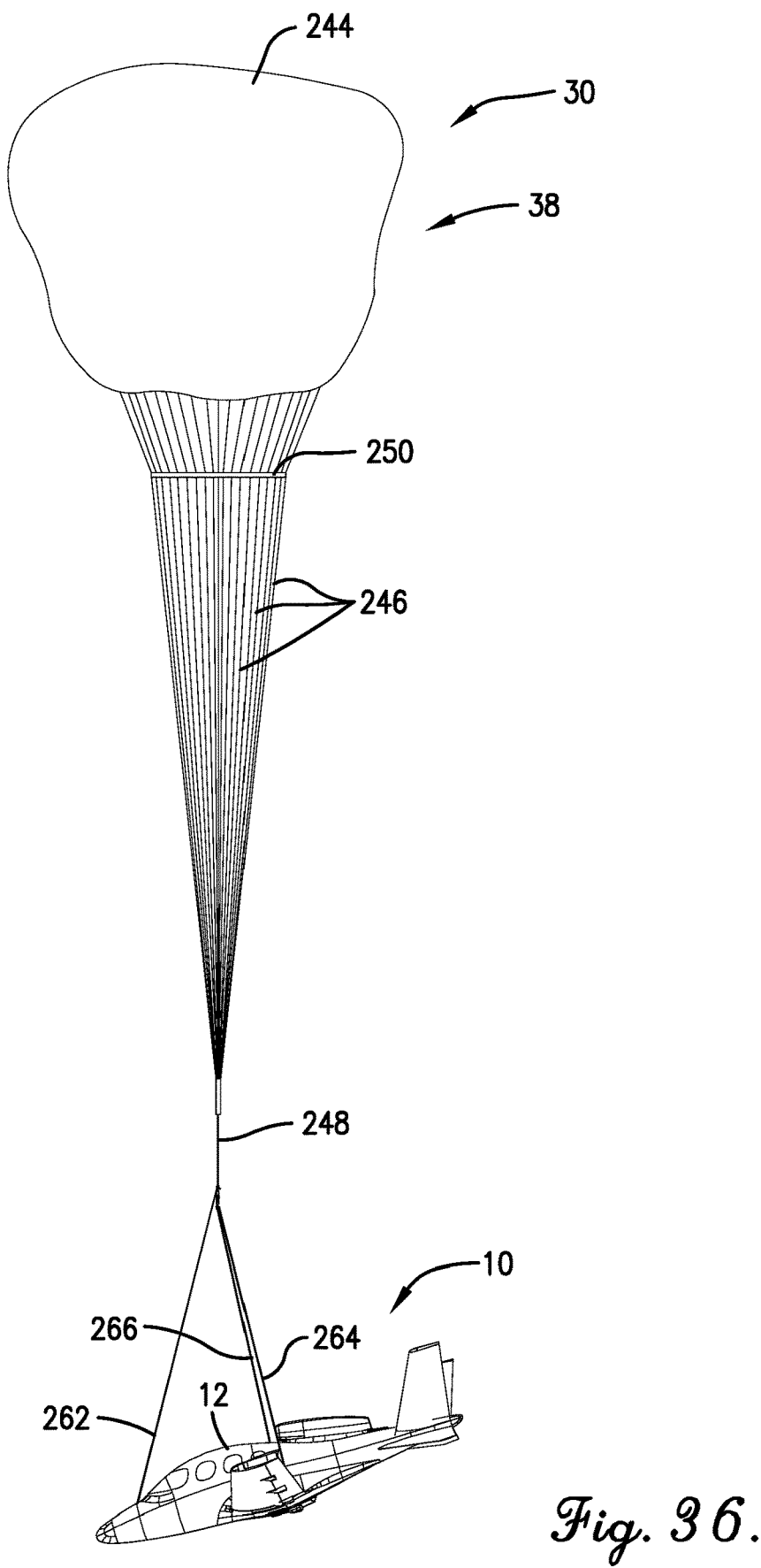
FIG. 36 is a side perspective view of the aircraft in a ninth stage of deployment of the parachute assembly, particularly illustrating inflation of the canopy.

With reference to FIG. 36, as the environment (e.g., air) begins to inflate the canopy 244, the force applied to the canopy 244 by the environment results in payout of the second stages 262b,264b,266b, of the harnesses 262,264, 266. More particularly, the rear harnesses 264 and 266 progressively slide or tear out of the nose fairing 328 and the belly fairing 330, then peel back the wing/body fairing 332. The front harness 262 progressively tears out the stitches 354 of the deployable portion 350 at the progressively shifting progress point 355.

Full inflation of the canopy 244 preferably occurs within about fifteen (15) seconds of launch time and most preferably occurs within about ten (10) seconds of launch time.

It is preferred that the aircraft 10, having initially been shifted into a nose up or pitched up position by the deployment management system 46, shifts into a nose down/tail up configuration during the extraction and deployment of the parachute assembly 38. Such a configuration aids in preventing backwards tumbling of the aircraft body 12 as it is subjected to forces associated with initial deployment of the parachute assembly 38 in a broad sense and thereafter deployment of the canopy 12.

With reference to FIG. 37, leveling of the aircraft 10 preferably occurs between about ten (10) seconds and about twenty (20) second after the rocket 104 reaches the activation position and removes the tang 169. Most preferably, leveling occurs about fifteen (15) seconds after the rocket 104 removes the tang 169, or, more broadly, after the canopy 12 is fully open.

More particularly, upon removal of the tang 169, the sequencer 100 sends a signal via the snub line signal line 372 to the snub line mechanism 268. A delay circuit in the snub line mechanism 268 begins a fifteen (15) second delay before the previously described explosive squib dissembles the locking assembly 374. The newly released snub line 366 unwinds, providing an additional length (e.g., seven (7) feet in a preferred embodiment) of harness to that already provided by the rear harnesses 264 and 266. Such release thereby enables leveling of the aircraft 10.

The aircraft 10 is thereafter gently lowered to the ground or associated structures or bodies thereon, buoyed by the parachute canopy 12.

CONCLUSION

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An aircraft comprising:
   a fuselage;
   a parachute assembly including a deployable canopy,
   said parachute assembly being shiftable from a stowed position to a deployed position;
   a projectile object configured to pull the parachute assembly toward the deployed position when traveling in a deployment direction; and
   a separable bridle comprising an extendable body, with extension of the body resisting travel of the projectile object in the deployment direction,
   said extendable body including a first portion secured to the projectile object and a second portion,
   said first portion and said second portion being separably fixed to one another along a cooperatively defined joined length, with the first portion and the second portion separating from one another along the joined length to provide a resistive force against travel of the projectile object,
   said first portion and said second portion being configured to completely separate from one another so as to release the projectile object relative to the fuselage.

2. The aircraft of claim 1,
said first portion overlying said second portion.

3. The aircraft of claim 2,
said first portion and said second portion being stitched to one another along the joined length by a plurality of stitches,
separation of said first and second portions from one another requiring severance of said stitches.

4. The aircraft of claim 3,
said separable bridle including at least one thread defining said plurality of stitches,
said at least one thread defining a stitched line.

5. The aircraft of claim 4,
each of said stitched lines comprising a plurality of zig-zag stitches.

6. The aircraft of claim 4,
each of said stitched lines having a consistent stitch density along a length thereof,
said stitch density being equal between each of the stitched lines.

7. The aircraft of claim 4,
said at least one thread having a constant weight.

8. The aircraft of claim 1, further comprising:
a non-separable bridle including a first portion permanently secured to a second portion,
said first portion of the non-separable bridle being secured to the projectile object,
said first portion and said second portion of the non-separable bridle being selectively fixed to one another along a second joined length,
said non-separable bridle configured such that separation of said first and second portions along the second joined length provides increasing resistive forces against travel of said projectile object.

9. The aircraft of claim 8,
said second joined length including an initiation segment and a completion segment opposite the initiation segment,
said second joined length configured such that separation of said first and second portions from one another commences along the initiation segment and terminates along the completion segment, wherein a first force is necessary to effect separation along the initiation segment and a second force is necessary to effect separation along the completion segment,
said second force being greater than said first force.

10. The aircraft of claim 9,
said second joined length further including an intermediate segment extending between and interconnecting the initiation segment and the completion segment, wherein a third force is necessary to effect separation along the intermediate segment,
said third force being greater than said first force but less than said second force.

11. The aircraft of claim 10,
said initiation segment being longer than said intermediate segment and said completion segment.

12. The aircraft of claim 10,
said first portion and said second portion of said non-separable bridle being stitched to one another along the second joined length by a plurality of stitches, with separation of the first and second portions along the second joined length requiring severance of the stitches,
said non-separable bridle including at least one thread defining a plurality of stitched lines that comprise the stitches,
said stitched lines including initiation, intermediate, and completion stitched lines joining the first and second portions of the non-separable bridle along the initiation, intermediate, and completion segments, respectively.

13. The aircraft of claim 12,
at least one of said initiation stitched lines being continuously formed with a corresponding one of said intermediate stitched lines,
at least one of said intermediate stitched lines being continuously formed with a corresponding one of said completion stitched lines.

14. The aircraft of claim 12,
said non-separable bridle including a greater number of said intermediate stitched lines than of said initiation stitched lines, and a greater number of said completion stitched lines than of said intermediate stitched lines.

15. The aircraft of claim 14,
said non-separable bridle including four of said initiation stitched lines, six of said intermediate stitched lines, and eight of said completion stitched lines.

16. The aircraft of claim 8,
said non-separable bridle interconnecting the projectile object and the parachute assembly,
said non-separable bridle including a projectile end and a parachute end,
each of said projectile end and said parachute end extending from the initiation segment.

17. The aircraft of claim 16,
said parachute assembly including a deployment bag at least substantially encompassing the canopy when the parachute assembly is in the stowed position,
said deployment bag including a strap,
said strap being connected to said non-separable bridle.

18. The aircraft of claim 1,
said aircraft further including a thermally protective sheath at least substantially surrounding the separable bridle.

19. The aircraft of claim 1,
said projectile object comprising a rocket.

20. The aircraft of claim 19,
said aircraft comprising a rocket assembly including said rocket,
said rocket assembly further including a cable fixed to and extending from said rocket,
said cable being connected to said separable bridle.

21. The aircraft of claim 1,
said body configured to resist travel of the projectile object in the deployment direction starting at less than twenty percent of its maximum extension.

22. The aircraft of claim 21,
said body configured to resist travel of the projectile object in the deployment direction starting at less than five percent of its maximum extension.

23. The aircraft of claim 1,
said separable bridle interconnecting the projectile object and the fuselage,
said separable bridle including a projectile end and a fuselage end, with the fuselage end being fixed relative to the fuselage.

* * * * *